United States Patent
Cheng

(10) Patent No.: US 10,857,751 B2
(45) Date of Patent: Dec. 8, 2020

(54) COMPOSITE STRINGER AND METHODS FOR FORMING A COMPOSITE STRINGER

(71) Applicant: The Boeing Company, Chicago, IL (US)

(72) Inventor: Jiangtian Cheng, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/408,401

(22) Filed: May 9, 2019

(65) Prior Publication Data

US 2020/0353708 A1     Nov. 12, 2020

(51) Int. Cl.
| | |
|---|---|
| *B64C 1/00* | (2006.01) |
| *B29D 99/00* | (2010.01) |
| *B29C 65/00* | (2006.01) |
| *B64C 1/06* | (2006.01) |
| *B64C 3/18* | (2006.01) |

(Continued)

(52) U.S. Cl.
CPC .......... *B29D 99/0014* (2013.01); *B29C 66/13* (2013.01); *B64C 1/064* (2013.01); *B64C 3/182* (2013.01); *B64F 5/10* (2017.01); *B29D 99/0003* (2013.01); *B29L 2031/3082* (2013.01); *B29L 2031/3085* (2013.01); *B64C 2001/0072* (2013.01); *Y10T 428/24174* (2015.01)

(58) Field of Classification Search
CPC . Y10T 428/24174; B64C 1/064; B64C 3/182; B64C 2001/0072; B64F 5/10; B29D 99/003; B29D 99/0014; B29L 2031/3082; B29L 2031/3085

See application file for complete search history.

(56) References Cited

U.S. PATENT DOCUMENTS

| | | |
|---|---|---|
| 6,017,484 A | 1/2000 | Hale |
| 9,370,921 B2 | 6/2016 | Butler et al. |
| 9,463,880 B2 | 10/2016 | Vetter et al. |

(Continued)

OTHER PUBLICATIONS

Rouhi et al., "Design, manufacturing, and testing of a variable stiffness composite cylinder", Composite Structures, vol. 184, at pp. 146-152, published Jan. 15, 2018, available at https://www.sciencedirect.com/science/article/pii/S0263822317326089.

(Continued)

*Primary Examiner* — Alexander S Thomas
(74) *Attorney, Agent, or Firm* — McDonnell Boehnen Hulbert & Berghoff LLP

(57) ABSTRACT

A composite stringer assembly includes a composite stringer and a radius filler. The composite stringer includes a skin flange, a web, a corner portion extending from the skin flange to the web, an inner surface, and an outer surface. At the corner portion, the outer surface is defined by a first radius of curvature, which is substantially constant between the skin flange and the web. The support structure includes at least one of a skin of a vehicle or a base charge. The radius filler includes a first surface coupled to the inner surface at the corner portion, a second surface configured to couple to the support structure, and a third surface extending between the first surface and the second surface. The first surface of the radius filler is defined by a second radius of curvature, which is substantially constant between the second surface and the third surface.

21 Claims, 34 Drawing Sheets

(51) Int. Cl.
  *B64F 5/10* (2017.01)
  *B29L 31/30* (2006.01)

(56) References Cited

U.S. PATENT DOCUMENTS

| | | | |
|---|---|---|---|
| 9,592,651 | B2 | 3/2017 | Deobald et al. |
| 10,099,445 | B2 | 10/2018 | Kismarton |
| 10,195,817 | B2 | 2/2019 | Balabanov et al. |
| 2002/0031641 | A1 | 3/2002 | George et al. |
| 2008/0290214 | A1 | 11/2008 | Guzman et al. |
| 2008/0302912 | A1 | 12/2008 | Yip et al. |
| 2013/0153145 | A1 | 6/2013 | Liguore et al. |
| 2013/0189482 | A1* | 7/2013 | Dequine ............... B29C 43/52 428/130 |
| 2015/0165746 | A1 | 6/2015 | Prebil et al. |
| 2018/0093431 | A1* | 4/2018 | Forston ............... B29C 66/723 |
| 2018/0117873 | A1* | 5/2018 | DuPont ............... B32B 3/28 |
| 2019/0009477 | A1 | 1/2019 | Gordon |
| 2019/0061906 | A1 | 2/2019 | Ewing |

OTHER PUBLICATIONS

Gürdal, et al., "Variable stiffness composite panels: Effects of stiffness variation on the in-plane and buckling response," Composites: Part A, vol. 39, Issue 5, at pp. 911-922, published May 2008, available at: https://ac.els-cdn.com/S1359835X07002643/1-s2.0-S1359835X07002643-main.pdf?_tid=d46d133d-59c5-42b9-89da-5a4dd999bffc&acdnat=1536620823_6c694b3e5c1e4e9d506206958d02fb6d (Abstract Only).
Co-pending U.S. Appl. No. 16/408,398, filed May 9, 2019.
Co-pending U.S. Appl. No. 16/408,406, filed May 9, 2019.
Co-pending U.S. Appl. No. 16/408,408, filed May 9, 2019.
Co-pending U.S. Appl. No. 16/408,409, filed May 9, 2019.
Co-pending U.S. Appl. No. 16/408,410, filed May 9, 2019.
Extended European Search Report issued by the European Patent Office in European Patent Application No. 20173516.4, dated Oct. 7, 2020 (15 pages).

* cited by examiner

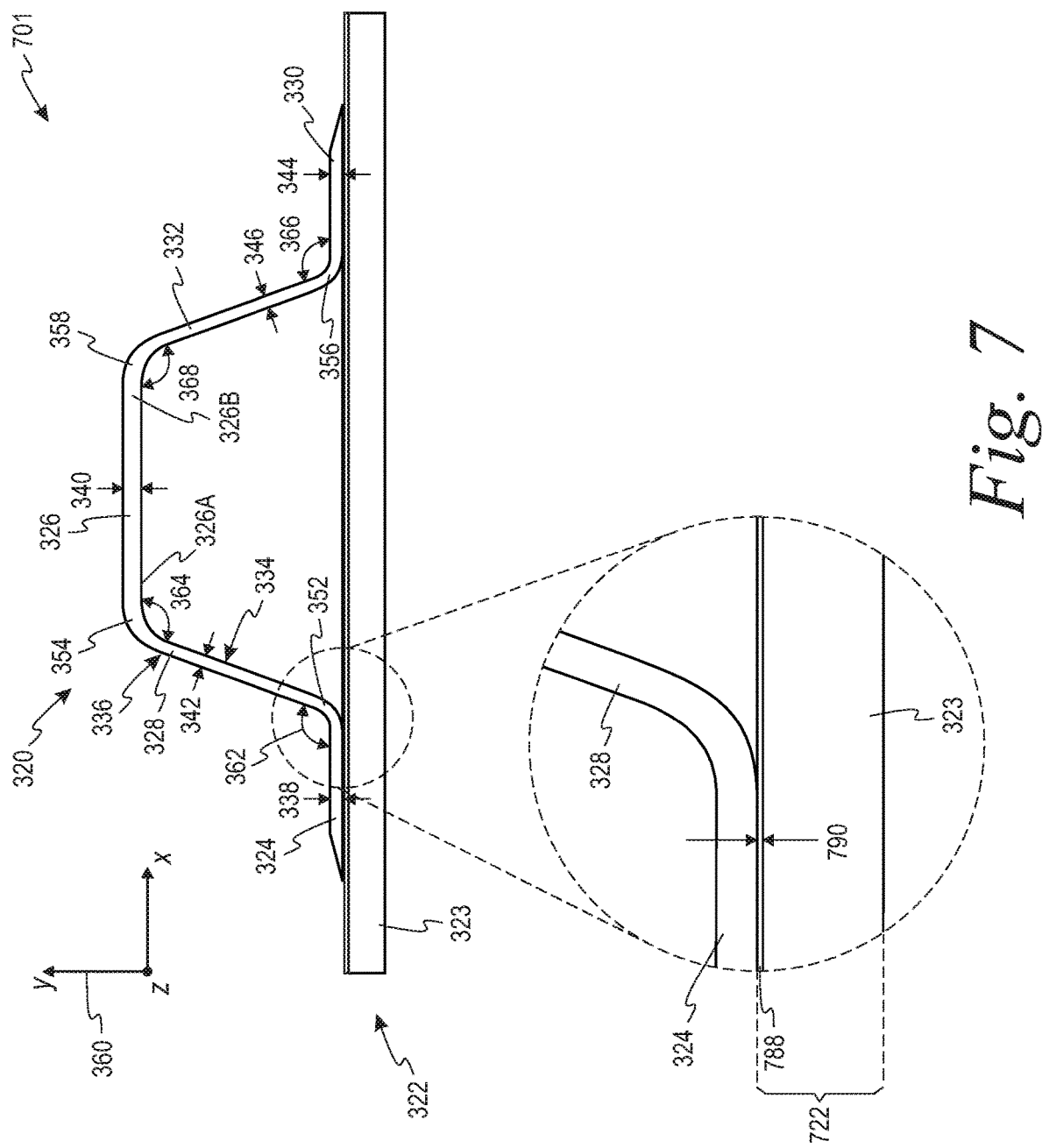

COMPOSITE STRINGER AND METHODS FOR FORMING A COMPOSITE STRINGER

FIELD

The present disclosure generally relates to composite structures and, more specifically, to composite stringers and methods for forming composite stringers.

BACKGROUND

Various structural components are used to form a typical aircraft. For example, a stringer is an elongate member that can be coupled to one or more skin panels to help carry and/or transfer a load from the skin panel to another structure of the aircraft (e.g., a frame, a rib, and/or a spar of the aircraft). In this way, the stringer can help to prevent buckling under compression or shear loads on the skin panels, and/or mitigate bending of the skin panels. For these and other reasons, the aircraft typically includes one or more stringers in a fuselage, wing assemblies, and/or an empennage of the aircraft.

Increasingly, aircraft are incorporating composite materials to help make the aircraft, among other things, lighter and more fuel-efficient. In particular, for example, the stringers and the skin panels may be made of composite materials. A stringer made from a composite material may be referred to as a "composite stringer."

As an example, one type of composite material commonly used in the aerospace industry is carbon fiber reinforced plastic ("CFRP"). CFRP generally includes one or more composite layers or plies laminated together to form a sheet, laminate or layup. Each of the composite layers or plies can include a reinforcement material and a matrix material. The matrix material surrounds, binds and supports the reinforcement material. The reinforcement material provides structural strength to the matrix material and the CFRP. The matrix material is generally a non-conductive polymer such as an epoxy resin. The reinforcement material generally consists of strands of carbon fiber, which are electrically conductive.

As used herein, the term "composite structure" means a structure that is manufactured, fabricated or assembled, in whole or in part, from one or more components made from CFRP (i.e., CFRP components) including, without limitation, aerospace structures, such as aircraft ribs, spars, panels, fuselages, wings, wing boxes, fuel tanks and tail assemblies. In order to manufacture, assemble, form or fabricate a composite structure, CFRP sheets, laminates or layups may be cut or trimmed to a desired shape or size after the composite layers or plies are laid up, laminated and cured to form CFRP components.

SUMMARY

In an example, a composite stringer assembly is described. The composite stringer assembly includes a composite stringer and a radius filler. The composite stringer includes (i) a skin flange configured to be coupled to a support structure, (ii) a web, (iii) a lower corner portion extending from the skin flange to the web, (iv) an inner surface extending along the skin flange, the lower corner portion, and the web, and (v) an outer surface extending along the skin flange, the lower corner portion, and the web. At the lower corner portion, the outer surface is defined by a first radius of curvature, and the first radius of curvature is substantially constant between the skin flange and the web. The skin flange, the lower corner portion, and the web include a plurality of plies of composite material. The support structure includes at least one of a skin of a vehicle or a base charge. The radius filler includes a first surface coupled to the inner surface at the lower corner portion, a second surface configured to couple to the support structure, and a third surface extending between the first surface and the second surface. The first surface of the radius filler is defined by a second radius of curvature, and the second radius of curvature is substantially constant between the second surface and the third surface.

In another example, a composite stringer assembly is described. The composite stringer assembly includes a plurality of composite stringers and a radius filler. The plurality of composite stringers are axially aligned with each other along a longitudinal axis of the plurality of composite stringers. Each composite stringer includes: (i) a skin flange configured to be coupled to a support structure, (ii) a web, (iii) a top flange, (iv) a lower corner portion extending from the skin flange to the web, (v) an upper corner portion extending from the web to the top flange, (vi) an inner surface extending along the skin flange, the lower corner portion, the web, the upper corner portion, and the top flange, and (vii) an outer surface extending along the skin flange, the lower corner portion, the web, the upper corner portion, and the top flange. The outer surface is defined by a first radius of curvature.

The radius filler includes (a) a first surface coupled to the inner surface at the lower corner portion of each composite stringer, (b) a second surface configured to couple to the support structure, and (c) a third surface extending between the first surface and the second surface. The first surface of the radius filler is defined by a second radius of curvature. Along the longitudinal axis: (1) the composite stringer assembly has a total length that is equal to a sum of a respective length of each composite stringer, (2) the first radius of curvature is substantially constant over the total length of the composite stringer assembly, and (3) the second radius of curvature is substantially constant over the total length of the composite stringer assembly.

The support structure includes at least one of a skin of a vehicle or a base charge. The top flange of a first composite stringer of the plurality of composite stringers has a gage that is different than a gage of the top flange of a second composite stringer of the plurality of composite stringers.

In another example, a method of forming a composite stringer assembly is described. The method includes forming a plurality of composite stringers. Forming the plurality of composite stringers includes, for each composite stringer, forming, from a plurality of plies of composite material: (i) a skin flange, (ii) a web, (iii) a top flange, (iii) a lower corner portion extending from the skin flange to the web, (iv) an upper corner portion extending from the web to the top flange, (v) an inner surface extending along the skin flange, the lower corner portion, the web, the upper corner portion, and the top flange, and (vi) an outer surface extending along the skin flange, the lower corner portion, the web, the upper corner portion, and the top flange. Forming the plurality of composite stringers also includes, for each composite stringer, forming, at the lower corner portion, the outer surface with a first radius of curvature.

The method also includes positioning, on a support structure, the plurality of composite stringers in axial alignment with each other along a longitudinal axis. The support structure includes at least one of a skin of a vehicle or a base charge. The method further includes coupling, to the inner surface of each composite stringer, a radius filler at the lower corner portion of the composite stringer. A first surface of the radius filler is defined by a second radius of curvature.

Forming the plurality of composite stringers can include forming the top flange of a first composite stringer of the plurality of composite stringers with a gage that is different than a gage of the top flange of a second composite stringer of the plurality of composite stringers. Along the longitudinal axis: (a) the composite stringer assembly has a total length that is equal to a sum of a respective length of each composite stringer, (b) the first radius of curvature is substantially constant over the total length of the composite stringer assembly, and (c) the second radius of curvature is substantially constant over the total length of the composite stringer assembly.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 7 depicts a side view of a composite structure assembly, according to an example.

DETAILED DESCRIPTION

Figure 1:
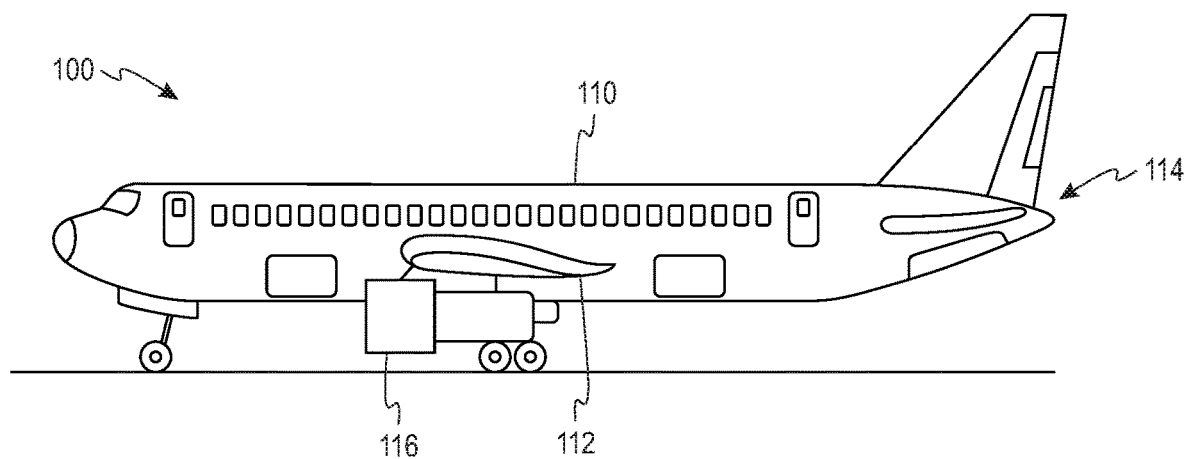
FIG. 1 depicts a side view of an aircraft, according to an example.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

By the term "approximately" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

By the term "substantially constant" with reference to a amounts or measurement values described herein, it is meant that the recited characteristic, parameter, or value remains substantially unchanged, but that deviations or variations, including for example, tolerances, measurement error, measurement accuracy limitations and other factors known to those of skill in the art, may occur in amounts that do not preclude the effect the characteristic was intended to provide.

As used herein, the terms "greater than" and "less than" are intended to have their common meaning. Thus, a first value is greater than a second value if the first value is greater than the second value by any amount. Similarly, a first value is less than a second value if the first value is less than the second value by any amount.

As noted above, aircraft generally include one or more composite stringers coupled to one or more skin panels to help carry and/or transfer a load from the skin panels to another structure of the aircraft (e.g., a frame, a rib, and/or a spar of the aircraft). The composite stringers may be formed in a plurality of different shapes such as, for example, hat-shaped stringers, C-shaped stringers, J-shaped stringers, Y-shaped stringers, and/or Z-shaped stringers. Additionally, for example, many types of composite stringers include at least a skin flange that is configured to couple to a support structure (e.g., a skin panel), a top flange, and a web extending between the skin flange and the top flange.

In general, a load bearing performance of a composite stringer may be related to a gage of one or more portions of the composite stringer (i.e., a gage of the skin flange, the top flange, and/or the web). The gage of a given portion of the composite stringer is a measurement of a thickness between (i) an inner surface of the given portion, which faces toward the support structure when the skin flange is coupled to the composite stringer, and (ii) an outer surface of the given portion, which faces away from the support structure when the skin flange is coupled to the composite stringer.

Conventionally, the skin flange, the web, and the top flange are all formed with a common or substantially equal gage. However, in some implementations where the top flange tends to bear a greater amount of a load relative to the skin flange and the web. As such, for a conventional composite stringer, the gage of the skin flange, the top flange, and the web may be based on a load bearing requirement of the top flange. As a result, the web and/or the skin flange of the conventional composite stringer generally have a greater gage than is needed to meet the load bearing requirements of the web and/or the skin flange. This excess gage of the web and/or the skin flange can impose a weight penalty and/or increased manufacturing costs.

Additionally, for example, because the skin flange conventionally has the same gage as the top flange, the skin flange may have a stiffness that is relatively greater than a stiffness of the support structure (e.g., the skin panel) to which the skin flange is coupled. As used herein, the term "stiffness" means an extent to which an object (e.g., the skin flange and/or the support structure) resists deformation in response to an applied force. In some instances, a relatively large mismatch between the stiffness of the skin flange and the support structure may lead to delamination of the composite stringer from the support structure under certain mechanical loads.

Also, for example, as different portions of the aircraft may be expected to experience different loads, the gage of the composite stingers may vary from stringer to stringer. For instance, the aircraft can include some composite stringers having relatively larger gages at locations on the aircraft that are expected to experience a relatively greater amount of loading and other composite stringers having relatively smaller gages at locations on the aircraft that are expected to experience a relatively lesser amount of loading. Because different composite stringers at different locations in an aircraft may have different gages, designing and manufacturing the composite stringers can be relatively complex and costly due to, for example, increased weight considerations and/or different tooling requirements to address the individual stringer designs.

One approach to strengthening and improving a durability of conventional composite stringers is to couple a radius filler to the composite stringer at a "radius filler region" or "noodle region" between the composite stringer and the support structure. In general, the radius filler region is formed between the support structure and a corner portion of the composite stringer, which is generally a curved or bent portion of the composite stringer between the skin flange and the web. The radius filler can be a composite material (e.g., CFRP) positioned in the radius filler region. Although the radius filler can help strengthen and improve the durability of the composite stringer, the radius filler incurs a weight penalty (which, in the context of a vehicle, can undesirably impact fuel efficiency and/or payload carrying capabilities).

Example composite stringers, composite stringer assemblies, and methods described herein can address at least some limitations of existing composite stringers. For instance, within examples, a composite stringer can include a skin flange having a first gage, a top flange having a second gage, and a web having a third gage and extending between the skin flange and the top flange. The second gage of the top flange is greater than the first gage of the skin flange and the third gage of the web. As such, the top flange can have a relatively greater gage to meet load bearing requirements, whereas the skin flange and the web can have a relatively lesser gage to reduce a weight of the composite stringer, reduce a cost of manufacture of the composite stringer, and/or mitigate delamination at an interface between the skin flange and the support structure.

The first gage of the skin flange can be configured such that a stiffness of the skin flange is approximately equal to a stiffness of the support structure. This can help to allow the skin flange to flex with the support structure under mechanical loads and, thus, further mitigate delamination at the interface between the skin flange and the support structure. Within examples, this improved flexibility of the skin flange can be achieved while having a relatively larger gage at the top flange to meet load bearing performance requirements of the composite stringer.

Additionally, within examples, when the first gage of the skin flange and the third gage of the web are reduced (e.g., relative to a conventional composite stringer having the same second gage at the top flange), a size and/or a shape of the radius filler can be reduced. This can help to further reduce a weight and/or a cost to manufacture the composite stringer.

The composite stringer and/or a radius filler can additionally or alternatively include one or more surfaces defined by constant radii of curvature. For example, at an interface between the composite stringer and the radius filler, the composite stringer and the radius filler can each be defined by a radius of curvature that is constant over a surface area of the interface. This can help to reduce a size of the radius filler, improve strength of the composite stringer assembly, simplify tooling requirements for forming the composite stringer assembly, and/or reduce variability among a plurality of composite stringers.

Forming composite stringers with a plurality of different gages and/or with constant radii of curvature can help to reduce (or may minimize) a variability among a plurality of composite stringers at certain portions of the composite stringers. For instance, in an example, a plurality of composite stringers can have different second gages at the top flanges, but the composite stringers can have (i) the same first gages at the skin flanges, (ii) the same third gages at the webs, and/or (iii) the same radii of curvature at the interfaces with a radius filler. This can help reduce manufacturing costs and/or simplify tooling requirements for forming a composite stringer assembly including the composite stringers at least because the radius filler can extend along the composite stringers with a constant shape and/or a constant size that is compatible with all of the composite stringers.

In additional or alternative examples to those previously described, a composite stringer assembly can include a composite stringer, a support structure, and an overwrap coupled to the inner surface of the composite stringer and the support structure. In this arrangement, the overwrap layer can help to support the web, the skin flange, and/or the radius filler and, thus, help to mitigate (or may prevent) delamination between the composite stringer, the radius filler, and/or the support structure. Providing the overwrap in this arrangement can additionally or alternatively help to reduce the first gage of the skin flange, reduce the third gage of the web, and/or reduce a size of the radius filler (e.g., relative to composite stringer assemblies that omit the overwrap layer).

Referring now to FIG. 1, a side view of an aircraft 100 is depicted, according to an example. As shown in FIG. 1, the aircraft 100 can include a plurality of assemblies such as, for example, a fuselage 110, a plurality of wing assemblies 112, and an empennage 114. One or more propulsion units 116 can be coupled to the wing assemblies 112, the fuselage 110, and/or other portions of the aircraft 100. Although the aircraft 100 shown in FIG. 1 is generally representative of a commercial passenger aircraft, the teachings of the present disclosure can be applied to other passenger aircraft, cargo aircraft, military aircraft, rotorcraft, and other types of vehicles such as, for examples, aerospace vehicles (e.g., satellites, space launch vehicles, and/or rockets), watercraft, trains, automobiles, trucks, buses, or other suitable structures having one or more composite stringers.

Within examples, the fuselage 110, the wing assemblies 112, and/or the empennage 114 can include one or more composite structures. In general, a composite structure is a structure that is formed from a plurality of composite materials that are bound together with sufficient strength that the composite materials act as a single unit from a structural point of view. A composite material (also called a composition material or shortened to composite, which is the common name) is a material made from two or more constituent materials with significantly different physical or chemical properties that, when combined, produce a material with characteristics different from the individual components.

Figure 2:
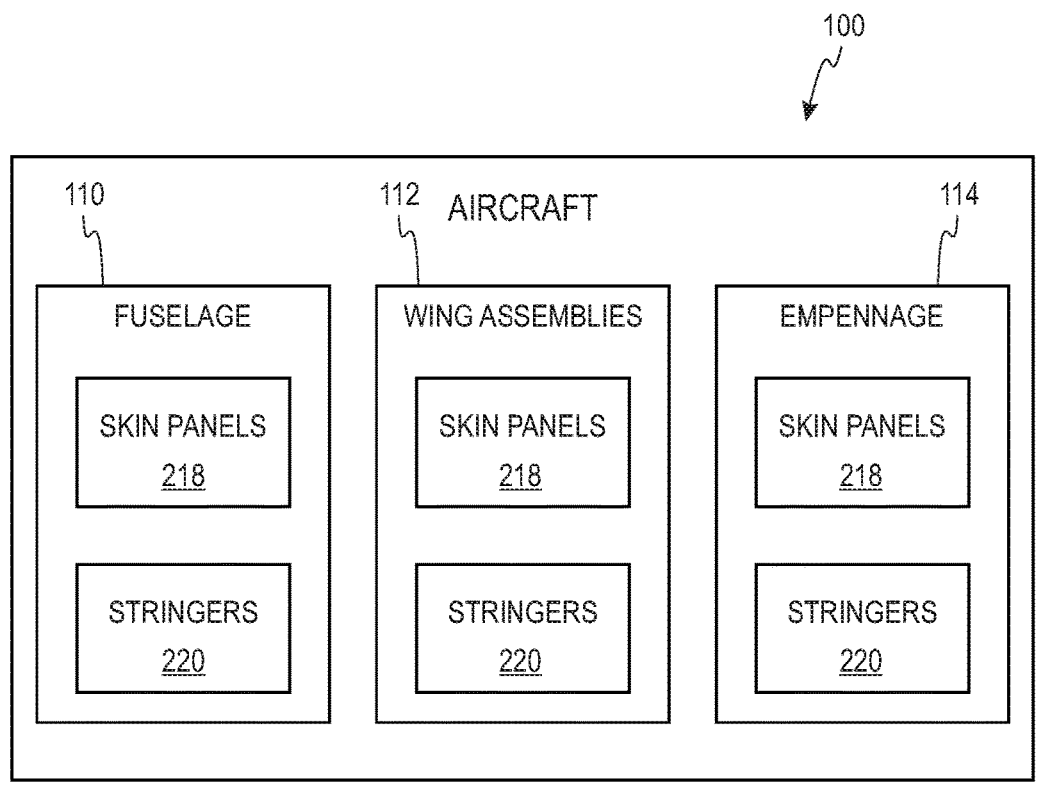
FIG. 2 depicts a simplified block diagram of the aircraft, according to an example.

FIG. 2 is a simplified block diagram of the aircraft 100, including the fuselage 110, the wing assemblies 112, and the empennage 114, according to an example. As shown in FIGS. 1-2, the fuselage 110, the wing assemblies 112, and the empennage 114 can each include one or more skin panels 218 and one or more composite stringers 220. As noted above, the composite stringers 220 are configured to provide a predetermined flexural and torsional stiffness to the fuselage 110, the wing assemblies 112, and the empennage 114. For example, the composite stringers 220 can be configured to transfer bending loads in the skin panels 218, and stiffen the skin panels 218 so that the skin panels 218 do not buckle under loading.

Although FIG. 2 depicts the composite stringers 220 for the fuselage 110, the wing assemblies 112, and the empennage 114, the aircraft 100 can include the composite stringers 220 in one or more other assemblies of the aircraft 100 to stiffen and/or transfer loads on those other assemblies. Within examples, the composite stringers 220 in the fuselage 110, the wing assemblies 112, and the empennage 114 may be subject to uniaxial tension and compression and out-of-plane buckling. The composite stringers 220 in the fuselage 110, the wing assemblies 112, and the empennage 114 may also be subject to secondary loads including shear and bearing loads. A component under compression tends to twist, cripple and buckle. The composite stringers 220 provide strength, resist compression and tension, and provide stability against twisting, crippling, and buckling forces. For example, the composite stringers 220 can provide support structures within the fuselage 110, the wing assemblies 112, or the empennage 114 that may brace against various exerted forces.

Figure 3A:
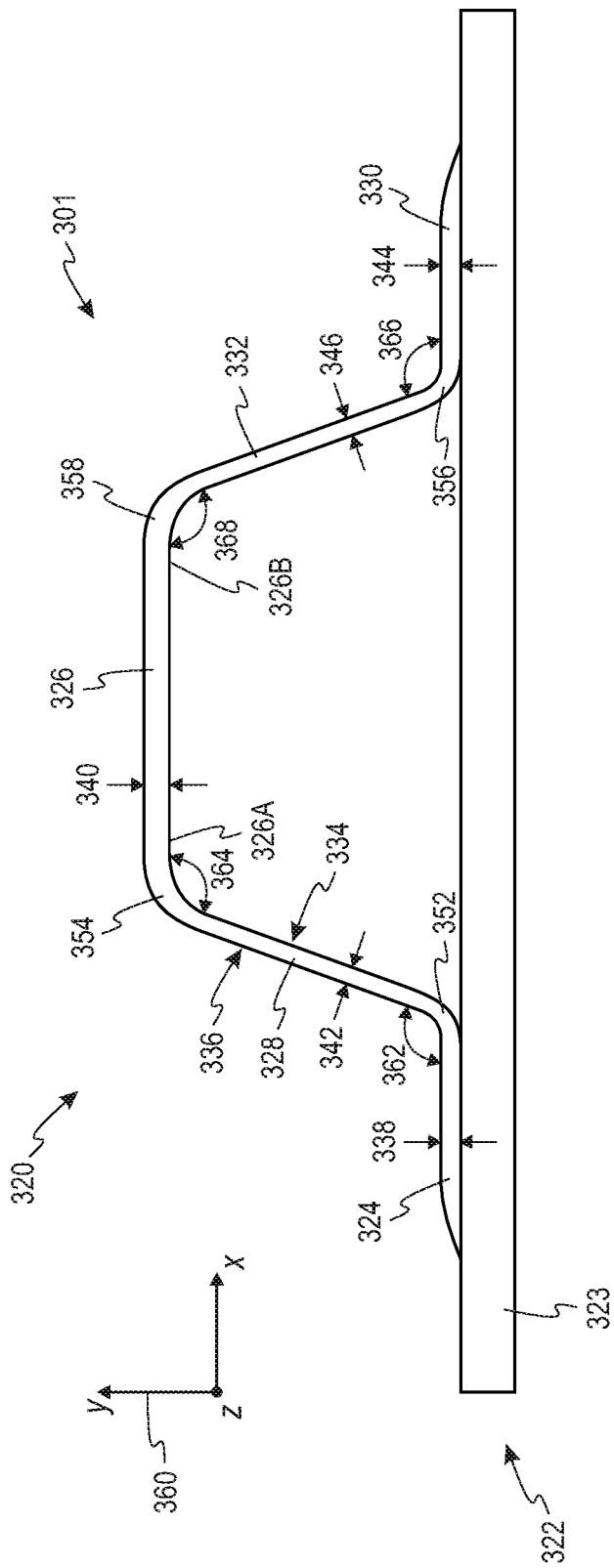
FIG. 3A depicts a side view of a composite structure assembly, according to an example.
Figure 3B:
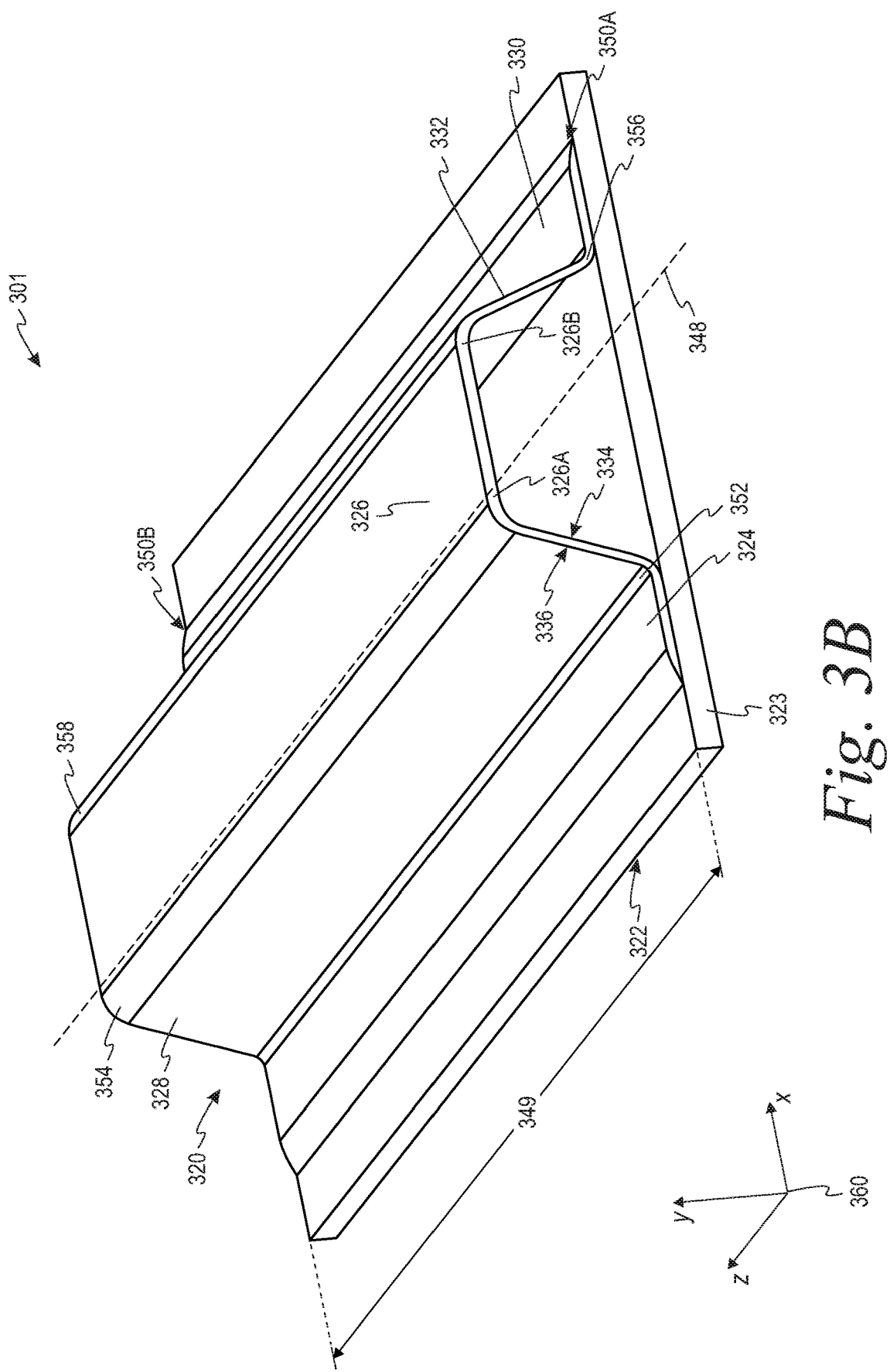
FIG. 3B depicts a perspective view of the composite structure assembly shown in FIG. 3A, according to an example.

Referring now to FIGS. 3A-3B, a composite stringer assembly 301 including a composite stringer 320 coupled to a support structure 322 is illustrated according to an example. In particular, FIG. 3A depicts a side view of the composite stringer 320 and the support structure 322, and FIG. 3B depicts a perspective view of the composite stringer 320 and the support structure 322.

As shown in FIGS. 3A-3B, the composite stringer 320 includes a skin flange 324 configured to be coupled to the support structure 322, a top flange 326, and a web 328 extending between the skin flange 324 and the top flange 326. In FIGS. 3A-3B, the composite stringer 320 is in the form of a hat-shaped stringer. As such, the web 328 can extend from a first side 326A of the top flange 326, and the composite stringer 320 can further include a second skin flange 330 configured to be coupled to the support structure 322 and a second web 332 extending between the second skin flange 330 and a second side 326B of the top flange 326.

Although the composite stringer 320 shown in FIGS. 3A-3B is a hat-shaped stringer, as described below with respect to FIGS. 12-15, the principles described with respect to FIGS. 3A-3B can extend to apply to other types of composite stringers (e.g., J-shaped stringers, C-shaped stringers, I-shaped stringers, and/or Z-shaped stringers). In particular, the concepts and principles described herein can be applied to any type of composite stringer that includes at least one skin flange, at least one web, and a top flange.

As noted above, the skin flange 324 and the second skin flange 330 are configured to be coupled to the support structure 322. For example, the skin flange 324 and the second skin flange 330 can extend in a plane that is substantially parallel to a surface of the support structure 322 to which the skin flange 324 and the second skin flange 330 are coupled. This can help to promote a relatively strong bond between the composite stringer 320 and the support structure 322 at an interface between (i) the skin flange 324 and the second skin flange 330 and (ii) the support structure 322 due, at least in part, to a relatively large surface area of the interface.

In FIGS. 3A-3B, the support structure 322 is a skin 323 of a vehicle (e.g., the skin panel 210 of the fuselage 110, the wing assemblies 112, and/or the empennage 114). However, as described below, the support structure 322 can additionally or alternatively include a base charge coupled to the skin 323 of the vehicle. The base charge can include a plurality of plies of composite material and can be used, for example, to help support and cushion the composite stringer 320 on the skin 323. Thus, more generally, the support structure 322 can include at least one of the skin 323 of the vehicle or the base charge.

The skin flange 324, the top flange 326, and the web 328, the second skin flange 330, and the second web 332 include a plurality of plies of composite material. As one example, the composite material can be carbon fiber reinforced plastic ("CFRP"). Each ply can include a reinforcement material and a matrix material. The matrix material can bind and supports the reinforcement material. As examples, the matrix material can include a non-conductive polymer such as an epoxy resin, and the reinforcement material can include one or more strands carbon fiber.

Additionally, as shown in FIGS. 3A-3B, the composite stringer 320 can include an inner surface 334 extending along the skin flange 324, the web 328, the top flange 326, the second web 332, and the second skin flange 330. The inner surface 334 faces the support structure 322 when the skin flange 324 and the second skin flange 330 are coupled to the support structure 322. The composite stringer 320 also includes an outer surface 336 extending along the skin flange 324, the web 328, and the top flange 326, the second web 332, and the second skin flange 330. The outer surface 336 faces away from the support structure 322 when the skin flange 324 and the second skin flange 330 are coupled to the support structure 322.

In this arrangement, the skin flange 324 has a first gage 338, the top flange 326 has a second gage 340, and the web 328 has a third gage 342. The first gage 338, the second gage 340, and the third gage 342 are respective thicknesses between the inner surface 334 and the outer surface 336 at the skin flange 324, the top flange 326, and the web 328, respectively. As shown in FIGS. 3A-3B, the second gage 340 of the top flange 326 is greater than the first gage 338 of the skin flange 324 and the third gage 342 of the web 328. As used herein, the term "greater than" is intended to have its common meaning (i.e., that the second gage 340 is greater than the first gage 338 by any amount and the second gage 340 is greater than the third gage 342 by any amount).

In general, the top flange 326 bears a greater amount of a load on the skin 323 relative to the skin flange 324 and the web 328. By providing the top flange 326 with the second gage 340, which is greater than the first gage 338 of the skin flange 324 and the third gage 342 of the web 328, the strength-to-weight ratio of the composite stringer 320 can be improved relative to a composite stringer in which the skin flange 324, the web 328, and the top flange 326 all have the same gage. Additionally, as described in further detail below, reducing the first gage 338 of the skin flange 324 and the third gage 342 of the web 328 can provide a number of additional benefits.

In FIGS. 3A-3B, the third gage 342 of the web 328 is approximately equal to the first gage 338 of the skin flange 324. As described in further detail below with respect to FIGS. 8A-8B, this can help to reduce (or may minimize or may eliminate) an amount of a radius filler that is coupled to the composite stringer 320. However, in other examples, the third gage 342 of the web 328 can be different than the first gage 338 of the skin flange 324.

Also, within examples, the second skin flange 330 can have a fourth gage 344 and the second web 332 can have a fifth gage 346. The fourth gage 344 and the fifth gage 346 can be respective thicknesses between the inner surface 334 and the outer surface 336 at the second skin flange 330 and the second web 332, respectively. In this example, the second gage 340 of the top flange 326 can be greater than the fourth gage 344 of the second skin flange 330 and the fifth gage 346 of the second web 332. As noted above, this can beneficially help to improve the strength-to-weight ratio of the composite stringer 320 relative to a composite stringer in which the second skin flange 330, the second web 332, and the top flange 326 all have the same gage Additionally, in FIGS. 3A-3B, the fourth gage 344 of the second skin flange 330 can be approximately equal to the fifth gage 346 of the second web 332. As described in further detail below with respect to FIGS. 8A-8B, this can help to reduce (or may minimize or may eliminate) an amount of a radius filler that is coupled to the composite stringer 320. However, in other examples, the third gage 342 of the web 328 can be different than the first gage 338 of the skin flange 324.

In one example, the second gage 340 can be approximately 1.5 millimeters (mm) to approximately 16.0 mm. In this example, the first gage 338 and the third gage 342 can be less than the second gage 340 and within a range of approximately 0.6 mm to approximately 12.0 mm. In another example, the second gage 340 can be approximately 2.0 mm to approximately 14.0 mm. In this example, the first gage 338 and the third gage 342 can be less than the second gage 340 and within a range of approximately 0.8 mm to approximately 10.0 mm. In a further example, the second gage 340 can be approximately 2.4 mm to approximately 12.0 mm. In this example, the first gage 338 and the third gage 342 can be less than the second gage 340 and within a range of approximately 1.0 mm to approximately 8.0 mm. Other examples are also possible.

In one example, the second gage 340 can be approximately 10 percent to approximately 500 percent greater than the first gage 338 and the third gage 342. In another example, the second gage 340 can be approximately 14 percent to approximately 300 percent greater than the first gage 338 and the third gage 342. In yet another example, the second gage 340 can be approximately 30 percent to approximately 200 percent greater than the first gage 338 and the third gage 342. The foregoing are illustrative examples of the second gage 340 being greater than the first gage 338 and/or the third gage 342. Other examples are also possible.

Within examples, the first gage 338 of the skin flange 324 and/or the fourth gage 344 of the second skin flange 330 can be based, at least in part, on a stiffness of the skin 323 of the vehicle. For instance, a stiffness of the skin flange 324 and a stiffness of the second skin flange 330 can be related to the first gage 338 of the skin flange 324 and the fourth gage 344 of the second skin flange 330, respectively (e.g., a relative large gage may contribute to a relatively high level of stiffness, whereas a relatively small gage may contribute to a relatively low level of stiffness).

In general, a relatively large mismatch between (i) the stiffness of the skin flange 324 and/or the second skin flange 330 and (ii) the skin 323 of the vehicle may lead to delamination of the composite stringer 320 from the skin 323 under certain mechanical loads. Within examples, the composite stringer assembly 301 of FIG. 3 can reduce (or may prevent) such delamination due to stiffness mismatches. For instance, in some examples, the first gage 338 of the skin flange 324 and the fourth gage 344 of the second skin flange 330 can be configured such that a stiffness of the skin flange 324 and/or a stiffness of the second skin flange 330 is approximately equal to the stiffness of the skin 323 of the vehicle. This can help to enhance (or may maximize) energy absorption due to an impact and/or a load at an interface between (i) the skin 323 of the vehicle and (ii) the skin flange 324 or the second skin flange 330, and mitigate (or may prevent) delamination between the composite stringer 320 and the skin 323.

As described above, the top flange 324 has the second gage 340, which is greater than the first gage 338 of the skin flange 324 and the fourth gage 344 of the second skin flange 330. As such, the top flange 326 can have a stiffness that is greater than the stiffness of the skin flange 324 and/or the second skin flange 330. Thus, the composite stringer 320 can advantageously have a greater amount of stiffness at the top flange 326 where such stiffness is beneficial to carry and transfer loads, and a lesser amount of stiffness at the skin flange 324 and/or the second skin flange 330 where it is beneficial to allow the composite stringer 320 to flex with the skin 323 of the vehicle so as to mitigate delamination.

As shown in FIG. 3B, the composite stringer 320 has a longitudinal axis 348 and, along a longitudinal axis 348, the composite stringer 320 has a length 349 between a first end 350A of the composite stringer 320 and a second end 350B of the composite stringer 320. In FIG. 3B, along the longitudinal axis 348: the first gage 338 of the skin flange 324, the third gage 342 of the web 328, and/or the second gage 340 of the top flange 326 are each substantially constant over the length 349 of the composite stringer 320. Within examples, this can help to simplify stringer fabrication, reduce stringer tooling cost, and/or reduce fabrication time. This can additionally or alternatively help to improve the quality of the composite stringer 320 due to, for example, reduced (or minimized) variation of the first gage of skin flange 324 and the third gage 342 of the web 328 over the length 349. Similarly, along the longitudinal axis 348: the fourth gage 344 of the second skin flange 330 and the fifth gage 346 of the second web 332 are each substantially constant over the length 349 of the composite stringer 320.

As noted above, the skin flange 324, the top flange 326, and the web 328, the second skin flange 330, and the second web 332 include the plurality of plies of composite material. In an example, the plurality of plies of composite material include a plurality of fibers, and the plurality of fibers include approximately 30 percent or more of the skin flange 324, the top flange 326, and the web 328, the second skin flange 330, and the second web 332 along the longitudinal axis. This can, for example, improve a stiffness of the top flange 326 while reducing weight, fabrication costs, and/or material costs.

In one example, the plurality of plies that form the composite stringer 320 can be laid up at traditional ply angles relative to the longitudinal axis 348. As such, the plurality of plies of the composite material can each have a ply angle, relative to the longitudinal axis 348 of the composite stringer 320, which is equal to any one of the group of ply angles consisting of 0 degrees, +45 degrees, −45 degrees, and 90 degrees. In another example, the plurality of plies can be laid up at nontraditional ply angles relative to the longitudinal axis 348. For instance, at least one ply of the plurality of plies of composite material can have a ply angle, relative to the longitudinal axis 348 of the composite stringer 320, which is not equal to any one of a group of ply angles consisting of: 0 degrees, +45 degrees, −45 degrees, and 90 degrees. This can, for example, help provide the composite stringer 320 with sufficient flexibility to fit into a contoured panel surface and/or improve fabrication quality.

Within examples, the composite stringer 320 can further include one or more corner portions, which each provides a transition section between two other portions of the composite stringer 320 (i.e., between two of the skin flange 324, the web 328, the top flange 326, the second web 332, and the second skin flange 330). For instance, in FIGS. 3A-3B, the corner portion(s) of the composite stringer 320 can include (i) a lower corner portion 352 extending from the skin flange 324 to the web 328, (ii) an upper corner portion 354 extending from the web 328 to the top flange 326, (iii) a second lower corner portion 356 extending from the second skin flange 330 to the second web 332, and/or (iv) a second upper corner portion 358 extending from the second web 332 to the top flange 326. In implementations in which the composite stringer 320 includes two or more corner portions, the term "lower" means closer to the support structure 322 than the top flange 326 when the composite stringer 320 is coupled to the support structure 322, and the term "upper" means closer to the top flange 326 than the support structure 322 when the composite stringer 320 is coupled to the support structure 322. However, in implementations in which the composite stringer 320 includes a single corner portion, the terms "lower" and "upper" may be used interchangeably unless context dictates otherwise.

In general, the lower corner portion 352 can provide a transition section between the skin flange 324 and the web 328, whereas the upper corner portion 354 can provide a transition section between the web 328 and the top flange 326. Similarly, the second lower corner portion 356 can provide a transition section between the second skin flange 330 and the second web 332, whereas the second upper corner portion 358 can provide a transition section between the second web 332 and the top flange 326.

For example, in FIGS. 3A-3B, the skin flange 324, the web 328, the top flange 326, the second web 332, and the second skin flange 330 can be planar structures that each extend in a respective plane in space. The respective planes in which the skin flange 324, the web 328, the top flange 326, the second web 332, and the second skin flange 330 extend can be different from each other. As such, the lower corner portion 352, the upper corner portion 354, the second lower corner portion 356, and/or the second upper corner portion 358 can include a curved shape and/or a bent shape that facilitates transitioning from one plane to another.

For instance, FIGS. 3A-3B indicates a coordinate system 360, and FIG. 3A depicts the composite stringer assembly 301 in an X-Y plane of the coordinate system 360. As shown in FIGS. 3A-3B, the skin flange 324, the top flange 326, and the second skin flange 330 each extend in a respective plane parallel to an X-Z plane of the coordinate system 360, whereas the web 328 and the second web 332 can each extend in a respective plane that is transverse to the X-Z plane of the coordinate system 360. In this arrangement, the lower corner portion 352 can define an angle 362 between the skin flange 324 and the web 328, the upper corner portion 354 can define an angle 364 between the web 328 and the top flange 326, the second lower corner portion 356 can define an angle 366 between the second skin flange 330 and the second web 332, and the second upper corner portion 358 can define an angle 368 between the second skin flange 330 and the second web 332.

In one example, the angle 362 between the skin flange 324 and the web 328 can be between approximately 95 degrees and approximately 150 degrees, and the angle 366 between the second skin flange 330 and the second web 332 can be between approximately 95 degrees and approximately 150 degrees. In another example, the angle 362 and/or the angle 366 can be between approximately 100 degrees and approximately 135 degrees. This can help to enhance a stiffness, reduce a weight, reduce a cost of fabrication, and/or reduce a cost of material for the composite stringer 320. Additionally, in an example, the angle 364 between the web 328 and the top flange 326 can be between approximately 95 degrees and approximately 150 degrees, and the angle 368 between the second web 332 and the top flange 326 can be between approximately 95 degrees and approximately 150 degrees. In another example, the angle 364 and/or the angle 368 can be between approximately 100 degrees and approximately 135 degrees. This can also help to enhance a stiffness, reduce a weight, reduce a cost of fabrication, and/or reduce a cost of material for the composite stringer 320.

In the example shown in FIGS. 3A-3B, the skin flange 324, the web 328, the top flange 326, the second web 332, and the second skin flange 330 are planar structures. However, in other examples, the skin flange 324, the web 328, the top flange 326, the second web 332, and/or the second skin flange 330 can be nonplanar structures. For instance, the skin flange 324 and/or the second skin flange 330 can be a nonplanar structure so as to conform to a nonplanar shape of the support structure 322.

Additionally or alternatively, the lower corner portion 352, the upper corner portion 354, the second lower corner portion 356, and/or the second upper corner portion 358 can be configured to transition from one gage to another gage. For instance, in FIGS. 3A-3B, the upper corner portion 354 provides for transitioning from the second gage 340 of the top flange 326 to the third gage 342 of the web 328, where the second gage 340 is greater than the third gage 342. As such, the upper corner portion 354 can have a variable gage that decreases in a direction from the top flange 326 toward the web 328. Similarly, in FIGS. 3A-3B, the second upper corner portion 358 provides for transitioning from the second gage 340 of the top flange 326 to the fifth gage 346 of the second web 332. As such, the second upper corner portion 358 can have a variable gage that decreases from the top flange 326 toward the second web 332.

In FIGS. 3A-3B, the first gage 338 of the skin flange 324 is approximately equal to the third gage 342 of the web 328, and the fourth gage 344 of the second skin flange 330 is approximately equal to the fifth gage 346 of the second web 332. As such, in FIGS. 3A-3B, the lower corner portion 352 can have a gage that is approximately equal to the first gage 338 and the third gage 342, and the second lower corner portion 356 can have a gage that is approximately equal to the fourth gage 344 and the fifth gage 346. However, in other examples in which the skin flange 324, the web 328, the second skin flange 330, and/or the second web 332 have different gages relative to each other, the lower corner portion 352 and/or the second lower corner portion 356 can have a variable gage that increases or decreases between the skin flange 324, the web 328, the second skin flange 330, and/or the second web 332.

Within examples, to transition from one gage to another gage, the lower corner portion 352, the upper corner portion 354, the second lower corner portion 356, and/or the second upper corner portion 358 can include a plurality of continuous plies and one or more drop-off plies. In general, each continuous ply extends from a first end to a second end of the lower corner portion 352, the upper corner portion 354, the second lower corner portion 356, and/or the second upper corner portion 358. By contrast, each drop-off ply extends from the first end to a respective position of a tip of the drop-off ply between the first end and the second end. In this arrangement, there are fewer plies at the second end relative to the first end. Thus, by positioning the tips of the drop-off plies between the first end and the second end, the gage decreases from the first end to the second end so as to transition from one gage to another gage.

For example, in FIGS. 3A-3B, the plurality of plies of composite material can include a plurality of continuous plies and a plurality of drop-off plies. As noted above, in FIGS. 3A-3B, the upper corner portion 354 can facilitate transitioning from the second gage 340 of the top flange 326 to the third gage 342 of the web 328. In this example, the skin flange 324, the web 328, the upper corner portion 354, and the top flange 326 can include each continuous ply. Additionally, in this example, the top flange 326 and the upper corner portion 354 can include each drop-off ply, whereas the skin flange 324 and the web 328 can omit the drop-off plies. In particular, for instance, each drop-off ply can have a free end (i.e., a tip) at the upper corner portion 354 such that the drop-off ply does not extend to the web 328 and the skin flange 324. As described in further detail below, the free end of each drop-off ply can have a blunt-end shape and/or a tapered shape.

Figure 4:
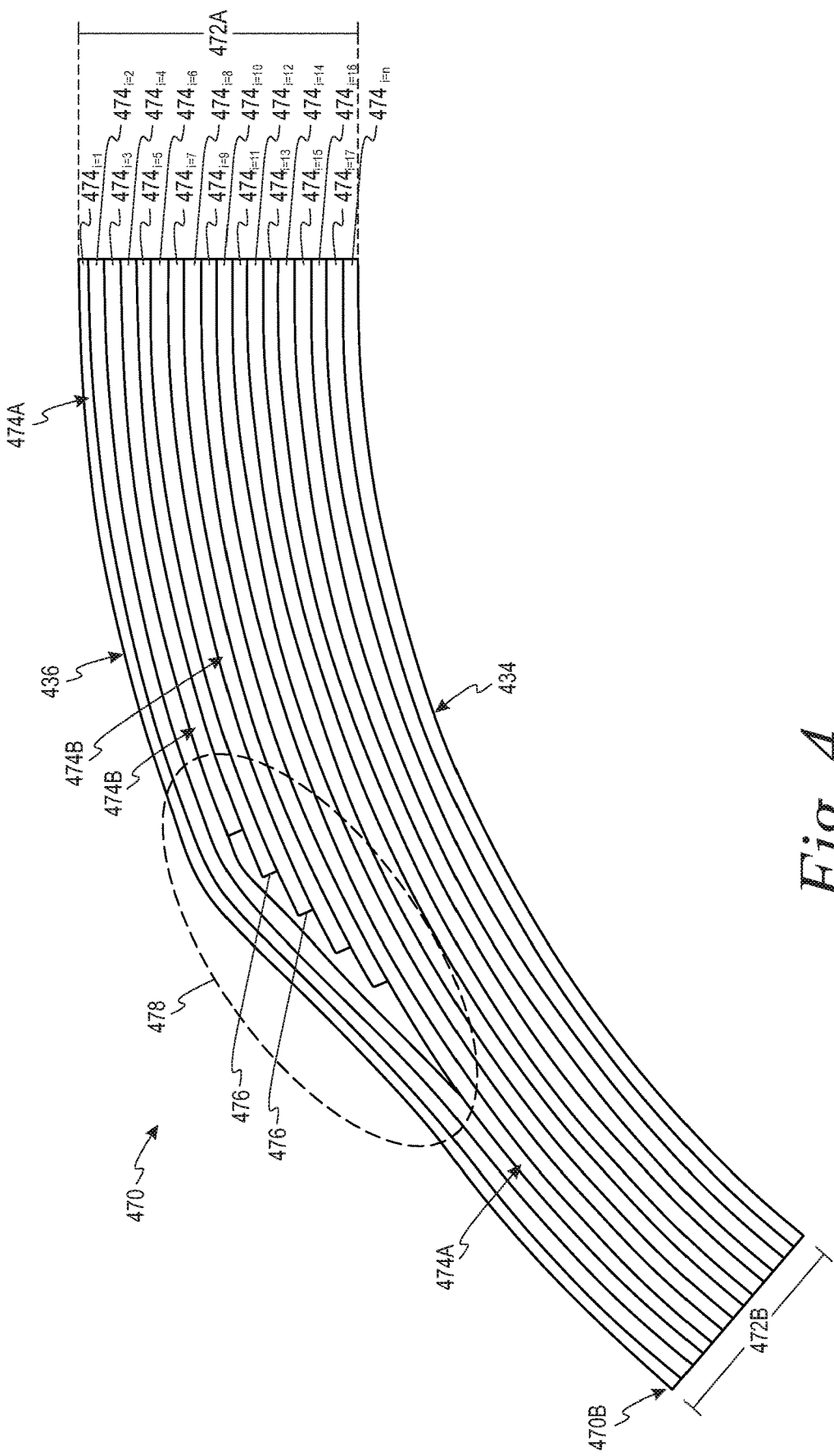
FIG. 4 depicts a composite structure, according to an example.
Figure 5:
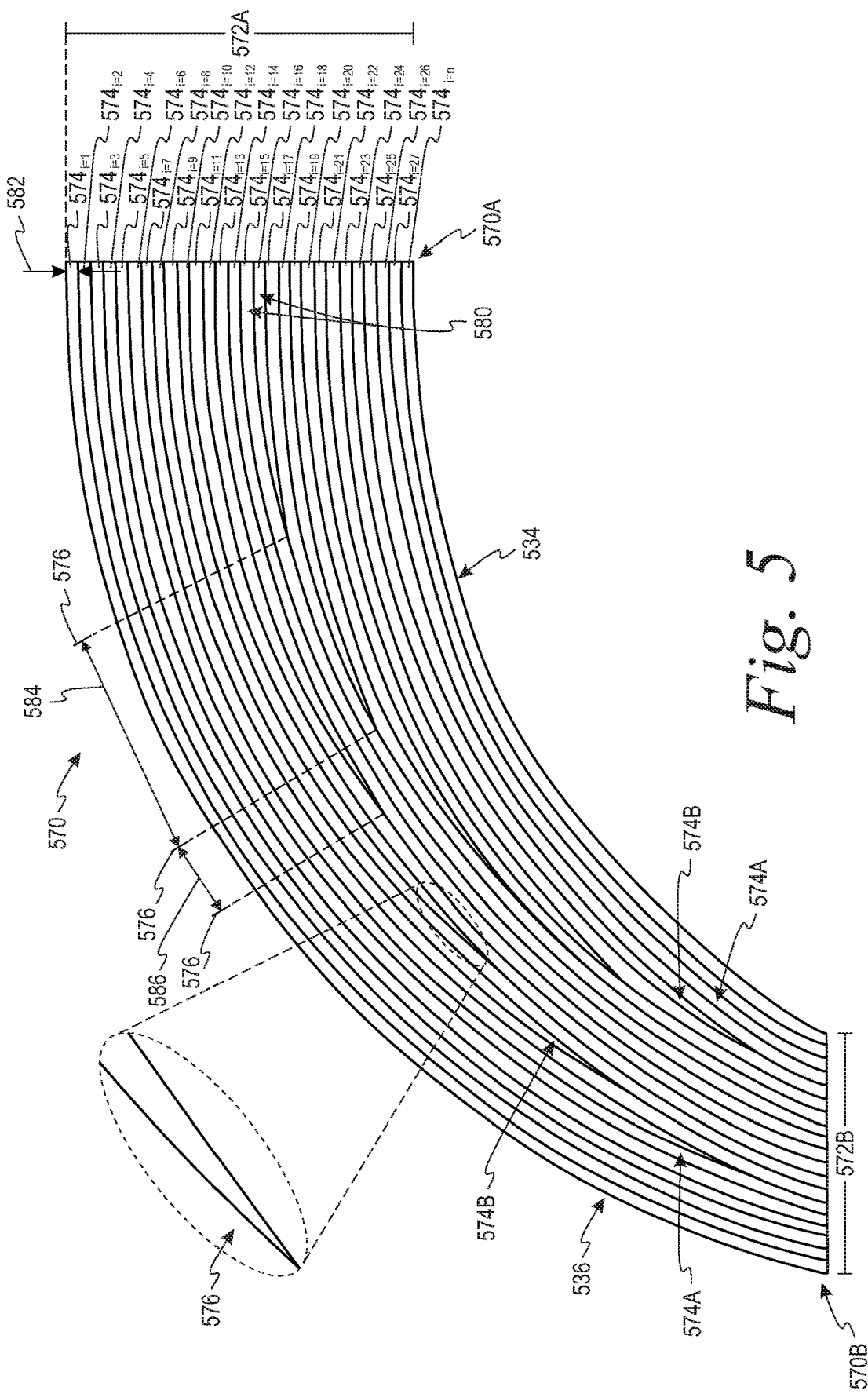
FIG. 5 depicts a composite structure, according to another example.
Figure 6:
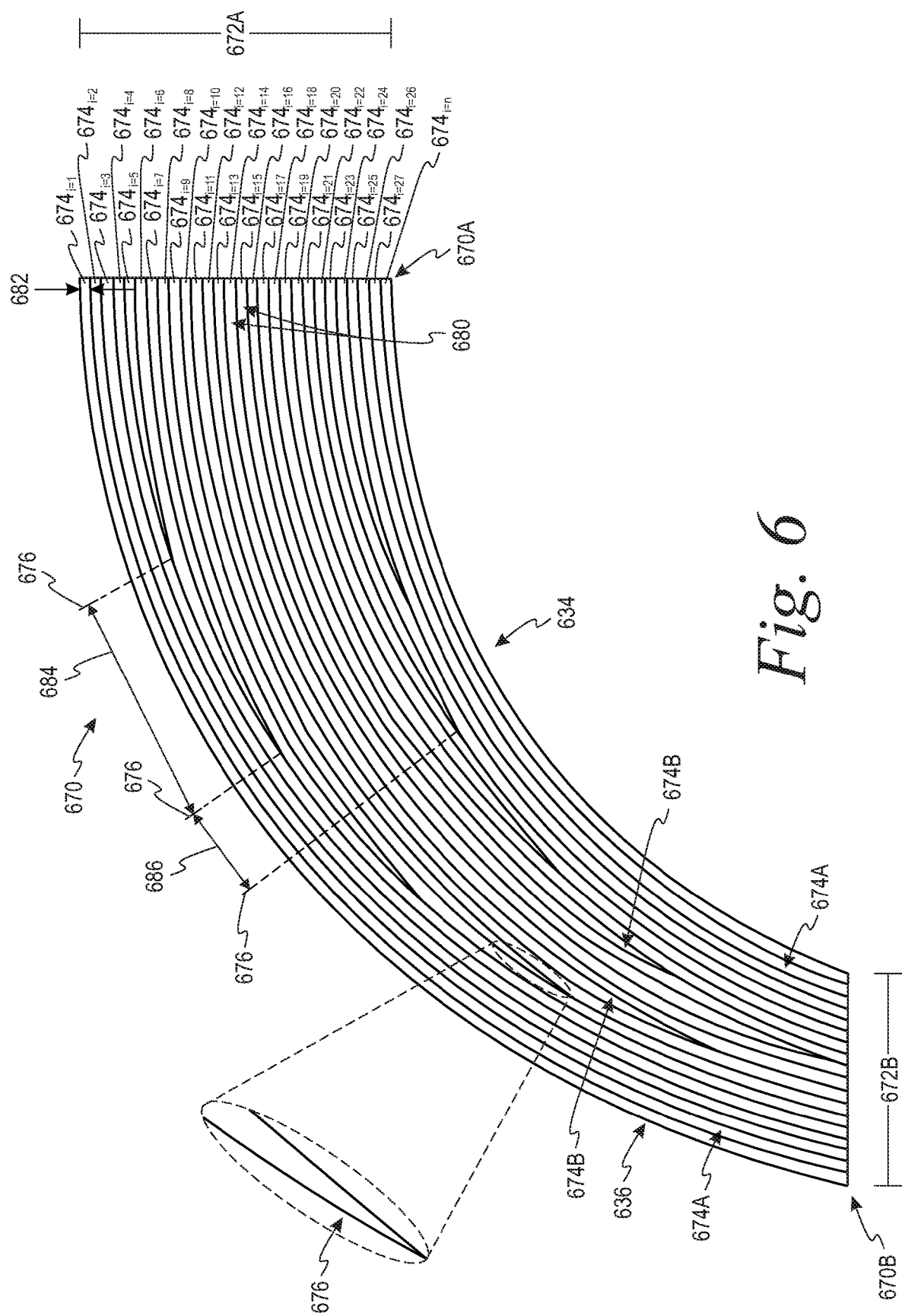
FIG. 6 depicts a composite structure, according to another example.

As examples, FIGS. 4-6 each depict a respective composite structure having a variable gage for transitioning from one gage to another gage. The composite structures shown in FIGS. 4-6 can be a corner portion of the composite stringer 320 such as, for example, the lower corner portion 352, the upper corner portion 354, the second lower corner portion 356, and/or the second upper corner portion 358 shown in FIGS. 3A-3B.

FIG. 4 depicts a composite structure 470 according to an example. As shown in FIG. 4, the composite structure 470 includes a first end 470A having a first gage 472A and a second end 470B having a second gage 472B, which is less than the first gage 472A of the first end 470A. The composite structure 470 also includes an inner surface 434 extending from the first end 470A to the second end 470B, and an outer surface 436 extending from the first end 470A to the second end 470B.

In one implementation, the first end 470A and the second end 470B can be respective interfaces between the composite structure 470 and other portions of a composite stringer (e.g., the composite stringer 320). For instance, in an example in which the composite structure 470 is the upper corner portion 354 in FIG. 3, the first end 470A can be a first interface between the upper corner portion 354 and the top flange 326, and the second end 470B can be a second interface between the upper corner portion 354 and the web 328 in FIG. 3. Also, in this example, the first gage 472A of the first end 470A of the composite structure 470 can be approximately equal to the second gage 340 of the top flange 326, and the second gage 472B of the second end 470B of the composite structure 470 can be approximately equal to the third gage 342 of the web 328.

In other examples (e.g., in which the composite structure 470 is the lower corner portion 352, the second lower corner portion 356, or the second upper corner portion 358), the first gage 472A of the first end 470A and the second gage 472B of the second end 470B can correspond to respective ones of the first gage 338, the second gage 340, the third gage 342, the fourth gage 344, and/or the fifth gage 346 to facilitate transitioning between corresponding ones of the skin flange 324, the web 328, the top flange 326, the second web 332, and the/or the second skin flange 330.

As also shown in FIG. 4, the composite structure 470 includes a plurality of plies $474_{i=1}$ to $474_{i=n}$ of composite material (hereinafter collectively referred to as "plies $474_i$") arranged in a stack between the inner surface 434 and the outer surface 436, where n is an integer value that is greater than or equal to two. In FIG. 4, the composite structure 470 includes a total of 18 plies $474_i$ (i.e., n=18). However, in other examples, the composite structure 470 can include a lesser quantity or a greater quantity of plies $474_i$.

In this arrangement, the first gage 472A of the first end 470A and the second gage 472B of the second end 470B are respective thicknesses between the inner surface 434 and the outer surface 436 at the first end 470A and the second end 470B, respectively. Further, the first gage 472A is related to a quantity of the plies $474_i$ at the first end 470A and the second gage 472B is related to a quantity of the plies $474_i$ at the second end 470B. For instance, in FIG. 4, the quantity of the plies $474_i$ at the first end 470A is greater than the quantity of the plies $474_i$ at the second end 470B such that the first gage 472A is greater than the second gage 472B.

Specifically, to vary the quantity of the plies $474_i$ between the first end 470A and the second end 470B, the plies $474_i$ of composite material include a plurality of continuous plies 474A and a plurality of drop-off plies 474B. In FIG. 4, each continuous ply 474A extends from the first end 470A to the second end 470B. Whereas, each drop-off ply 474B includes a tip 476, and each drop-off ply 474B extends from the first end 470A to a respective position of the tip 476 of the drop-off ply 474B between the first end 470A and the second end 470B.

Accordingly, while the continuous plies 474A are present at the first end 470A and the second end 470B, the drop-off plies 474B are present at the first end 470A and absent at the second end 470B. In this way, the drop-off plies 474B can contribute to the first gage 472A at the first end 470A, whereas the drop-off plies 474B do not contribute to the second gage 472B at the second end 470B due to the drop-off plies 474B terminating prior to the second end 470B (i.e., the tips 476 being located at the respective positions between the first end 470A and the second end 470B).

For clarity of illustration, in FIG. 4, a representative subset of the continuous plies 474A are labeled with reference number 474A and a representative subset of the drop-off plies 474B are labeled with reference number 474B. However, each of the plies $474_i$ that extends entirely from the first end 470A to the second end 470B is one of the continuous plies 474A, and each of the plies $474_i$ that terminates between the first end 470A and the second end 470B is one of the drop-off plies 474B. Specifically, in FIG. 4, the plies $474_{i=1-3, 9-18}$ are the continuous plies 474A, and the plies $474_{i=4-8}$ are the drop-off plies 474B.

As shown in FIG. 4, the tip 476 of each drop-off ply 474B has a blunt-end shape, and the drop-off plies 474B are arranged immediately next to each other in the stack (e.g., in a cluster). In general, this approach to transitioning from one gage to another gage can be effective. However, it has been found that the performance of the composite structure 470 (and/or a composite stringer 320 incorporating the composite structure 470) can be improved using one or more of the techniques described in detail below with respect to FIGS. 5-6.

For example, using drop-off plies 474B with blunt-end shaped tips 476 and/or arranging the drop-off plies 474B in a cluster can result in a relatively large resin pocket in a region 478 at or near the tips 476 of the drop-off plies 474B. In some instances, the relatively large resin pocket in the region 478 could lead to delamination in the region 478 under certain thermal and/or mechanical loads. Additionally, for example, arranging the tips 476 of the drop-off plies 474B in a cluster may increase a risk of ply kinks and/or wrinkles, which may reduce laminate strength. Further, in some instances, arranging the tips 476 of the drop-off plies at an off-center location (e.g., closer to the outer surface 436 than the inner surface 434) can also increase a risk of ply kinks and/or wrinkles, which can have a reduced static strength and/or a reduced fatigue strength due to potential distortion under thermal and/or mechanical loads.

Within examples, composite structures having variable gages are described, which can improve upon the composite structure 470 in one or more respects. For instance, in some examples, the tips 476 of the drop-off plies 474B can have a tapered shape and/or the plies $474_i$ can be arranged according to one or more patterns that enhance the load carrying capabilities of the composite structure 470.

Referring now to FIG. 5, a composite structure 570 having a variable gage is depicted according to another example. As shown in FIG. 5, the composite structure 570 includes a first end 570A having a first gage 572A and a second end 570B having a second gage 572B, which is less than the first gage 572A of the first end 570A. Additionally, as shown in FIG. 5, the composite structure 570 includes an inner surface 534 extending from the first end 570A to the second end 570B, and an outer surface 536 extending from the first end 570A to the second end 570B.

As also shown in FIG. 5, the composite structure 570 includes a plurality of plies $574_{i=1}$ to $574_{i=n}$ of composite material (hereinafter collectively referred to as "plies $574_i$") arranged in a stack between the inner surface 534 and the outer surface 536, where n is an integer value that is greater than or equal to two. In FIG. 5, the composite structure 570 includes a total of 28 plies $574_i$ (i.e., n=28). However, in other examples, the composite structure 570 can include a lesser quantity or a greater quantity of plies $574_i$.

In this arrangement, the first gage 572A of the first end 570A and the second gage 572B of the second end 570B are respective thicknesses between the inner surface 534 and the outer surface 536 at the first end 570A and the second end 570B, respectively. Further, as described above, the first gage 572A is related to a quantity of the plies $574_i$ at the first end 570A and the second gage 572B is related to a quantity of the plies $574_i$ at the second end 570B. For instance, in FIG. 5, the quantity of the plies $574_i$ at the first end 570A is greater than the quantity of the plies $574_i$ at the second end 570B such that the first gage 572A is greater than the second gage 572B.

As described above, the variable gage of the composite structure 570 results from the plies $574_i$ of composite material including a plurality of continuous plies 574A and a plurality of drop-off plies 574B arranged in the stack between the inner surface 534 and the outer surface 536. In FIG. 5, each continuous ply 574A extends from the first end 570A to the second end 570B. Whereas, each drop-off ply 574B extends from the first end 570A to a respective position of a tip 576 of the drop-off ply 574B between the first end 570A and the second end 570B. Thus, the first gage 572A is based on a quantity of the continuous plies 574A and a quantity of the drop-off plies 574B, and the second gage 572B is based on the quantity of the continuous plies 574A (and not the quantity of the drop-off plies 574B).

For clarity of illustration, in FIG. 5, a representative subset of the continuous plies 574A are labeled with reference number 574A and a representative subset of the drop-off plies 574B are labeled with reference number 574B. However, each of the plies $574_i$ that extends entirely from the first end 570A to the second end 570B is one of the continuous plies 574A, and each of the plies $574_i$ that terminates between the first end 570A and the second end 570B is one of the drop-off plies 574B. Specifically, in FIG. 5, the plies $574_{i=1-6, 8, 10, 12, 14, 15, 17, 19, 21, 23, 25-28}$ are the continuous plies 574A, and the plies $574_{i=7, 9, 11, 13, 16, 18, 20, 22, 24}$ are the drop-off plies 574B.

As shown in FIG. 5, the tip 576 of each drop-off ply 574B has a tapered shape. More particularly, for example, the tip 576 of each drop-off ply 574B can gradually reduce in thickness in a direction along the tip 576 from the first end 570A toward the second end 570B. Because the tip 576 has the tapered shape, the tip 576 can more closely abut against adjacent ones of the plies $574_i$ (e.g., as compared to the blunt-end shaped tips 476 in FIG. 4, which terminate relatively abruptly). As such, the tips 576 having the tapered shape can reduce (or may minimize) resin pockets at the tips 576 of the drop-off plies 574B, which can help to improve (or may maximize) interlaminar strength of the composite structure 570. Accordingly, the tapered shape of the tips 576 of the drop-off plies 574B can help to improve a load bearing performance of the composite structure 570 having the variable gage for transitioning from a section having the first gage 572A to a section having the second gage 572B.

Within examples, the tapered shape of the tips 576 of the drop-off plies 574B can be formed by cutting each drop-off ply 574B at an angle less than approximately 85 degrees relative to a longitudinal axis of the drop-off ply 574B. By contrast, the blunt-end shape of the tips 476 of the drop-off plies 474B shown in FIG. 4 can be formed, for example, by cutting each drop-off ply 474B at an angle of approximately 90 degrees relative to a longitudinal axis of the drop-off ply 474B.

As noted above, the load bearing performance of the composite structure 570 can be enhanced, additionally or alternatively, based on a pattern in which the plies $574_i$ are arranged in the composite structure 570. For example, in FIG. 5, the drop-off plies 574B are separated from each other by at least one of the continuous plies 574A. More particularly, in FIG. 5, each drop-off ply 574B is sandwiched between and abuts against a respective two continuous plies 574A of the plurality of continuous plies 574A. By separating the drop-off plies 574B from each other and/or sandwiching the drop-off plies 574B between the continuous plies 574A, the drop-off plies 574B can be more uniformly distributed between the inner surface 534 and the outer surface 536 (as compared to the clustered arrangement of the drop-off plies 474B shown in FIG. 4). This can help to reduce (or may prevent) ply kinks and/or wrinkles, reduce (or may prevent) resin pockets, and/or increase (or may maximize) interlaminar strength of the composite structure 570.

As noted above, in FIG. 5, the plies $574_{i=1-6, 8, 10, 12, 14, 15, 17, 19, 21, 23, 25-28}$ are the continuous plies 574A, and the plies $574_{i=7, 9, 11, 13, 16, 18, 20, 22, 24}$ are the drop-off plies 574B. Accordingly, in FIG. 5, each of the plies $574_{i=7, 9, 11, 13, 16, 18, 20, 22, 24}$ is separated from each other by at least one of the plies $574_{i=1-6, 8, 10, 12, 14, 15, 17, 19, 21, 23, 25-28}$, and each of the plies $574_{i=7, 9, 11, 13, 16, 18, 20, 22, 24}$ is sandwiched between and abuts against a respective two of the plies $574_{i=1-6, 8, 10, 12, 14, 15, 17, 19, 21, 23, 25-28}$. For instance, in FIG. 5, the ply $574_{i=7}$ is separated from the ply $574_{i=9}$ by the ply $574_{i=8}$, and the ply $574_{i=7}$ is sandwiched between the ply $574_{i=6}$ and the ply $574_{i=8}$. Additionally, for instance, the ply $574_{i=9}$ is separated from the ply $574_{i=11}$ by the ply $574_{i=10}$, separated from the ply $574_{i=9}$ by the ply $574_{i=8}$, and sandwiched between the ply $574_{i=8}$ and the ply $574_{i=10}$. Further, for instance, the ply $574_{i=16}$ is separated from the ply $574_{i=13}$ by the plies $574_{i=14,15}$, separated from the ply $574_{i=18}$ by the ply $574_{i=17}$, and sandwiched between the ply $574_{i=15}$ and the ply $574_{i=17}$. Similar relationships exist for a remainder of the drop-off plies 574B in FIG. 5 (i.e., the plies $574_{i=11, 13, 18, 20, 22, 24}$). As noted above, arranging the plies $574_i$ in a pattern having a characteristic of the drop-off plies 574B interleaved with the continuous plies 574A (e.g., as shown in FIG. 5) can help to reduce (or may prevent) ply kinks and/or wrinkles, reduce (or may prevent) resin pockets, and/or increase (or may maximize) interlaminar strength of the composite structure 570.

Within examples, the pattern of the tips 576 of the drop-off plies 574B can additionally or alternatively include one or more of the following characteristics: (i) an arrangement of the tips 576 in a first half of the composite structure 570 in a pattern that mirrors a pattern of the tips 576 in a second half of the composite structure 570, (ii) a staggered arrangement of the tips 576 relative to each other, and/or (iii) spacing the tips 576 relative to each other by at least one threshold distance (e.g., at least one distance related to respective positions and/or respective thicknesses of one or more of the plies $574_i$. Each of these characteristics alone or in combination can contribute to arranging the drop-off plies 574B in a pattern that can reduce (or may prevent) ply kinks and/or wrinkles, reduce (or may prevent) resin pockets, and/or increase (or may maximize) interlaminar strength.

FIG. 5 shows the tips 576 arranged in mirror patterns relative to a central portion 580 of the composite structure 570 according to one example. The central portion 580 can include one or more of the plies $574_i$ that provide a frame of reference for characterizing patterns of the tips 576 of the drop-off plies 574B on opposing sides of the central portion 580. In general, the central portion 580 (i) is between the inner surface 534 and the outer surface 536 and (ii) extends from the first end 570A to the second end 570B.

In FIG. 5, the central portion 580 can include the plies $574_{i=15,16}$. Thus, in FIG. 5, the central portion 580 can include a single drop-off ply 574B (i.e., the ply $574_{i=16}$) and a single continuous ply 574A (i.e., the ply $574_{i=15}$). However, in another example, the central portion 580 can include two drop-off plies 574B and at least one continuous ply 574A. In yet another example, the central portion 580 can consist of only a single drop-off ply 574B. In another example, the central portion 580 can consist of one or more continuous plies 574A and omit the drop-off plies 574B. More generally, the central portion 580 can include one or more of the continuous plies 574A and/or one or more of the drop-off plies 574B.

As noted above, the tips 576 of the drop-off plies 574B can be arranged in substantially mirror or mirror patterns relative to the central portion 580. For instance, a first subset of the drop-off plies 574B can be between the outer surface 536 and the central portion 580, and a second subset of the drop-off plies 574B can be between the central portion 580 and the inner surface 534. In this arrangement, the tips 576 of the first subset of the drop-off plies 574B are arranged in a pattern that substantially mirrors a pattern of the tips 576 of the second subset of the drop-off plies 574B. In other words, with reference to the central portion 580, the respective positions of the tips 576 of the first subset of the drop-off plies 574B are (i) reversely and (ii) similarly (or identically) arranged in comparison to the respective positions of the tips 576 of the second subset of the drop-off plies 574B.

For example, in FIG. 5, the central portion 580 can include the plies $574_{i=15,16}$, the first subset of the drop-off plies 574B can include the plies $574_{i=7, 9, 11, 13}$, and the second subset of the drop-off plies 574B can include the plies $574_{i=18, 20, 22, 24}$. As shown in FIG. 5, the pattern of the tips 576 of the first subset of the drop-off plies 574B substantially mirrors the pattern of the tips 576 of the second subset of the drop-off plies 574B. For instance, with reference to the central portion 580, the respective positions of the tips 576 of the first subset are reversely and similarly arranged in comparison to the respective positions of the tips 576 of the second subset.

Additionally, as shown in FIG. 5, the pattern of the tips 576 of the drop-off plies 574B can be a monotonically-outward pattern. For instance, in FIG. 5, the first subset of the drop-off plies 574B can be in an order from a drop-off ply 574B closest to the central portion 580 (e.g., the ply $574_{i=13}$) to a drop-off ply 574B closest to the outer surface 536 (i.e., the ply $574_{i=7}$). The pattern of the tips 576 of the first subset of the drop-off plies 574B can include, with each successive drop-off ply 574B in the order, a relative distance between the tip 576 of the drop-off ply 574B and the second end 570B decreases. As such, in FIG. 5, (i) the tip 576 of the ply $574_{i=13}$ is at a first distance from the second end 570B, (ii) the tip 576 of the ply $574_{i=11}$ is at a second distance from the second end 570B, which is less than the first distance, (iii) the tip 576 of the ply $574_{i=9}$ is at a third distance from the second end 570B, which is less than the second distance, and (iv) the tip 576 of the ply $574_{i=7}$ is at a fourth distance from the second end 570B, which is less than the third distance.

Similarly, the second subset of the drop-off plies 574B can be in an order from a drop-off ply 574B closest to the central portion 580 (e.g., the ply $574_{i=18}$) to a drop-off ply 574B closest to the inner surface 534 (e.g., the ply $574_{i=24}$). The pattern of the tips 576 of the second subset of the drop-off plies 574B includes, with each successive drop-off ply 574B in the order, a relative distance between the tip 576 of the drop-off ply 574B and the second end 570B decreases. As such, in FIG. 5, (v) the tip 576 of the ply $574_{i=18}$ is at a fifth distance from the second end 570B, (vi) the tip 576 of the ply $574_{i=20}$ is at a sixth distance from the second end 570B, which is less than the fifth distance, (vii) the tip 576 of the ply $574_{i=22}$ is at a seventh distance from the second end 570B, which is less than the sixth distance, and (viii) the tip 576 of the ply $574_{i=24}$ is at an eighth distance from the second end 570B, which is less than the seventh distance.

Accordingly, in the monotonically-outward pattern of the tips 576 shown in FIG. 5, the tips 576 of the drop-off plies 574B generally appear to be spread outward from the central portion 580 in a direction from the first end 570A to the second end 570B. The monotonically-outward pattern of the tips 576 can help to more gradually and/or smoothly transition from the first gage 572A at the first end 570A to the second gage 572B at the second end 570B. Additionally, for example, the monotonically-outward pattern of the tips 576 can help to achieve a relatively greater degree of symmetry relative to, for instance, the arrangement of the tips 476 in FIG. 4 (which are clustered near the outer surface 436).

According to an additional or alternative aspect of the monotonically-outward pattern shown in FIG. 5, the drop-off plies 574B can be arranged in a plurality of pairs of drop-off plies 574B that define an order in which the drop-off plies 574B drop off in a direction from the first end 570A toward the second end 570B (i.e., an order of the respective positions of the tips 576 in the direction from the first end 570A toward the second end 570B). In particular, each pair of drop-off plies 574B can include a respective one drop-off ply 574B of the first subset and a respective one drop-off ply 574B of the second subset.

For example, in FIG. 5, a first pair includes the plies $574_{i=13, 18}$, a second pair includes the plies $574_{i=11, 20}$, a third pair includes the plies $574_{i=9, 22}$, and a fourth pair includes the plies $574_{i=7, 24}$. As shown in FIG. 5, in the direction from the first end 570A to the second end 570B, the drop-off plies 574B drop off in an order from the first pair to the fourth pair. In other words, the tips 576 of the first pair of the drop-off plies 574B are closest to the first end 570A, the tips 576 of the second pair of the drop-off plies 574B are second closest to the first end 570A, the tips 576 of the third pair of the drop-off plies 574B are third closest to the first end 570A, and the tips 576 of the fourth pair of the drop-off plies 574B are farthest from the first end 570A.

Additionally, for example, for each pair of drop-off plies 574B, the respective one drop-off ply 574B of the first subset and the respective one drop-off ply 574B of the second subset can be substantially equidistant from the central portion 580 in a dimension between the outer surface 536 and the inner surface 534. For instance, as shown in FIG. 5, the first pair of the drop-off plies 574B are each spaced from the central portion 580 by a distance equal to a ply thickness 582 of a single ply $574_i$, the second pair of the drop-off plies 574B are each spaced from the central portion 580 by a distance equal to three times the ply thickness 582, the third pair of the drop-off plies 574B are each spaced from the central portion 580 by a distance equal to five times the ply thickness 582, and the fourth pair of the drop-off plies 574B are each spaced from the central portion 580 by a distance equal to seven times the ply thickness 582.

Arranging the drop-off plies 574B in pairs that (i) drop off, pair-by-pair, in an order from the first end 570A to the second end 570B, and/or (ii) are equidistant relative to the central portion 580 can additionally help to more gradually and/or smoothly transition from the first gage 572A at the first end 570A to the second gage 572B at the second end 570B, and/or achieve a relatively greater degree of symmetry relative to, for instance, the arrangement of the tips 476 in FIG. 4 (which are clustered near the outer surface 436).

Within examples, each drop-off ply 574B can have a ply angle, relative to a longitudinal axis of the composite structure 570 (e.g., the longitudinal axis 348), which is between approximately −30 degrees and +30 degrees. This can help to achieve a desired stiffness with a relatively few (or minimal) quantity of plies $574_i$ and, thus, reduce (or may minimize) a weight and/or cost of fabricating the composite structure 570. In an example, for each pair, the ply angle is approximately the same for the drop-off plies 574B of the pair. This can help to improve (or may maximize) a symmetry of the composite structure 570.

According to an additional or alternative aspect of the monotonically-outward pattern shown in FIG. 5, the monotonically-outward pattern can include, along a direction from the first end 570A to the second end 570B, the tips 576 of the first subset of the drop-off plies 574B alternating with the tips 576 of the second subset of the drop-off plies 574B. For example, in FIG. 5, the tips 576 of the drop-off plies 574B are in the following order from the first end 570A to the second end 570B: (i) the tip 576 of the ply $574_{i=18}$ from the second subset, (ii) the tip 576 of the ply $574_{i=13}$ from the first subset, (iii) the tip 576 of the ply $574_{i=20}$ from the second subset, (iv) the tip 576 of the ply $574_{i=11}$ from the first subset, (v) the tip 576 of the ply $574_{i=22}$ from the second subset, (vi) the tip 576 of the ply $574_{i=9}$ from the first subset, (vii) the tip 576 of the ply $574_{i=24}$ from the second subset, and (viii) the tip 576 of the ply $574_{i=7}$ from the first subset. Alternating the respective positions of the tips 576 of the drop-off plies 574B can additionally or alternatively help to help to more gradually and/or smoothly transition from the first gage 572A at the first end 570A to the second gage 572B at the second end 570B.

As noted above, arranging the drop-off plies 574B such that the tips 576 of the drop-off plies 574B are staggered relative to each other can additionally or alternatively help to reduce (or may prevent) ply kinks and/or wrinkles, reduce (or may prevent) resin pockets, and/or increase (or may maximize) interlaminar strength. As an example, in FIG. 5, the respective positions of the tips 576 of the drop-off plies 574B can be staggered from the first end 570A to the second end 570B. By "staggered", it is meant that the tips 576 of the drop-off plies 574B are each at a respective distance from the second end 570B, and the respective distances between the tips 576 and the second end 570B are all different from each other (i.e., the tips of no two drop-off plies are equidistant from the second end 570B). Staggering the tips 576 of the drop-off plies 574B can help to mitigate some or all of the challenges associated with a clustered arrangement of drop-off plies described above.

Also, as noted above, spacing the tips 576 relative to each other by at least one threshold distance can additionally or alternatively help to reduce (or may prevent) ply kinks and/or wrinkles, reduce (or may prevent) resin pockets, and/or increase (or may maximize) interlaminar strength. In an example, for each drop-off ply 574B, a distance 584 between the tip 576 of the drop-off ply 574B and the tip 576 of an adjacent one of the drop-off plies 574B can be at least ten times greater than the ply thickness 582 of the drop-off ply 574B. In this example, for each drop-off ply 574B, the adjacent one of the drop-off plies 574B is adjacent to the drop-off ply 574B in a dimension extending between the outer surface 536 and the inner surface 534. That is, two of the drop-off plies 574B are adjacent to each other only if there is not another one of the drop-off plies 574B between the two of the drop-off plies 574B in the dimension extending between the outer surface 536 and the inner surface 534. Thus, for example, the ply $574_{i=18}$ is adjacent to the ply $574_{i=16}$ and the ply $574_{i=20}$, and non-adjacent to the other drop-off plies 574B (i.e., plies $574_{i=7, 9, ii, 13, 22, 24}$).

A representative one of the distances 584 is depicted in FIG. 5 between the tips 576 of the ply $574_{i=18}$ and the ply $574_{i=16}$, which are adjacent to each other. As shown in FIG. 5, the distance 584 between the tip 576 of the ply $574_{i=18}$ and the tip of the ply $574_{i=16}$ is at least ten times greater than the ply thickness 582 of the ply $574_{i=18}$. Similarly, in FIG. 5, the tips 576 of the other adjacent ones of the drop-off plies 574B are separated by respective distances 584 that are at least ten times greater than the ply thickness 582. As described above, arranging the drop-off plies 574B such that the tips 576 of adjacent ones of the drop-off plies 574B are separated by the distance 584 of at least ten times the ply thickness 582 can help to reduce (or may prevent) ply kinks and/or wrinkles, reduce (or may prevent) resin pockets, and/or increase (or may maximize) interlaminar strength.

Additionally or alternatively, for example, a distance 586 between non-adjacent ones of the drop-off plies 574B can be at least three times greater than the ply thickness 582 of each drop-off ply 574B. A representative one of the distances 586 is depicted in FIG. 5 between the tips 576 of the ply $574_{i=18}$ and the ply $574_{i=13}$, which are non-adjacent to each other (e.g., because the ply $574_{i=16}$ is between the ply $574_{i=18}$ and the ply $574_{i=13}$). As shown in FIG. 5, the distance 586 between the tip 576 of the ply $574_{i=18}$ and the tip of the ply $574_{i=13}$ is at least three times greater than the ply thickness 582 of the ply $574_{i=18}$. Similarly, the tips 576 of the other non-adjacent ones of the drop-off plies 574B are separated by respective distances 586 that are at least three times greater than the ply thickness 582. As described above, arranging the drop-off plies 574B such that the tips 576 of non-adjacent ones of the drop-off plies 574B are separated by the distance 584 of at least three times the ply thickness 582 can help to reduce (or may prevent) ply kinks and/or wrinkles, reduce (or may prevent) resin pockets, and/or increase (or may maximize) interlaminar strength.

In FIG. 5, the ply thickness 582 is the same for all of the plies $574_i$. However, in another example, one or more of the plies $574_i$ can have a different ply thickness than another one of the plies $574_i$. In some implementations, providing the plies $574_i$ with different ply thicknesses can help to provide relatively greater flexibility for achieving fabrication quality objectives.

Additionally, in FIG. 5, the tips 576 of the drop-off plies 574B all have the tapered shape. However, in another example, one or more of the tips 576 of the drop-off plies 574B can have the blunt-end shape shown in FIG. 4. Although the tapered shape can be beneficial for at least the reasons described above, a composite structure including the drop-off plies 574B having the tips 476 with the blunt-end shape in a pattern having one or more of the characteristics described above with respect to FIG. 5 can provide improvements over the composite structure 470 shown in FIG. 4. Similarly, a composite structure including the drop-off plies 474B arranged in the pattern shown in FIG. 4, but with the tips 576 having the tapered shape can provide improvements over the composite structure 470 shown in FIG. 4. Accordingly, within examples, the drop-off plies 474B, 574B can the tips 576 with the tapered shape and/or the tips 476 with the blunt-end shape, and the drop-off plies 474B, 574B can be arranged in a clustered pattern (as shown in FIG. 4) and/or a pattern having one or more of the characteristics described above with respect to FIG. 5.

As described, arranging the tips 576 of the drop-off plies 574B in a pattern having one or more of the characteristics described above can help to achieve a relatively greater degree of symmetry for the composite structure 570 (e.g., about the central portion 580) relative to, for instance, the arrangement of the tips 476 in FIG. 4. As used herein, the term "symmetry" is intended to be a relative term and does not mean exactly symmetric. For example, as shown in FIG. 5, the composite structure 570 includes 14 plies $574_i$ between the central portion 580 and the outer surface 536, and 12 plies $574_i$ between the central portion 580 and the inner surface 534. However, in the context of this disclosure, the composite structure 570 shown in FIG. 5 has a greater degree of symmetry relative to the composite structure 470 shown in FIG. 4.

Within examples, providing the composite structure 570 with a relatively greater degree of symmetry about the central portion 580 can help to increase (or may maximize) interlaminar strength. Additionally or alternatively, providing the composite structure 570 with a relatively greater degree of symmetry about the central portion 580 can help to reduce (or may minimize) re-curing, tooling, material handling costs, and/or weight.

As described above, FIG. 5 shows the composite structure 570 with the drop-off plies 574B arranged in an example pattern having one or more characteristics that can help to improve performance, reduce re-curing, reduce tooling, reduce material handling costs, and/or reduce a weight of the composite structure 570. Other example patterns having the one or more characteristics are also possible. For instance, FIG. 6 shows a composite structure 670 having a variable gage according to another example. As shown in FIG. 6, the composite structure 670 includes a first end 670A having a first gage 672A and a second end 670B having a second gage 672B, which is less than the first gage 672A of the first end 670A. Additionally, as shown in FIG. 6, the composite structure 670 includes an inner surface 634 extending from the first end 670A to the second end 670B, and an outer surface 636 extending from the first end 670A to the second end 670B.

As also shown in FIG. 6, the composite structure 670 includes a plurality of plies $674_{i=1}$ to $674_{i=n}$ of composite material (hereinafter collectively referred to as "plies $674_i$") arranged in a stack between the inner surface 634 and the outer surface 636, where n is an integer value that is greater than or equal to two. In FIG. 6, the composite structure 670 includes a total of 28 plies $674_i$ (i.e., n=28). However, in other examples, the composite structure 670 can include a lesser quantity or a greater quantity of plies $674_i$.

In this arrangement, the first gage 672A of the first end 670A and the second gage 672B of the second end 670B are respective thicknesses between the inner surface 634 and the outer surface 636 at the first end 670A and the second end 670B, respectively. Further, the first gage 672A is related to a quantity of the plies $674_i$ at the first end 670A and the second gage 672B is related to a quantity of the plies $674_i$ at the second end 670B. For instance, in FIG. 6, the quantity of the plies $674_i$ at the first end 670A is greater than the quantity of the plies $674_i$ at the second end 670B such that the first gage 672A is greater than the second gage 672B.

As described above, the variable gage of the composite structure 670 results from the plies $674_i$ of composite material including a plurality of continuous plies 674A and a plurality of drop-off plies 674B arranged in the stack between the inner surface 634 and the outer surface 636. In FIG. 6, each continuous ply 674A extends from the first end 670A to the second end 670B. Whereas, each drop-off ply 674B includes a tip 676, and each drop-off ply 674B extends from the first end 670A to a respective position of the tip 676 of the drop-off ply 674B between the first end 670A and the second end 670B.

For clarity of illustration, in FIG. 6, a representative subset of the continuous plies 674A are labeled with reference number 674A and a representative subset of the drop-off plies 674B are labeled with reference number 674B. However, each of the plies $674_i$ that extends entirely from the first end 670A to the second end 670B is one of the continuous plies 674A, and each of the plies $674_i$ that terminates between the first end 670A and the second end 670B is one of the drop-off plies 674B. Specifically, in FIG. 6, the plies $674_{i=1-4,6,8,10,12,14,15,17,19,21,23,25-28}$ are the continuous plies 674A, and the plies $674_{i=5,7,9,11,13,16,18,20,22,24}$ are the drop-off plies 674B.

As shown in FIG. 6, the tip 676 of each drop-off ply 674B has the tapered shape described above with respect to the tips 576 shown in FIG. 5. As such, the tips 676 having the tapered shape can reduce (or may minimize) resin pockets at the tips 676 of the drop-off plies 674B, which can help to improve (or may maximize) interlaminar strength of the composite structure 670. However, in other examples, one or more of the drop-off plies 674B can have the blunt-end shape shown in FIG. 4.

As noted above, the load bearing performance of the composite structure 670 can be enhanced, additionally or alternatively, based on the pattern in which the plies $674_i$ are arranged in the composite structure 670. For example, in FIG. 6, the drop-off plies 574B can be separated from each other by at least one of the continuous plies 674A. For instance, each drop-off ply 674B can be sandwiched between and abut against a respective two continuous plies 674A of the plurality of continuous plies 674A. By separating the drop-off plies 674B from each other and/or sandwiching the drop-off plies 674B between the continuous plies 674A, the drop-off plies 674B can be more uniformly distributed between the inner surface 634 and the outer surface 636 (as compared to the clustered arrangement of the drop-off plies 474B shown in FIG. 4). This can help to reduce (or may prevent) ply kinks and/or wrinkles, reduce (or may prevent) resin pockets, and/or increase (or may maximize) interlaminar strength of the composite structure 670.

Within examples, the pattern of the tips 676 of the drop-off plies 574B can additionally or alternatively include one or more of the following characteristics: (i) an arrangement of the tips 676 in a first half of the composite structure 670 in a pattern that mirrors a pattern of the tips 676 in a second half of the composite structure 670, (ii) a staggered arrangement of the tips 676 relative to each other, and/or (iii) spacing the tips 676 relative to each other by at least one threshold distance. As described above, each of these characteristics alone or in combination can contribute to arranging the drop-off plies 674B in a pattern that can reduce (or may prevent) ply kinks and/or wrinkles, reduce (or may prevent) resin pockets, and/or increase (or may maximize) interlaminar strength.

FIG. 6 shows the tips 676 arranged in mirror patterns relative to a central portion 680 of the composite structure 670 according to another example. The central portion 680 can include one or more of the plies $674_i$ that provide a frame of reference for characterizing patterns of the tips 676 of the drop-off plies 674B on opposing sides of the central portion 680. As noted above, in general, the central portion 680 (i) is between the inner surface 634 and the outer surface 636 and (ii) extends from the first end 670A to the second end 670B.

In FIG. 6, the central portion 680 can include the plies $674_{i=14,15}$. Thus, in FIG. 6, the central portion 680 can include two continuous plies 674A. However, in another example, the central portion 680 can include two drop-off plies 674B and at least one continuous ply 674A. In yet another example, the central portion 680 can consist of only a single drop-off ply 674B. In another example, the central portion 680 can consist of at least one continuous ply 674A and omit the drop-off plies 674B. More generally, the central portion 680 can include one or more of the continuous plies 674A and/or one or more of the drop-off plies 674B.

Also, as shown in FIG. 6, the tips 676 of the drop-off plies 674B can be arranged in mirror patterns relative to the central portion 680. For instance, a first subset of the drop-off plies 674B can be between the outer surface 636 and the central portion 680, and a second subset of the drop-off plies 674B can be between the central portion 680 and the inner surface 634. In this arrangement, the tips 676 of the first subset of the drop-off plies 674B are arranged in a pattern that substantially mirrors a pattern of the tips 676 of the second subset of the drop-off plies 674B. In other words, with reference to the central portion 680, the respective positions of the tips 676 of the first subset of the drop-off plies 674B are (i) reversely and (ii) similarly (or identically) arranged in comparison to the respective positions of the tips 676 of the second subset of the drop-off plies 674B.

For example, in FIG. 6, the central portion 680 can include the plies $674_{i=14,15}$, the first subset of the drop-off plies 674B can include the plies $674_{i=5, 7, 9, 11, 13}$, and the second subset of the drop-off plies 674B can include the plies $674_{i=16, 18, 20, 22, 24}$. As shown in FIG. 6, the pattern of the tips 676 of the first subset of the drop-off plies 674B substantially mirrors the pattern of the tips 676 of the second subset of the drop-off plies 674B. For instance, with reference to the central portion 680, the respective positions of the tips 676 of the first subset are reversely and similarly arranged in comparison to the respective positions of the tips 676 of the second subset.

As described above, FIG. 5 shows the pattern of the tips 576 of the drop-off plies 574B as a monotonically-outward pattern. FIG. 6 shows the tips 676 of the drop-off plies 674B arranged in a monotonically-inward pattern, according to an example. In a first order of the first subset of the drop-off plies 674B from the outer surface 636 toward the central portion 680, with each successive drop-off ply 674B in the first order, a relative distance between the tip 676 of the drop-off ply 674B and the second end 670B decreases. Also, in a second order of the second subset of the drop-off plies 674B from the inner surface 634 toward the central portion 680, with each successive drop-off ply 674B in the second order, a relative distance between the tip 676 of the drop-off ply 674B and the second end 670B decreases.

As such, in FIG. 6, (i) the tip 676 of the ply $574_{i=5}$ is at a first distance from the second end 670B, (ii) the tip 676 of the ply $674_{i=7}$ is at a second distance from the second end 670B, which is less than the first distance, (iii) the tip 676 of the ply $674_{i=9}$ is at a third distance from the second end 670B, which is less than the second distance, (iv) the tip 676 of the ply $674_{i=11}$ is at a fourth distance from the second end 670B, which is less than the third distance, and (v) the tip 676 of the ply $674_{i=13}$ is at a fifth distance from the second end 670B, which is less than the fourth distance. Also, in FIG. 6, (vi) the tip 676 of the ply $674_{i=24}$ is at a sixth distance from the second end 670B, (vii) the tip 676 of the ply $674_{i=22}$ is at a seventh distance from the second end 670B, which is less than the sixth distance, (viii) the tip 676 of the ply $674_{i=20}$ is at an eighth distance from the second end 670B, which is less than the seventh distance, (ix) the tip 676 of the ply $674_{i=18}$ is at a ninth distance from the second end 670B, which is less than the eighth distance, and (x) the tip 676 of the ply $674_{i=16}$ is at a tenth distance from the second end 670B, which is less than the ninth distance.

Accordingly, in the monotonically-inward pattern of the tips 676 shown in FIG. 6, the tips 676 of the drop-off plies 674B generally appear to be converge inward from the outer surface 636 and the inner surface 634 toward the central portion 680 in a direction from the first end 670A to the second end 670B. The monotonically-inward pattern of the tips 676 can help to more gradually and/or smoothly transition from the first gage 672A at the first end 670A to the second gage 672B at the second end 670B. Additionally, for example, the monotonically-inward pattern of the tips 676 can help to achieve a relatively greater degree of symmetry relative to, for instance, the arrangement of the tips 476 in FIG. 4 (which are clustered near the outer surface 436).

According to an additional or alternative aspect of the monotonically-inward pattern shown in FIG. 6, the drop-off plies 674B can be arranged in a plurality of pairs of drop-off plies 674B that define an order in which the drop-off plies 674B drop off in a direction from the first end 670A toward the second end 670B (i.e., an order of the respective positions of the tips 676 in the direction from the first end 670A toward the second end 670B). In particular, each pair of drop-off plies 674B can include a respective one drop-off ply 674B of the first subset and a respective one drop-off ply 674B of the second subset.

For example, in FIG. 6, a first pair includes the plies $674_{i=5,\ 24}$, a second pair includes the plies $674_{i=7,\ 22}$, a third pair includes the plies $674_{i=9,\ 20}$, a fourth pair includes the plies $674_{i=11,\ 18}$, and a fifth pair includes the plies $674_{i=13,\ 16}$. As shown in FIG. 6, in the direction from the first end 670A to the second end 670B, the drop-off plies 674B drop off in an order from the first pair to the fifth pair. In other words, the tips 676 of the first pair of the drop-off plies 674B are closest to the first end 670A, the tips 676 of the second pair of the drop-off plies 674B are second closest to the first end 670A, the tips 676 of the third pair of the drop-off plies 674B are third closest to the first end 670A, the tips 676 of the fourth pair of the drop-off plies 674B are second farthest from the first end 670A, and the tips 676 of the fifth pair of the drop-off plies 674B are farthest from the first end 670A.

Additionally, for example, for each pair of drop-off plies 674B, the respective one drop-off ply 674B of the first subset and the respective one drop-off ply 674B of the second subset can be equidistant from the central portion 680 in a dimension between the outer surface 636 and the inner surface 634. For instance, as shown in FIG. 6, the first pair of the drop-off plies 674B are each spaced from the central portion 680 by a distance equal to eight times a ply thickness 682 of a single ply $674_i$, the second pair of the drop-off plies 674B are each spaced from the central portion 680 by a distance equal to six times the ply thickness 682, the third pair of the drop-off plies 674B are each spaced from the central portion 680 by a distance equal to four times the ply thickness 682, the fourth pair of the drop-off plies 674B are each spaced from the central portion 680 by a distance equal to two times the ply thickness 682, and the fifth pair of the drop-off plies 674B are each immediately adjacent to and abut against the central portion 680.

Arranging the drop-off plies 674B in pairs that (i) drop off, pair-by-pair, in an order from the first end 670A to the second end 670B, and/or (ii) are equidistant relative to the central portion 680 can additionally help to more gradually and/or smoothly transition from the first gage 672A at the first end 670A to the second gage 672B at the second end 670B, and/or achieve a relatively greater degree of symmetry relative to, for instance, the arrangement of the tips 476 in FIG. 4 (which are clustered near the outer surface 436).

According to an additional or alternative aspect of the monotonically-inward pattern shown in FIG. 6, the monotonically-inward pattern can include, along a direction from the first end 670A to the second end 670B, the tips 676 of the first subset of the drop-off plies 674B alternating with the tips 676 of the second subset of the drop-off plies 674B. For example, in FIG. 6, the tips 676 of the drop-off plies 674B are in the following order from the first end 670A to the second end 670B: (i) the tip 676 of the ply $674_{i=5}$ from the first subset, (ii) the tip 676 of the ply $674_{i=24}$ from the second subset, (iii) the tip 676 of the ply $674_{i=7}$ from the first subset, (iv) the tip 676 of the ply $674_{i=22}$ from the second subset, (v) the tip 676 of the ply $674_{i=9}$ from the first subset, (vi) the tip 676 of the ply $674_{i=20}$ from the second subset, (vii) the tip 676 of the ply $674_{i=11}$ from the first subset, (viii) the tip 676 of the ply $674_{i=18}$ from the second subset, (ix) the tip 676 of the ply $674_{i=13}$ from the first subset, and (x) the tip 676 of the ply $674_{i=16}$ from the second subset. Alternating the respective positions of the tips 676 of the drop-off plies 674B can additionally or alternatively help to help to more gradually and/or smoothly transition from the first gage 672A at the first end 670A to the second gage 672B at the second end 670B.

As noted above, arranging the drop-off plies 674B such that the tips 676 of the drop-off plies 674B are staggered relative to each other can additionally or alternatively help to reduce (or may prevent) ply kinks and/or wrinkles, reduce (or may prevent) resin pockets, and/or increase (or may maximize) interlaminar strength. As an example, in FIG. 6, the respective positions of the tips 676 of the drop-off plies 674B can be staggered from the first end 670A to the second end 670B. By "staggered", it is meant that the tips 676 of the drop-off plies 674B are each at a respective distance from the second end 670B, and the respective distances between the tips 676 and the second end 670B are all different from each other (i.e., the tips of no two drop-off plies are equidistant from the second end 670B). Staggering the tips 676 of the drop-off plies 674B can help to mitigate some or all of the challenges associated with a clustered arrangement of drop-off plies described above.

Also, as noted above, spacing the tips 676 relative to each other by at least one threshold distance can additionally or alternatively help to reduce (or may prevent) ply kinks and/or wrinkles, reduce (or may prevent) resin pockets, and/or increase (or may maximize) interlaminar strength. In an example, for each drop-off ply 674B, a distance 684 between the tip 676 of the drop-off ply 674B and the tip 676 of an adjacent one of the drop-off plies 674B can be at least ten times greater than the ply thickness 682 of the drop-off ply 674B. In this example, for each drop-off ply 674B, the adjacent one of the drop-off plies 674B is adjacent to the drop-off ply 674B in a dimension extending between the outer surface 636 and the inner surface 634. For instance, as described above, two of the drop-off plies 674B are adjacent to each other only if there is not another one of the drop-off plies 674B between the two of the drop-off plies 674B in the dimension extending between the outer surface 636 and the inner surface 634. Thus, for example, the ply $674_{i=7}$ is adjacent to the ply $674_{i=5}$ and the ply $674_{i=9}$, and non-adjacent to the other drop-off plies 674B (i.e., plies $574_{i=11,\ 13,\ 16,\ 18,\ 20,\ 22,\ 24}$).

A representative one of the distances 684 is depicted in FIG. 6 between the tips 676 of the ply $674_{i=7}$ and the ply $674_{i=5}$, which are adjacent to each other. As shown in FIG. 6, the distance 684 between the tip 676 of the ply $674_{i=7}$ and the tip of the ply $674_{i=5}$ is at least ten times greater than the ply thickness 682 of the ply $674_{i=7}$. Similarly, in FIG. 6, the tips 676 of the other adjacent ones of the drop-off plies 674B are separated by respective distances 684 that are at least ten times greater than the ply thickness 682. As described above, arranging the drop-off plies 674B such that the tips 676 of adjacent ones of the drop-off plies 674B are separated by the distance 684 of at least ten times the ply thickness 682 can help to reduce (or may prevent) ply kinks and/or wrinkles, reduce (or may prevent) resin pockets, and/or increase (or may maximize) interlaminar strength.

Additionally or alternatively, for example, a distance 686 between non-adjacent ones of the drop-off plies 674B can be at least three times greater than the ply thickness 682 of each drop-off ply 674B. A representative one of the distances 686 is depicted in FIG. 6 between the tips 676 of the ply $674_{i=7}$ and the ply $674_{i=22}$, which are non-adjacent to each other (e.g., because the plies $674_{i=9,\ 11,\ 13,\ 16,\ 18,\ 20}$ are between the ply $674_{i=7}$ and the ply $674_{i=22}$). As shown in FIG. 6, the distance 686 between the tip 676 of the ply 674$_{i=7}$ and the tip of the ply 674$_{i=22}$ is at least three times greater than the ply thickness 682 of the ply 674$_{i=7}$. Similarly, the tips 676 of the other non-adjacent ones of the drop-off plies 674B are separated by respective distances 686 that are at least three times greater than the ply thickness 682. As described above, arranging the drop-off plies 674B such that the tips 676 of non-adjacent ones of the drop-off plies 674B are separated by the distance 684 of at least three times the ply thickness 682 can help to reduce (or may prevent) ply kinks and/or wrinkles, reduce (or may prevent) resin pockets, and/or increase (or may maximize) interlaminar strength.

In FIG. 6, the ply thickness 682 is the same for all of the plies 674$_i$. However, in another example, one or more of the plies 674$_i$ can have a different ply thickness than another one of the plies 674$_i$. In some implementations, providing the plies 674$_i$ with different ply thicknesses can help to provide relatively greater flexibility for achieving fabrication quality objectives.

Additionally, in FIG. 6, the tips 676 of the drop-off plies 674B all have the tapered shape. However, in another example, one or more of the tips 676 of the drop-off plies 674B can have the blunt-end shape of the tips 476 shown in FIG. 4. Although the tapered shape can be beneficial for at least the reasons described above, a composite structure including the drop-off plies 674B having the tips 476 with the blunt-end shape in a pattern having one or more of the characteristics described above with respect to FIG. 6 can provide improvements over the composite structure 470 shown in FIG. 4.

As described above, within examples, the lower corner portion 352, the upper corner portion 354, the second upper corner portion 358, and/or the second lower corner portion 356 can include the composite structures 470, 570, 670 described above with respect to FIGS. 4-6. In FIGS. 4-6, the first end 470A, 570A, 670A has the first gage 472A, 572A, 672A, which is greater than the second gage 472B, 572B, 672B at the second end 470B, 570B, 670B. Accordingly, depending on the respective gages of the portions of the composite stringer 320 on opposing sides of the composite structure 470, 570, 670, (i) the first end 470A, 570A, 670A can be located at a first interface between the composite structure 470, 570, 670 and any one of the skin flange 324, the web 328, the top flange 326, the second web 332, or the second skin flange 330, and (ii) the second end 470B, 570B, 670B can be located at a second interface between the composite structure 470, 570, 670 and another one of the skin flange 324, the web 328, the top flange 326, the second web 332, or the second skin flange 330.

As described above, the composite stringer 320 is coupled to the support structure 322, which includes the skin flange, in FIGS. 3A-3B. However, as described above, the support structure 322 can additionally include a base charge in some examples. FIG. 7 depicts a composite stringer assembly 701 including the composite stringer 320 coupled to a support structure 722, according to another example. The composite stringer assembly 701 shown in FIG. 7 is identical to the composite stringer assembly 701 shown in FIGS. 3A-3B, except the support structure 722 includes a base charge 788 and the skin 323 of the vehicle.

The base charge 788 is configured to couple the skin flange 324 and the second skin flange 330 to the skin 323 of the vehicle. Within examples, the base charge 788 can include one or more plies of composite material that can help support and cushion the composite stringer 320 on the skin 323. In FIG. 7, the base charge 788 extends under an entire surface area of inner surface 334 at the skin flange 324 and an entire surface area of the inner surface 334 at the second skin flange 330. Also, in FIG. 7, the base charge 788 extends continuously across a space between the skin flange 324 and the second skin flange 330. However, in other examples, the base charge 788 can include a plurality of base charges 788. For instance, the base charge 788 can include one base charge 788 at the skin flange 324 and another base charge 788 at the second skin flange 330, and the base charges 788 can be separated by a gap (e.g., the skin 723 can be exposed at the gap).

As shown in FIG. 7, the base charge 788 can have a sixth gage 790, which is approximately equal to or less than the first gage 338 of the skin flange 324 and/or the fourth gage 344 of the second skin flange 330. This can help to provide the base charge 788 with a stiffness that is approximately equal to a stiffness of the skin flange 324 and/or a stiffness of the second skin flange 330. Providing the base charge 788, the skin flange 324, and/or the second skin flange 330 with approximately the same stiffness can help to enhance (or may maximize) energy absorption due to an impact and/or a load at an interface between (i) the base charge 788 and (ii) the skin flange 324 or the second skin flange 330. In this way, a bond at the interface between (i) the base charge 788 and (ii) the skin flange 324 and/or the second skin flange 330.

Also, within examples, at least one of the skin flange 324, the second skin flange 330, or the base charge 788 can have a stiffness that is approximately equal to a stiffness of the skin 323 of the vehicle. As described above, this can help to enhance (or may maximize) energy absorption due to an impact and/or a load at an interfaces between the skin 323 of the vehicle, the base charge 788, the skin flange 324, and/or the second skin flange 330 (and, thus, mitigate (or may prevent) delamination between the composite stringer 320, the base charge 788, and the skin 323).

As described above with respect to FIGS. 3A-3B and 7, the lower corner portion 352 and/or the second lower corner portion 356 can be curved to transition from the skin flange 324 to the web 328 and/or the second skin flange 330 to the second web 332, respectively. As shown in FIGS. 3A-3B and 7, the curvature of the lower corner portion 352 and/or the second lower corner portion 356 can form a void region between (i) the support structure 322, 722 and (ii) the inner surface 334 at the lower corner portion 352 and/or at the second lower corner portion 356. Such void region(s) may be referred to as "radius filler regions" or "noodle regions". For some conventional composite stringer assemblies, the radius filler regions may be prone to cracking. To strengthen and/or improve a durability of the composite stringer assemblies, a radius filler formed of a composite material (e.g., CFRP) may be positioned in the radius filler region.

Within examples, by providing the top flange 326 with the second gage 340, which is greater than the first gage 338 of the skin flange 324, the third gage 342 of the web 328, the fourth gage 344 of the second skin flange 330, and/or the fifth gage 346 of the second web 332, the composite stringer assemblies 301, 701 can omit a radius filler and/or include a radius filler that is relatively smaller than the radius fillers of conventional composite stringer assemblies (i.e., in which the skin flange 324, the web 328, the top flange 326, the second web 332, and the second skin flange 330 all have the same gage). This is, at least in part, due to the performance improvements achieved by the composite stringer assemblies 301, 701 described above (e.g., due to improved strength-to-weight ratios and/or improved stiffness compatibility allowing for greater flexibility at an interface between the composite stringer 320 and the support structure 322, 722 as described above).

Additionally, a size of the radius filler region can be related to a gage of the lower corner portion 352 or a gage of the second lower corner portion 356 (which are related to the first gage 338, the third gage 342, the fourth gage 344, and/or the fifth gage 346). Within examples, a size of the radius filler can be reduced (or may be minimized) when the first gage 338 of the skin flange 324 is approximately equal to the third gage of the web 328 and/or the fourth gage 344 of the second skin flange 330 is approximately equal to the second web 332.

In some implementations in which the composite stringer assembly 301, 701 includes a radius filler, the composite stringer assembly 301, 701 can include one or more of the features described below with respect to FIGS. 8A-8B to achieve one or more improvements relative to conventional composite stringer assemblies. In particular, within examples, the composite stringer 320 and/or a radius filler can include one or more surfaces defined by constant radii of curvature, which can help to reduce a size of the radius filler, improve strength of the composite stringer assembly 301, 701, simplify tooling requirements, and/or reduce variability among a plurality of composite stringers 320.

Figure 8A:
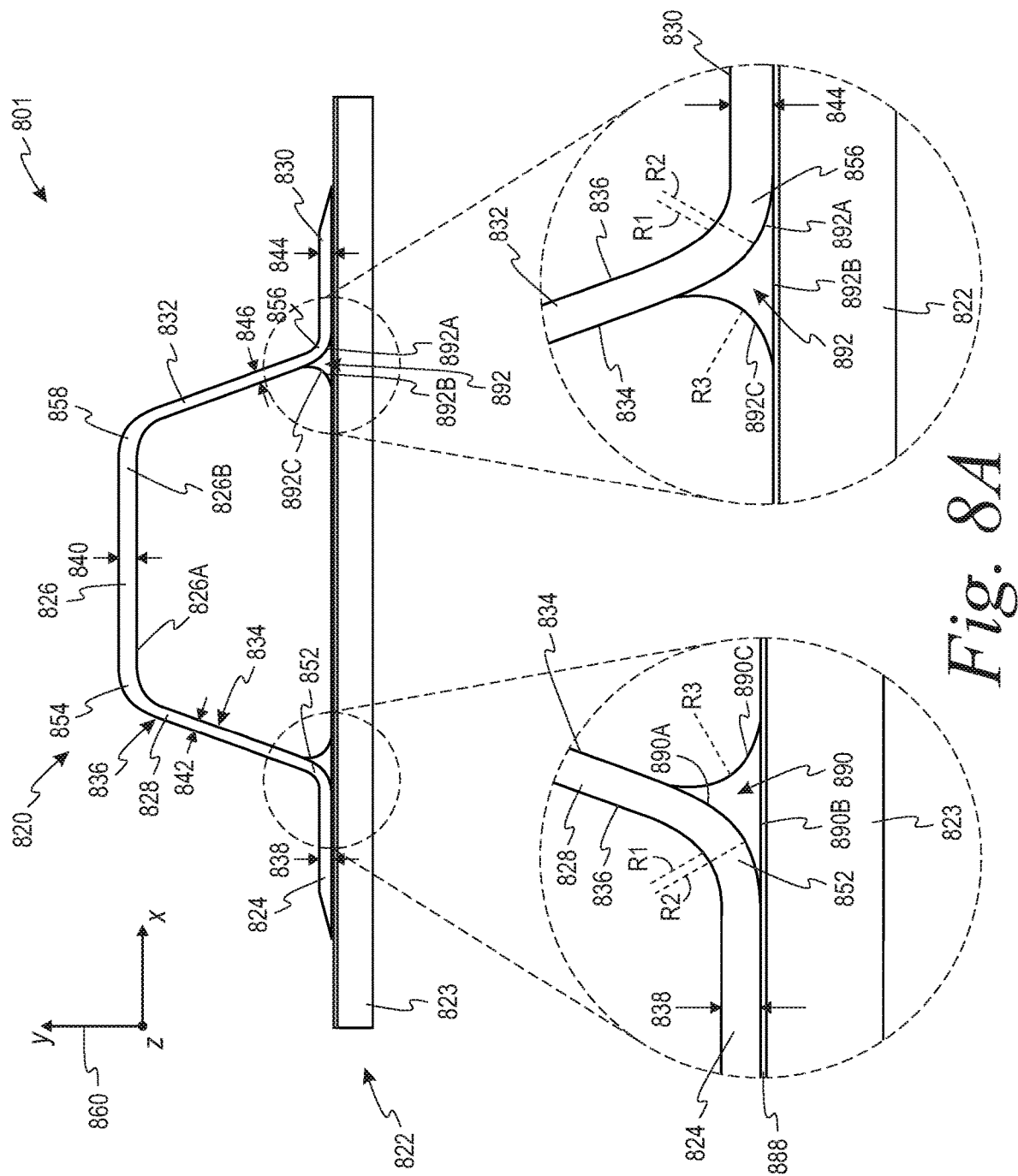
FIG. 8A depicts a side view of a composite structure assembly, according to an example.
Figure 8B:
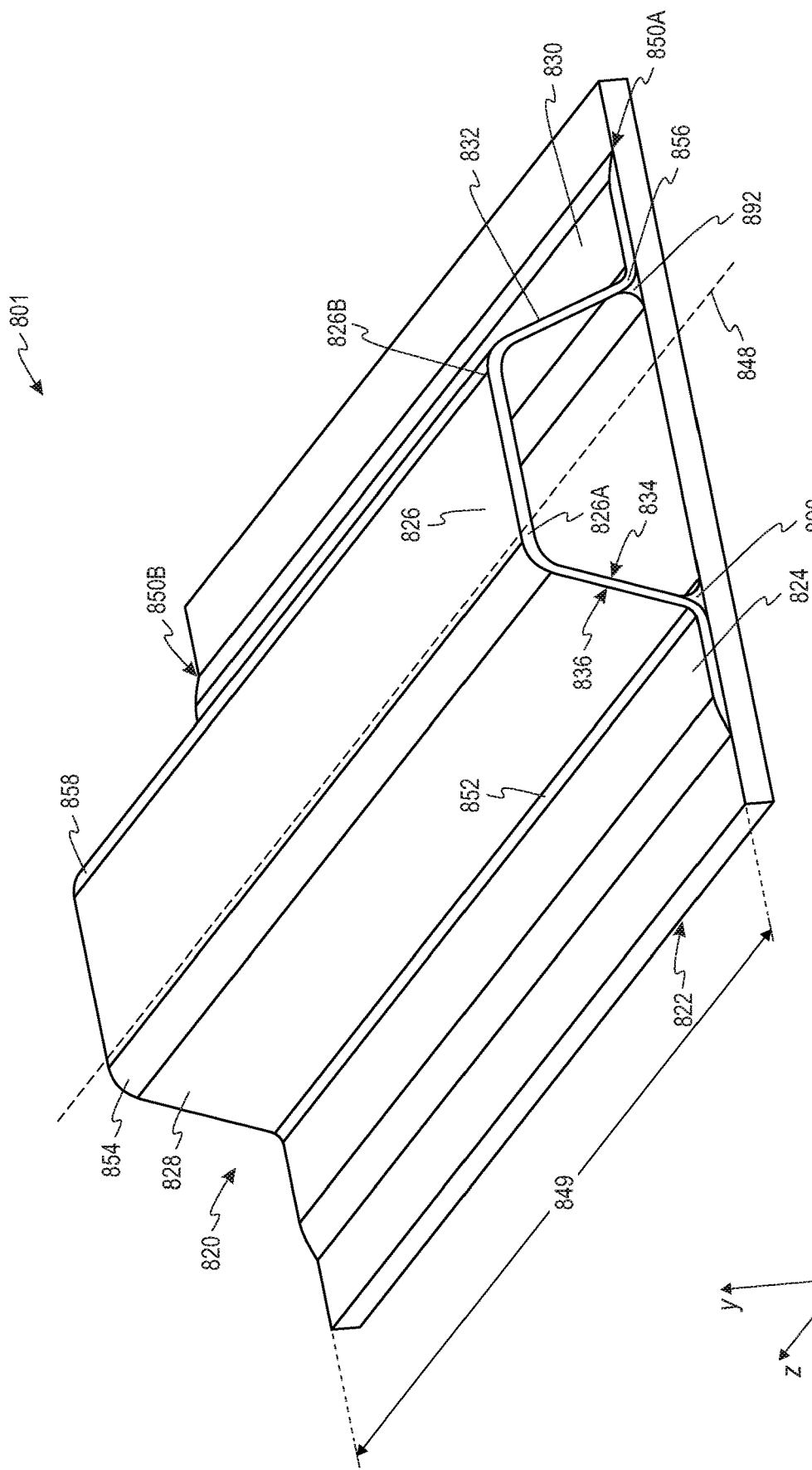
FIG. 8B depicts a perspective view of the composite structure assembly shown in FIG. 8A, according to an example.

Referring now to FIGS. 8A-8B, a composite stringer assembly 801 is illustrated according to an example. In particular, FIG. 8A depicts a side view of the composite stringer assembly 801, and FIG. 8B depicts a perspective view of the composite stringer assembly 801.

As shown in FIGS. 8A-8B, the composite stringer assembly 801 includes a composite stringer 820 and a radius filler 890. The composite stringer assembly 801 can also include a support structure 822 coupled to the composite stringer 820 and/or the radius filler 890. In FIGS. 8A-8B, the support structure 822 includes a skin 823 of a vehicle and a base charge 888. However, in another example, the support structure 822 can include the skin 823 of the vehicle and omit the base charge 888. More generally, as described above, the support structure 822 can include at least one of the skin 823 of the vehicle or the base charge 888.

As shown in FIGS. 8A-8B, the composite stringer 820 includes a skin flange 824 that is configured to be coupled to the support structure 822, a web 828, a lower corner portion 852 extending from the skin flange 824 to the web 828. The composite stringer 820 also includes (i) an inner surface 834 extending along the skin flange 824, the lower corner portion 852, and the web 828, and (ii) an outer surface 836 extending along the skin flange 824, the lower corner portion 852, and the web 828. The inner surface 834 faces the support structure 822 when the skin flange 824 is coupled to the support structure 822, and the outer surface 836 faces away from the support structure 822 when the skin flange 824 is coupled to the support structure 822.

In FIGS. 8A-8B, the composite stringer 820 is in the form of a hat-shaped stringer. As such, the composite stringer 820 can also include a top flange 826, an upper corner portion 854 extending from the web 828 to the top flange 826. The web 828 and the upper corner portion 854 can extend from a first side 826A of the top flange 826. Additionally, as a hat-shaped stringer, the composite stringer 820 can further include a second skin flange 830 configured to be coupled to the support structure 822 and a second web 832 extending between the second skin flange 830 and a second side 826B of the top flange 826. The composite stringer 820 can also include a second lower corner portion 856 extending form the second skin flange 830 to the second web 832, and a second upper corner portion 858 extending from the second web 832 to the top flange 826.

Although the composite stringer 820 shown in FIGS. 8A-8B is a hat-shaped stringer, as described below with respect to FIGS. 12-15, the principles described with respect to FIGS. 8A-8B can extend to apply to other types of composite stringers (e.g., J-shaped stringers, C-shaped stringers, I-shaped stringers, and/or Z-shaped stringers). In particular, the concepts and principles described herein can be applied to any type of composite stringer that includes at least the skin flange 824, the web 828, and the lower corner portion 852 extending from the skin flange 824 to the web 828.

Within examples, the skin flange 824, the web 828, the top flange 826, the second web 832, and/or the second skin flange 830 can have any or all of the features described above with respect to the composite stringer 320 shown in FIGS. 3A-3B and 7. Similarly, the lower corner portion 852, the upper corner portion 854, the second lower corner portion 856, and/or the second upper corner portion 858 can have any of the features described above with respect to the composite stringer 320 shown in FIGS. 3A-3B and 7, and/or the composite structures 470, 570, 670 shown in FIGS. 4-6.

For instance, within examples, the skin flange 824, the web 828, the top flange 826, the second web 832, the second skin flange 830, the lower corner portion 852, the upper corner portion 854, the second lower corner portion 856, and/or the second upper corner portion 858 can include a plurality of plies of composite material. Additionally, for instance, the skin flange 824 can have a first gage 838, the top flange 826 can have a second gage 840, the web 828 can have a third gage 842, the second skin flange 830 can have a fourth gage 844, and/or the second web 832 can have a fifth gage 846. Within examples, these respective gages 838, 840, 842, 844, 846 can be configured as described above.

More particularly, in some examples, the second gage 840 of the top flange 826 can be greater than the first gage 838 of the skin flange 824 and the third gage 842 of the web 828, and/or the second gage 840 of the top flange 826 can be greater than the fourth gage 844 of the second skin flange 830 and the fifth gage 846 of the second web 832. As described above, this can help to increase a strength-to-weight ratio of the composite stringer 820. Additionally or alternatively, it can help to provide greater strength (and/or greater stiffness) at the top flange 826 to enhance load transfer performance, while providing greater flexibility at an interface between the composite stringer 820 and the support structure 822.

Also, in some examples, the first gage 838 of the skin flange 824 can be approximately equal to the third gage 842 of the web 828, and/or the fourth gage 844 of the second skin flange 830 can be approximately equal to the fifth gage 846 of the second web 832. In an implementation in which the first gage 838 of the skin flange 824 is approximately equal to the third gage 842 of the web 828, the lower corner portion 852 can have a gage that is also approximately equal to the first gage 838 and the third gage 842. Similarly, in an implementation in which the fourth gage 844 of the second skin flange 830 is approximately equal to the fifth gage 846 of the second web 832, the second lower corner portion 856 can have a gage that is also approximately equal to the fourth gage 844 and the fifth gage 846. As described above, this configuration of the skin flange 824, the lower corner portion 852, the web 828, the second skin flange 830, the second lower corner portion 856, and/or the second web 832 can help to reduce (or may minimize) a size of the radius filler 890.

Although FIGS. 8A-8B depict the composite stringer 820 having the respective gages 838, 840, 842, 844, 846 described above, the composite stringer 820 can include different respective gages 838, 840, 842, 844, 846 in other examples. For instance, within examples, one or more of the constant radii of curvature features described below can be applied to composite stringers 820 in which the second gage 840 of the top flange 826 is approximately equal to the first gage 838 of the skin flange 824 and the third gage 842 of the web 828, and/or the second gage 840 of the top flange 826 is approximately equal to the third gage 842 of the second skin flange 930 and the fifth gage 846 of the second web 832. Additionally, for example, in an implementation in which the first gage 838 differs from the third gage 842 and/or the fourth gage 844 differs from the fifth gage 846, the lower corner portion 852 and/or the second lower corner portion 856 can have a variable gage to transition between the different gages as described above with respect to FIGS. 4-6.

Additionally, as described above, the lower corner portion 852 can provide a transition section between the skin flange 824 and the web 828, whereas the upper corner portion 854 can provide a transition section between the web 828 and the top flange 826. Similarly, the second lower corner portion 856 can provide a transition section between the second skin flange 830 and the second web 832, whereas the second upper corner portion 858 can provide a transition section between the second web 832 and the top flange 826.

For example, in FIGS. 3A-3B, the skin flange 824, the web 828, the top flange 826, the second web 832, and the second skin flange 830 can be planar portions of the composite stringer 820 that each extend in a respective plane in space. For instance, FIGS. 8A-8B indicate a coordinate system 860, and FIG. 8A depicts the composite stringer assembly 801 in an X-Y plane of the coordinate system 860. As shown in FIGS. 8A-8B, the skin flange 824 can be a planar portion of the composite stringer 820 extending in a first plane parallel to an X-Z plane of the coordinate system 860, the web 828 can be a planar portion of the composite stringer 820 extending in a second plane is transverse to the X-Z plane of the coordinate system 860, the second web 832 can be a planar portion of the composite stringer 820 extending in a third plane is transverse to the X-Z plane of the coordinate system 860, and the top flange 826 can be a planar portion of the composite stringer 820 extending in a fourth plane that is parallel to the X-Z plane of the coordinate system 860. In this arrangement, the second plane and the third plane are transverse to the first plane and the fourth plane.

Accordingly, the respective planes in which the skin flange 824, the web 828, the top flange 826, the second web 832, and the second skin flange 830 extend can be different from each other. As such, the lower corner portion 852, the upper corner portion 854, the second lower corner portion 856, and/or the second upper corner portion 858 can include a curved shape that facilitates transitioning from one plane to another.

As shown in FIG. 8A, at the lower corner portion 852, the outer surface 836 is defined by a first radius of curvature R1. In FIGS. 8A-8B, the first radius of curvature R1 is substantially constant between the skin flange 824 and the web 828. Additionally, as shown in FIG. 8A, at the second lower corner portion 856, the outer surface 836 is defined by the first radius of curvature R1. In FIGS. 8A-8B, the first radius of curvature R1 is substantially constant between the second skin flange 830 and the second web 832. Forming the lower corner portion 852 and/or the second lower corner portion 856 with the constant first radius of curvature R1 can help to reduce a size of the radius filler 890, improve strength of the composite stringer assembly 801, simplify tooling requirements, and/or reduce variability among a plurality of composite stringers 820.

As shown in FIGS. 8A-8B, the radius filler 890 can be coupled to the composite stringer 820 and the support structure 822 at a radius filler region between the lower corner portion 852 and the support structure 822 and/or a radius filler region between the second lower corner portion 856 and the support structure 822. Within examples, the radius filler 890 can be made from a composite material (e.g., CFRP) and/or an adhesive/epoxy material. The radius fillers 890 can help to strengthen and/or improve a durability of the composite stringer assembly 801 at the lower corner portion 852 and/or the second lower corner portion 856.

Also, as shown in FIGS. 8A-8B, the radius filler 890 includes a first surface 890A coupled to the inner surface 834 at the lower corner portion 852, a second surface 890B configured to couple to the support structure 822, and a third surface 890C extending between the first surface 890A and the second surface 890B. In an example, the second surface 890B of the radius filler 890 can be configured to couple to the support structure 822 by having a shape that generally conforms to a shape of the support structure 822.

In FIGS. 8A-8B, the first surface 890A of the radius filler 890 is defined by a second radius of curvature R2, and the second radius of curvature R2 is substantially constant between the second surface 890B and the third surface 890C. This can also help to reduce a size of the radius filler 890, improve strength of the composite stringer assembly 801, simplify tooling requirements, and/or reduce variability among a plurality of composite stringers 820.

In FIGS. 8A-8B, at the lower corner portion 852, the inner surface 834 is also defined by the second radius of curvature R2. Forming the first surface 890A of the radius filler 890 and the inner surface 834 at the lower corner portion 852 to be defined the second radius of curvature R2 can help to strengthen the coupling between the radius filler 890 and the inner surface 834 at the lower corner portion 852 and/or simplify tooling requirements for forming the composite stringer assembly 801.

As shown in FIG. 8A, the second radius of curvature R2 can be approximately equal to a sum of the first radius of curvature R1 and the first gage 838 of the skin flange 824. In one example, the first radius of curvature R1 can be between approximately 3.0 mm and approximately 130.0 mm, the first gage 838 can be between approximately 0.6 mm and approximately 12.0 mm, and thus the second radius of curvature R2 can be between approximately 3.6 mm and approximately 142.0 mm. In another example, the first radius of curvature R1 can be between approximately 4.0 mm and approximately 100.0 mm, the first gage 838 can be between approximately 1.0 mm and approximately 8.0 mm, and thus the second radius of curvature R2 can be between approximately 5.0 mm and approximately 108.0 mm. Within examples, reducing the first radius of curvature R1 can help to reduce a cost of tooling and/or a cost of fabrication for the composite stringer 820.

Also, as shown in FIG. 8A, the third surface 890C of the radius filler 890 can be defined by a third radius of curvature R3, and the third radius of curvature R3 can be substantially constant between the first surface 890A and the second surface 890B. This can additionally or alternatively help to reduce (or may minimize) a size of the radius filler 890, improve strength of the composite stringer assembly 801, and/or simplify tooling requirements for forming the composite stringer assembly 801. In some examples, the third radius of curvature R3 of the third surface 890C can be approximately equal to second radius of curvature R2. This can further help to simplify tooling requirements for forming the composite stringer assembly 801. However, in other examples, the third radius of curvature R3 of the third surface 890C can be different than the second radius of curvature R2.

As shown in FIG. 8B, the composite stringer 820 has a longitudinal axis 848, and the composite stringer 820 has a length 849 between a first end 850A of the composite stringer 820 and a second end 850B of the composite stringer 820. In FIG. 8B, along the longitudinal axis 848, the first radius of curvature R1 is substantially constant over the length 849 of the composite stringer 820. This can also help to reduce a size of the radius filler 890, improve strength of the composite stringer assembly 801, simplify tooling requirements, and/or reduce variability among a plurality of composite stringers 820.

Similarly, along the longitudinal axis 848, the second radius of curvature R2 of the first surface 890A of the radius filler 890 and/or the second radius of curvature R2 of the inner surface 834 at the lower corner portion 852 can be substantially constant over the length 849 of the composite stringer 820. Also, along the longitudinal axis 848, the third radius of curvature R3 of the third surface 890C of the radius filler 890 can be substantially constant over the length 849 of the composite stringer 820. These features can additionally or alternatively help to reduce a size of the radius filler 890, improve strength of the composite stringer assembly 801, simplify tooling requirements for forming the composite stringer assembly 801, and/or reduce variability among a plurality of composite stringers 820.

As shown in FIGS. 8A-8B, the composite stringer assembly 801 can also include a second radius filler 892 coupled to the second lower corner portion 856. The second radius filler 892 can help to strengthen the composite stringer assembly 801 at the second lower corner portion 856. The second radius filler 892 can be substantially similar or identical to the radius filler 890, except the second radius filler 892 is coupled to the second lower corner portion 856 instead of the lower corner portion 852. Accordingly, the second lower corner portion 856 can include a fourth surface 892A coupled to the inner surface 834 at the second lower corner portion 856, a fifth surface 892B configured to couple to the support structure 822, and a sixth surface 892C extending between the fourth surface 892A and the fifth surface 892B.

The second lower corner portion 856 and the second radius filler 992 can include any or all of the features of the first radius of curvature R1, the second radius of curvature R2, and/or the third radius of curvature R3 at portions of the second lower corner portion 856 and the second radius filler 992 that correspond to the portions of the lower corner portion 852 and the radius filler 990 having the first radius of curvature R1, the second radius of curvature R2, and/or the third radius of curvature R3. In particular, the features and concepts described above with respect to the first surface 890A can apply to the fourth surface 892A, the features and concepts described above with respect to the second surface 890B can apply to the fifth surface 892B, and/or the features and concepts described above with respect to the third surface 890C can apply to the sixth surface 892C. Similarly, the features and concepts described above with respect to the inner surface 834 at the lower corner portion 852 can apply to the inner surface 834 at the second lower corner portion 856, and/or the features and concepts described above with respect to the outer surface 836 at the lower corner portion 852 can apply to the outer surface 836 at the second lower corner portion 856.

As described above, a variability among a plurality of composite stringers 820 can be reduced by (i) forming the outer surface 836 at the lower corner portion 852 with the first radius of curvature R1 that is substantially constant and/or (ii) forming the inner surface 834 at the lower corner portion 852 with the second radius of curvature R2 that is substantially constant. Further, reducing the variability of these features among the plurality of composite stringers 820 can help to reduce manufacturing costs and/or simplify tooling requirements forming a composite stringer assembly 801 including a plurality of composite stringers 820.

Figure 9A:
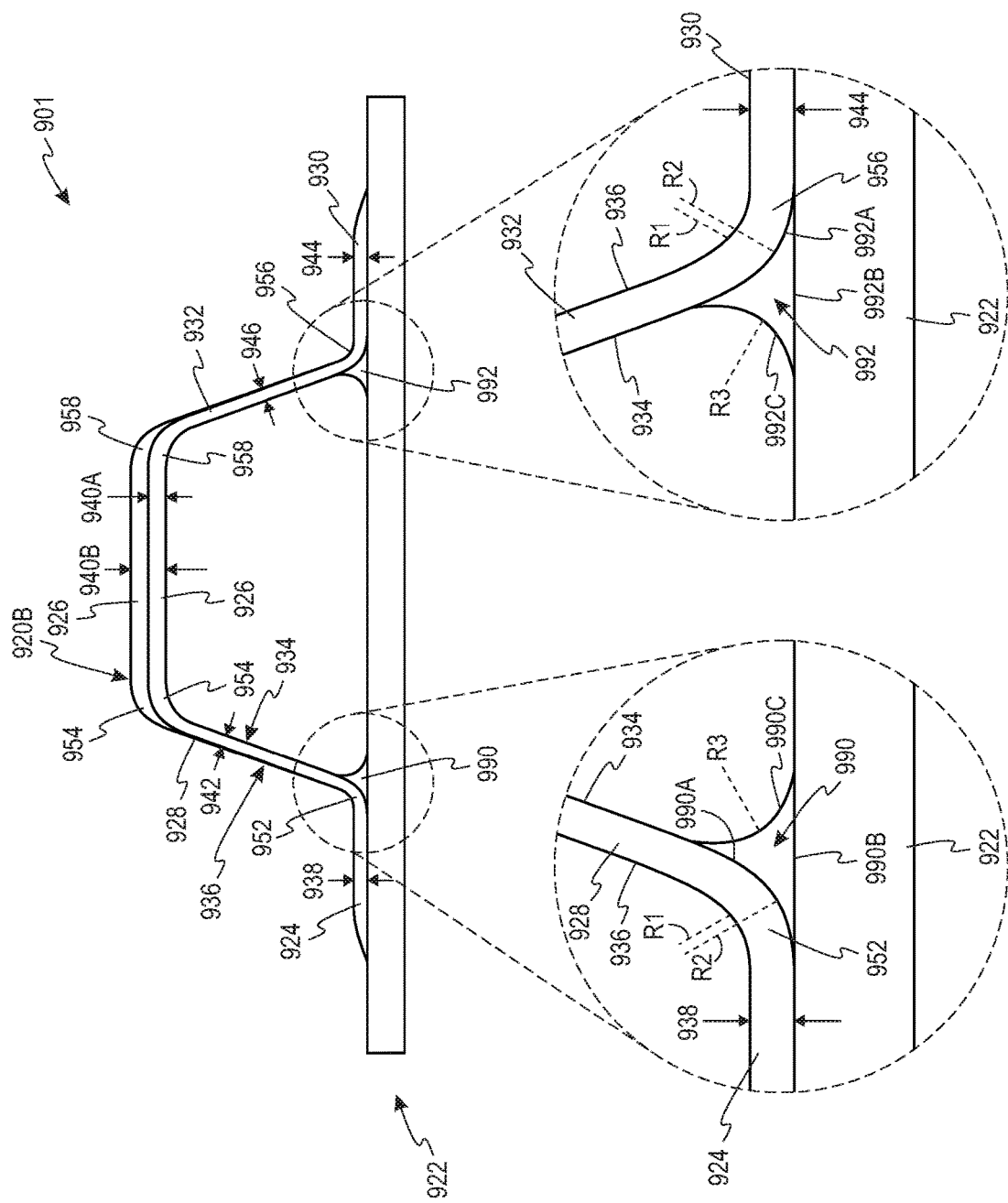
FIG. 9A depicts a side view of a composite structure assembly, according to an example.
Figure 9B:
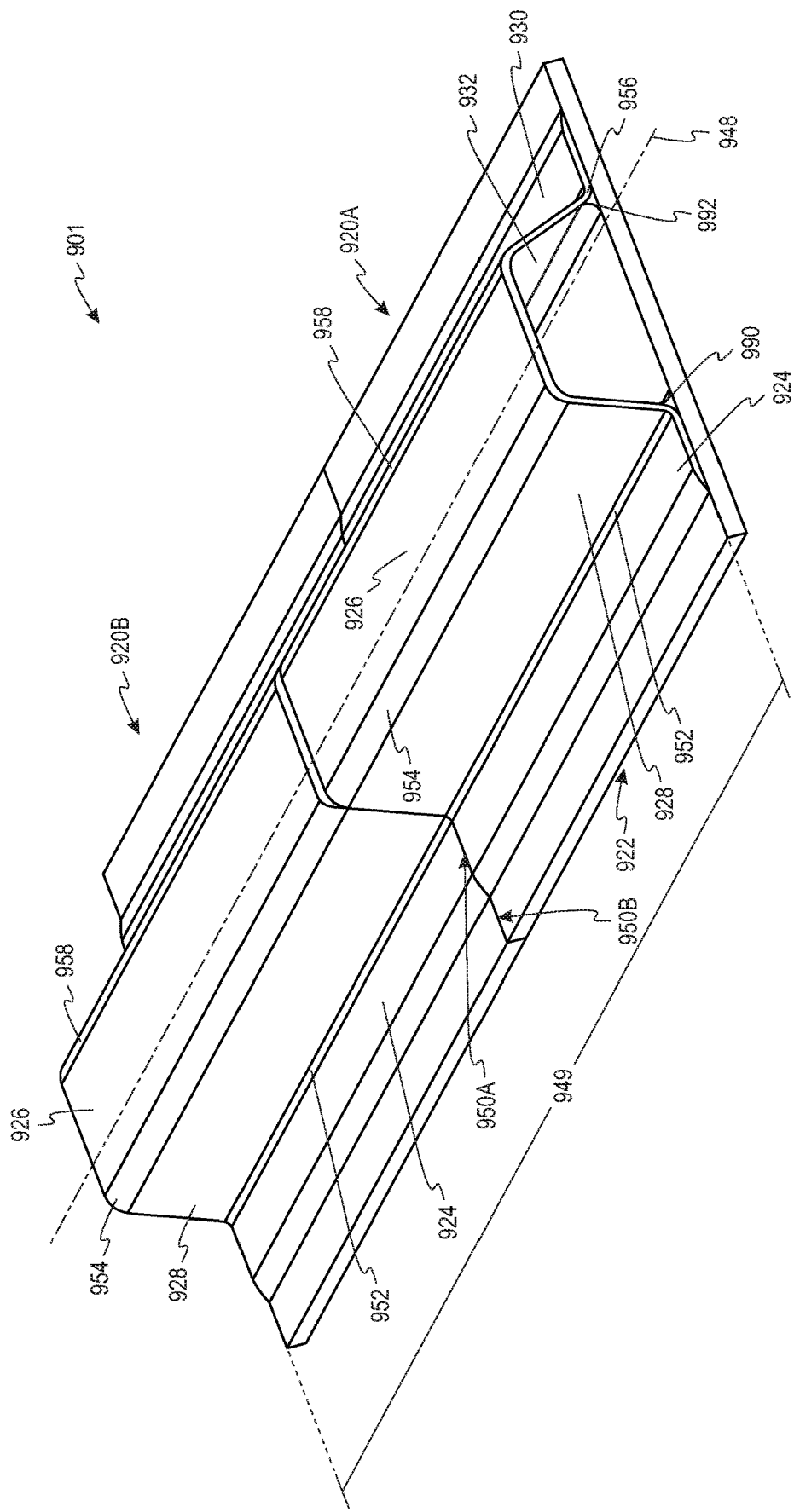
FIG. 9B depicts a perspective view of the composite structure assembly shown in FIG. 9A, according to an example.

For example, a single type of radius filler 890 having one size and/or one shape can be used with a plurality of different types of composite stringers 820 when the outer surfaces 836 and/or the inner surfaces 834 at the lower corner portions 852 of the composite stringers 820 have a common, constant first radius of curvature R1 and/or a common, constant second radius of curvature R2, respectively. For instance, a plurality of composite stringers 820 having different second gages 840 at the top flanges 826 can be coupled with a common type of radius filler 890 when the outer surfaces 836 and/or the inner surfaces 834 at the lower corner portions 852 of the composite stringers 820 have a common, constant first radius of curvature R1 and/or a common, constant second radius of curvature R2, respectively FIGS. 9A-9B depict a composite stringer assembly 901, which includes a support structure 922, a plurality of composite stringers 920A, 920B, and a radius filler 990 according to an example. In particular, FIG. 9A depicts a side view of the composite stringer assembly 901, and FIG. 9B depicts a perspective view of the composite stringer assembly 901.

Within examples, the support structure 922 can include at least one of a skin of a vehicle or a base charge (e.g., the skin 323, 823 and/or the base charge 788, 888 described above). As shown in FIGS. 9A-9B, the composite stringers 920A, 920B include a first composite stringer 920A and a second composite stringer 920B. Although two composite stringers 920A, 920B are shown in FIGS. 9A-9B, the composite stringer assembly 901 can include more than two composite stringers 920A, 920B in other examples.

As shown in FIGS. 9A-9B, the composite stringers 920A, 920B are axially aligned with each other along a longitudinal axis 948 of the composite stringers 920A, 920B. Additionally, as shown in FIG. 9B, a first end 950A of the second composite stringer 920B can abut against a second end 950B of the first composite stringer 920A.

The composite stringers 920A, 920B can be substantially similar or identical to the composite stringers 320, 820 described above. For example, as shown in FIGS. 9A-9B, each composite stringer 920A, 920B can include a skin flange 924 configured to be coupled to the support structure 922, a web 928, lower corner portion 952 extending from the skin flange 924 to the web 928, a top flange 926, an upper corner portion 954 extending from the web 928 to the top flange 926. Additionally, for example, each composite stringer 920A, 920B can include (i) an inner surface 934 extending along the skin flange 924, the lower corner portion 952, the web 928, the upper corner portion 954, and the top flange 926, and (ii) an outer surface 936 extending along the skin flange 924, the lower corner portion 952, the web 928, the upper corner portion 954, and the top flange 926.

In FIGS. 9A-9B, at the lower corner portion 952 of each composite stringer 920A, 920B, the outer surface 936 is defined by a first radius of curvature R1 and the first radius of curvature R1 is substantially constant between the skin flange 924 and the web 928 of the composite stringer 920A, 920B. Additionally, in FIGS. 9A-9B, at the lower corner portion 952 of each composite stringer 920A, 920B, the inner surface 934 can be defined by a second radius of curvature R2 and the second radius of curvature R2 can be substantially constant between the skin flange 924 and the web 928 of the composite stringer 920A, 920B. As such, in FIGS. 9A-9B, the lower corner portion 952 of the first composite stringer 920A and the lower corner portion 952 of the second composite stringer 920B are both defined by the same first radius of curvature R1 and/or the same second radius of curvature R2. Thus, in an arrangement in which the composite stringers 920A, 920B can be axially aligned and positioned end-to-end as shown in FIGS. 9A-9B, a radius filler region between the lower corner portions 952 and the support structure 922 can have a substantially similar or identical shape, size, and/or alignment.

The radius filler 990 can be substantially similar or identical to the radius filler 890 described above with respect to FIGS. 8A-8B. For example, the radius filler 990 can include a first surface 990A coupled to the inner surface 934 at the lower corner portion 952 of each composite stringer 920A, 920B, a second surface 990B configured to couple to the support structure 922, and a third surface 990C extending between the first surface 990A and the second surface 990B. In FIGS. 9A-9B, the first surface 990A of the radius filler 990 also can be defined by the second radius of curvature R2, and the second radius of curvature R2 can be substantially constant between the second surface 990B and the third surface 990C. Also, in FIGS. 9A-9B, the second radius of curvature R2 can be approximately equal to a sum of the first radius of curvature R1 and a first gage 938 of the skin flange 924.

Within examples, along the longitudinal axis 948 shown in FIG. 9B: (i) the composite stringer assembly 901 can have a total length 949 that is equal to a sum of a respective length of each composite stringer 920A, 920B, (ii) the first radius of curvature R1 can be substantially constant over the total length 949 of the composite stringer assembly 901, and (iii) the second radius of curvature R2 can be substantially constant over the total length 949 of the composite stringer assembly 901.

Thus, in this arrangement, a shape and/or a size of the first surface 990A of the radius filler 990 can substantially match both (i) a shape and/or a size of the lower corner portion 352 of the first composite stringer 920A and (ii) a shape and/or a size of the lower corner portion 352 of the second composite stringer 920B. As described above, this can help to reduce manufacturing costs and/or simplify tooling requirements for forming the composite stringer assembly at least because the radius filler 990 can extend along the plurality of composite stringers 920A, 920B with a constant shape that is compatible with those composite stringers 920A, 920B.

As shown in FIGS. 9A-9B, the compatibility of the radius filler 990 with the composite stringers 920A, 920B can be achieved even when there are variations in at least a portion of the composite stringers 920A, 920B. For example, in FIGS. 9A-9B, the top flange 926 of the first composite stringer 920A of the plurality of composite stringers 920A, 920B has a second gage 940A that is different than a second gage 940B of the top flange 926 of a second composite stringer 920B of the plurality of composite stringers 920A, 920B. Accordingly, within examples, the second gage 940A, 940B of the top flanges 926 can be varied on a per-stringer basis to more specifically tailor a load carrying capability of the composite stringer assembly 901 to expected load conditions at different locations, while simultaneously maintaining a relatively constant configuration of the lower corner portions 952 of the composite stringers 920A, 920B to achieve a relatively universal and/or efficient forming of the radius filler 990.

Within examples, each composite stringer 920A, 920B can also include a second skin flange 930 configured to be coupled to the support structure 922, a second web 932, a second lower corner portion 956 extending from the second skin flange 930 to the second web 932, a second upper corner portion 958 extending from the second web 932 to the top flange 926. The inner surface 934 can also extend along the second skin flange 930, the second lower corner portion 956, the second web 932, and the second upper corner portion 958. The outer surface 936 can also along the second skin flange 930, the second lower corner portion 956, the second web 932, and the second upper corner portion 958. The composite stringer assembly 901 can also include a second radius filler 992 coupled to the second lower corner portion 956 of each composite stringer 920A, 920B. As described above, the second radius filler 992 can be substantially similar or identical to the radius filler 990, except the second radius filler 992 is coupled to the second lower corner portion 956 instead of the lower corner portion 952 of each composite stringer 920A, 920B.

Also, within examples, the skin flange 924, the web 928, the top flange 926, the second web 932, and/or the second skin flange 930 can have any or all of the features described above with respect to the composite stringers 320, 820 shown in FIGS. 3A-3B and 7-8B. Similarly, the lower corner portion 952, the upper corner portion 954, the second lower corner portion 956, and/or the second upper corner portion 958 can have any of the features described above with respect to the composite stringers 320, 820 shown in FIGS. 3A-3B and 7-8B, and/or the composite structures 470, 570, 670 shown in FIGS. 4-6.

For instance, for each composite stringer 920A, 920B, the skin flange 924, the web 928, the top flange 926, the second web 932, the second skin flange 930, the lower corner portion 952, the upper corner portion 954, the second lower corner portion 956, and/or the second upper corner portion 958 can include a plurality of plies of composite material. Additionally, for each composite stringer 920A, 920B, the skin flange 924 can have the first gage 938, the top flange 926 can have the second gage 940A, 940B, the web 928 can have a third gage 942, the second skin flange 930 can have a fourth gage 944, and/or the second web 932 can have a fifth gage 946.

Within examples, these respective gages 938, 940A, 940B, 942, 944, 946 of the composite stringers 920A, 920B can be configured as described above. For instance, for each composite stringer 920A, 920B, the second gage 940A, 940B of the top flange 926 can be greater than the first gage 938 of the skin flange 924 and the third gage 942 of the web 928, and/or the second gage 940A, 940B of the top flange 926 can be greater than the fourth gage 944 of the second skin flange 930 and the fifth gage 946 of the second web 932. As described above, this can help to increase a strength-to-weight ratio of the composite stringers 920A, 920B. Additionally or alternatively, it can help to provide greater strength (and/or greater stiffness) at the top flange 926 to enhance load transfer performance, while providing greater flexibility at an interface between the composite stringer 920 and the support structure 922.

Also, for each composite stringer 920A, 920B, the first gage 938 of the skin flange 924 can be approximately equal to the third gage 942 of the web 928, and/or the fourth gage 944 of the second skin flange 930 can be approximately equal to the fifth gage 946 of the second web 932. In an implementation in which the first gage 938 of the skin flange 924 is approximately equal to the third gage 942 of the web 928, the lower corner portion 952 can have a gage that is also approximately equal to the first gage 938 and the third gage 942. Similarly, in an implementation in which the fourth gage 944 of the second skin flange 930 is approximately equal to the fifth gage 946 of the second web 932, the second lower corner portion 956 can have a gage that is also approximately equal to the fourth gage 944 and the fifth gage 946. As described above, this configuration of the skin flange 924, the lower corner portion 952, the web 928, the second skin flange 930, the second lower corner portion 956, and/or the second web 932 can help to reduce (or may minimize) a size of the radius filler 990 and/or the second radius filler 992.

Also, within examples, the web 928 and the skin flange 924 of the first composite stringer 920A can have a gage that is approximately equal to a gage of the web 928 and the skin flange 924 of the second composite stringer 920B (i.e., the third gage 942 and the first gage 938 of the first composite stringer 920A can be approximately equal to the third gage 942 and the first gage 938 of the second composite stringer 920B). Similarly, for example, the second web 932 and the second skin flange 930 of the first composite stringer 920A can have a gage that is approximately equal to a gage of the second web 932 and the second skin flange 930 of the second composite stringer 920B (i.e., the fifth gage 946 and the fourth gage 944 of the first composite stringer 920A can be approximately equal to the fifth gage 946 and the fourth gage 944 of the second composite stringer 920B). This can additionally or alternatively help to reduce (or may minimize) variability among the composite stringers 920A, 920B at the lower corner portion 952 and/or the second lower corner portion 956.

Figure 10:
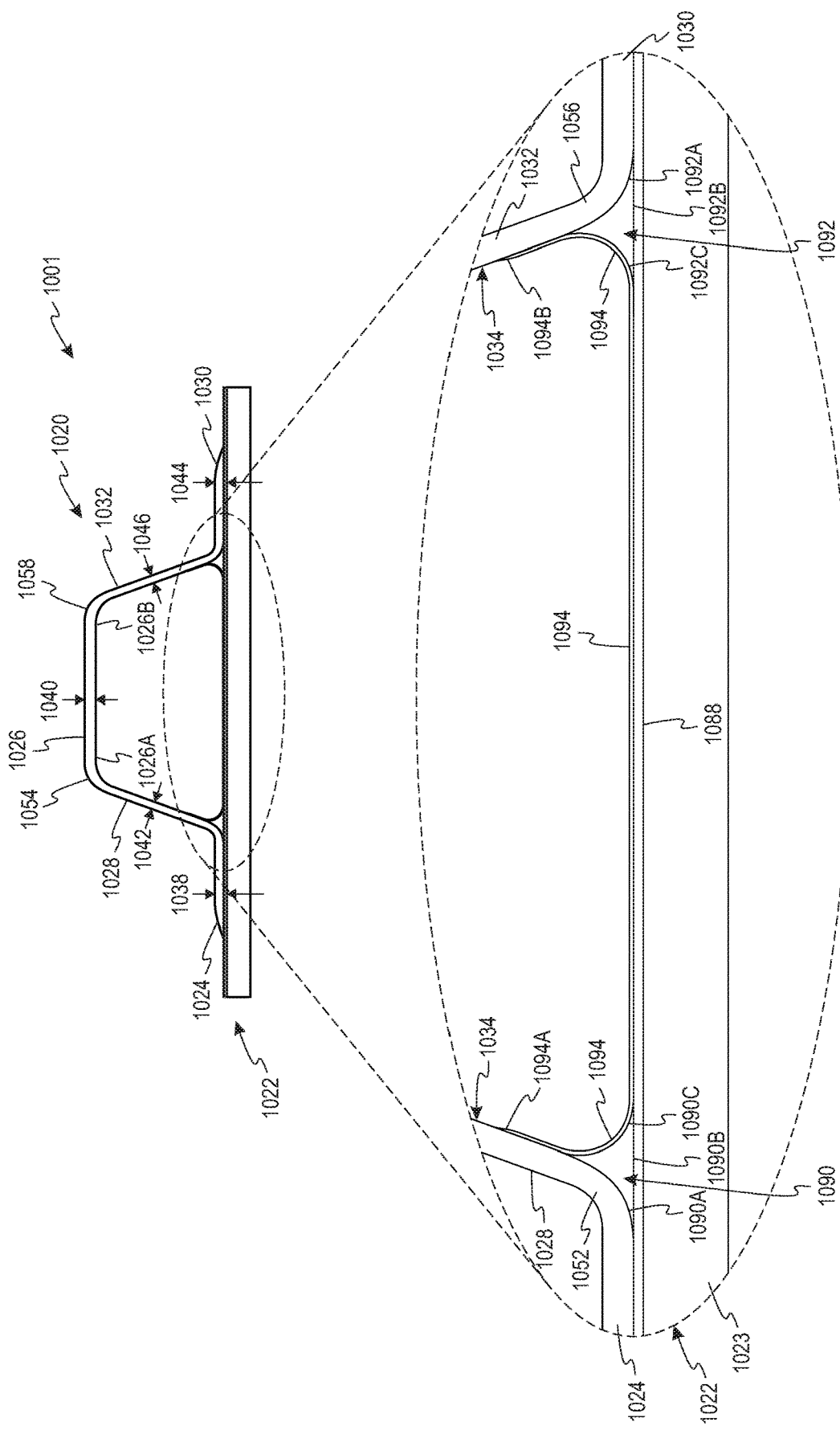
FIG. 10 depicts a side view of a composite structure assembly, according to an example.

Referring now to FIG. 10, a composite stringer assembly 1001 is shown according to another example. As shown in FIG. 10, the composite stringer assembly 1001 includes a composite stringer 1020, a radius filler 1090, and an overwrap layer 1094. The composite stringer assembly 1001 can also include a support structure 1022 coupled to the composite stringer 1020, the radius filler 1090, and/or the overwrap layer 1094. In FIG. 10 the support structure 1022 includes a skin 1023 of a vehicle and a base charge 1088. However, in another example, the support structure 1022 can include the skin 1023 of the vehicle and omit the base charge 1088. More generally, as described above, the support structure 1022 can include at least one of the skin 1023 of the vehicle or the base charge 1088.

The composite stringer 1020 can be substantially similar or identical to the composite stringers 320, 820, 920A, 920B described. For example, as shown in FIG. 10, the composite stringer 1020 includes a skin flange 1024 that is configured to be coupled to the support structure 1022, a web 1028, a lower corner portion 1052 extending from the skin flange 1024 to the web 1028, and an inner surface 1034 extending along the skin flange 1024, the lower corner portion 1052, and the web 1028.

In some examples, the composite stringer 1020 can be in the form of a hat-shaped stringer. As such, the composite stringer 1020 can also include a top flange 1026, an upper corner portion 1054 extending from the web 1028 to the top flange 1026. The web 1028 and the upper corner portion 1054 can extend from a first side 1026A of the top flange 1026. Additionally, as a hat-shaped stringer, the composite stringer 1020 can further include a second skin flange 1030 configured to be coupled to the support structure 1022 and a second web 1032 extending between the second skin flange 1030 and a second side 1026B of the top flange 1026. The composite stringer 1020 can also include a second lower corner portion 1056 extending form the second skin flange 1030 to the second web 1032, and a second upper corner portion 1058 extending from the second web 1032 to the top flange 1026.

In this arrangement, the inner surface 1034 can also extend along the upper corner portion 1054, the top flange 1026, the second upper corner portion 1058, the second web 1032, the second lower corner portion 1056, and/or the second skin flange 1030. The composite stringer 1020 can also include an outer surface 1036 extending along the skin flange 1024, the lower corner portion 1052, the web 1028, the upper corner portion 1054, the top flange 1026, the second upper corner portion 1058, the second web 1032, the second lower corner portion 1056, and/or the second skin flange 1030. The inner surface 1034 faces the support structure 1022 when the skin flange 1024 and/or the second skin flange 1030 are coupled to the support structure 1022, and the outer surface 1036 faces away from the support structure 1022 when the skin flange 1024 and/or the second skin flange 1030 are coupled to the support structure 1022.

Although the composite stringer 1020 shown in FIG. 10 is a hat-shaped stringer, as described below with respect to FIGS. 12-15, the principles described with respect to FIG. 10 can extend to apply to other types of composite stringers (e.g., J-shaped stringers, C-shaped stringers, I-shaped stringers, and/or Z-shaped stringers). In particular, the concepts and principles described herein can be applied to any type of composite stringer that includes at least the skin flange 1024, the web 1028, and the lower corner portion 1052 extending from the skin flange 1024 to the web 1028.

Within examples, the skin flange 1024, the web 1028, the top flange 1026, the second web 1032, and/or the second skin flange 1030 can have any or all of the features described above with respect to the composite stringers 320, 820, 920A, 920B shown in FIGS. 3A-3B and 7-9B. Similarly, the lower corner portion 1052, the upper corner portion 1054, the second lower corner portion 1056, and/or the second upper corner portion 1058 can have any of the features described above with respect to the composite stringers 320, 820, 920A, 920B shown in FIGS. 3A-3B and 7-9B, and/or the composite structures 470, 570, 670 shown in FIGS. 4-6.

For instance, in some examples, the skin flange 1024, the web 1028, the top flange 1026, the second web 1032, the second skin flange 1030, the lower corner portion 1052, the upper corner portion 1054, the second lower corner portion 1056, and/or the second upper corner portion 1058 can include a plurality of plies of composite material. Additionally, for example, the skin flange 1024 can have a first gage 1038, the top flange 1026 can have a second gage 1040, the web 1028 can have a third gage 1042, the second skin flange 1030 can have a fourth gage 1044, and/or the second web 1032 can have a fifth gage 1046.

Within examples, these respective gages 1038, 1040, 1042, 1044, 1046 of the composite stringer 1020 can be configured as described above. For instance, the second gage 1040 of the top flange 1026 can be greater than the first gage 1038 of the skin flange 1024 and the third gage 1042 of the web 1028, and/or the second gage 1040 of the top flange 1026 can be greater than the fourth gage 1044 of the second skin flange 1030 and the fifth gage 1046 of the second web 1032. As described above, this can help to increase a strength-to-weight ratio of the composite stringer 1020.

Additionally or alternatively, it can help to provide greater strength (and/or greater stiffness) at the top flange 1026 to enhance load transfer performance, while providing greater flexibility at an interface between the composite stringer 1020 and the support structure 1022.

Also, within examples, the first gage 1038 of the skin flange 1024 can be approximately equal to the third gage 1042 of the web 1028, and/or the fourth gage 1044 of the second skin flange 1030 can be approximately equal to the fifth gage 1046 of the second web 1032. In an implementation in which the first gage 1038 of the skin flange 1024 is approximately equal to the third gage 1042 of the web 1028, the lower corner portion 1052 can have a gage that is also approximately equal to the first gage 1038 and the third gage 1042. Similarly, in an implementation in which the fourth gage 1044 of the second skin flange 1030 is approximately equal to the fifth gage 1046 of the second web 1032, the second lower corner portion 1056 can have a gage that is also approximately equal to the fourth gage 1044 and the fifth gage 1046. As described above, this configuration of the skin flange 1024, the lower corner portion 1052, the web 1028, the second skin flange 1030, the second lower corner portion 1056, and/or the second web 1032 can help to reduce (or may minimize) a size of the radius filler 1090 and/or a second radius filler 1092.

The radius filler 1090 can be substantially similar or identical to the radius fillers 890, 990 described above. For example, the radius filler 1090 can include a first surface 1090A coupled to the inner surface 1034 at the lower corner portion 1052, a second surface 1090B configured to couple to the support structure 1022, and a third surface 1090C extending between the first surface 1090A and the second surface 1090B.

Within examples, the composite stringer assembly 1001 can also include a second radius filler 1092. The second radius filler 1092 can be substantially similar or identical to the second radius fillers 892, 992 described above. For example, the second radius filler 1092 can include a fourth surface 1092A coupled to the inner surface 1034 at the second lower corner portion 1056, a fifth surface 1092B configured to couple to the support structure 1022, and a sixth surface 1092C extending between the fourth surface 1092A and fifth surface 1092B.

The overwrap layer 1094 is coupled to the inner surface 1034 at the web 1028, the third surface 1090C of the radius filler 1090, and the support structure 1022 (e.g., the base charge 1088 of the support structure 1022 or the skin 1023 of the support structure 1022). In this arrangement, the overwrap layer 1094 can help to support the web 1028, the skin flange 1024, and/or the radius filler 1090 and, thus, help to mitigate (or may prevent) delamination between the composite stringer 1020, the radius filler 1090, and/or the support structure 1022.

In one example, the overwrap layer 1094 can include one or more plies of composite material (e.g., the plies 474$_i$, 574$_i$, 674$_j$). In another example, the overwrap layer 1094 can include a quantity of plies of composite material between one ply and six plies. Within examples, the quantity of the plies of composite material that form the overwrap layer 1094 can be based on one or more factors selected from a group of factors consisting of: (i) expected load conditions that may be experienced by the composite stringer assembly 1001, (ii) a location of the composite stringer assembly 1001 in a vehicle (e.g., an aircraft), (iii) the first gage 1038 of the skin flange 1024 and/or the third gage 1042 of the web 1028, (iv) a stiffness of the skin flange 1024 and/or a stiffness of the support structure 1022, (v) one or more radii of curvature of the lower corner portion 1052 and/or the radius filler 1090, and (vi) a weight of the composite stringer assembly 1001.

As shown in FIG. 10, the overwrap layer 1094 can also be coupled to the inner surface 1034 at the second web 1032, the sixth surface 1092C of the second radius filler 1092, and the support structure 1022 (e.g., the base charge 1088 of the support structure 1022 or the skin 1023 of the support structure 1022). Accordingly, in FIG. 10, the overwrap layer 1094 can extend over the support structure 1022 (e.g., over the base charge 1088) from the radius filler 1090 to the second radius filler 1092. Thus, in FIG. 10, the overwrap layer 1094 can also can help to support the second web 1032, the second skin flange 1030, and/or the second radius filler 1092 and, thus, help to further mitigate (or may prevent) delamination between the composite stringer 1020, the second radius filler 1092, and/or the support structure 1022.

More particularly, as shown in FIG. 10, the overwrap layer 1094 can continuously extend from a first end 1094A to a second end 1094B. In FIG. 10, the first end 1094A of the overwrap layer 1094 is at a position that is (i) on the inner surface 1034 at the web 1028 and (ii) above the radius filler 1090. Additionally, the second end 1094B of the overwrap layer 1094 is at a position that is (i) on the inner surface 1034 at the second web 1032 and (ii) above the second radius filler 1092. Within examples, a shear load on the composite stringer assembly 1001 may be relatively low at a point on the web 1028 above the radius filler 1090 and/or a point on the second web 1032 above the second radius filler 1092. Thus, with the first end 1094A and the second end 1094B arranged in this way, the overwrap layer 1094 can be configured to extend over one or more portions of the composite stringer assembly 1001 that may experience a relatively higher shear load, and not extend over one or more portions that may experience a relatively lower shear load. This, in turn, can help to balance the benefits of the additional support against delamination provided by the overwrap layer 1094 against a weight penalty associated with including the overwrap layer 1094.

In one example, the overwrap layer 1094 can be coupled to at least approximately 0.1 inches of the inner surface 1034 at the web 1028 and/or at least approximately 0.1 inches of the inner surface 1034 at the second web 1032. In other words, the first end 1094A of the overwrap layer 1094 can be at a distance of at least approximately 0.1 inches above the radius filler 1090 and/or the second end 1094B of the overwrap layer 1094 can be at a distance of at least approximately 0.1 inches above the second radius filler 1092. In another example, the overwrap layer 1094 can be coupled to at least approximately 0.25 inches of the inner surface 1034 at the web 1028 and/or at least approximately 0.25 inches of the inner surface 1034 at the second web 1032. This can help to improve the overwrap layer 1094 protecting the radius filler 1090. In another example, the overwrap layer 1094 can be coupled to approximately 0.1 inches to approximately 2.5 inches of the inner surface 1034 at the web 1028 and/or approximately 0.1 inches to approximately 2.5 inches of the inner surface 1034 at the second web 1032.

Figure 11:
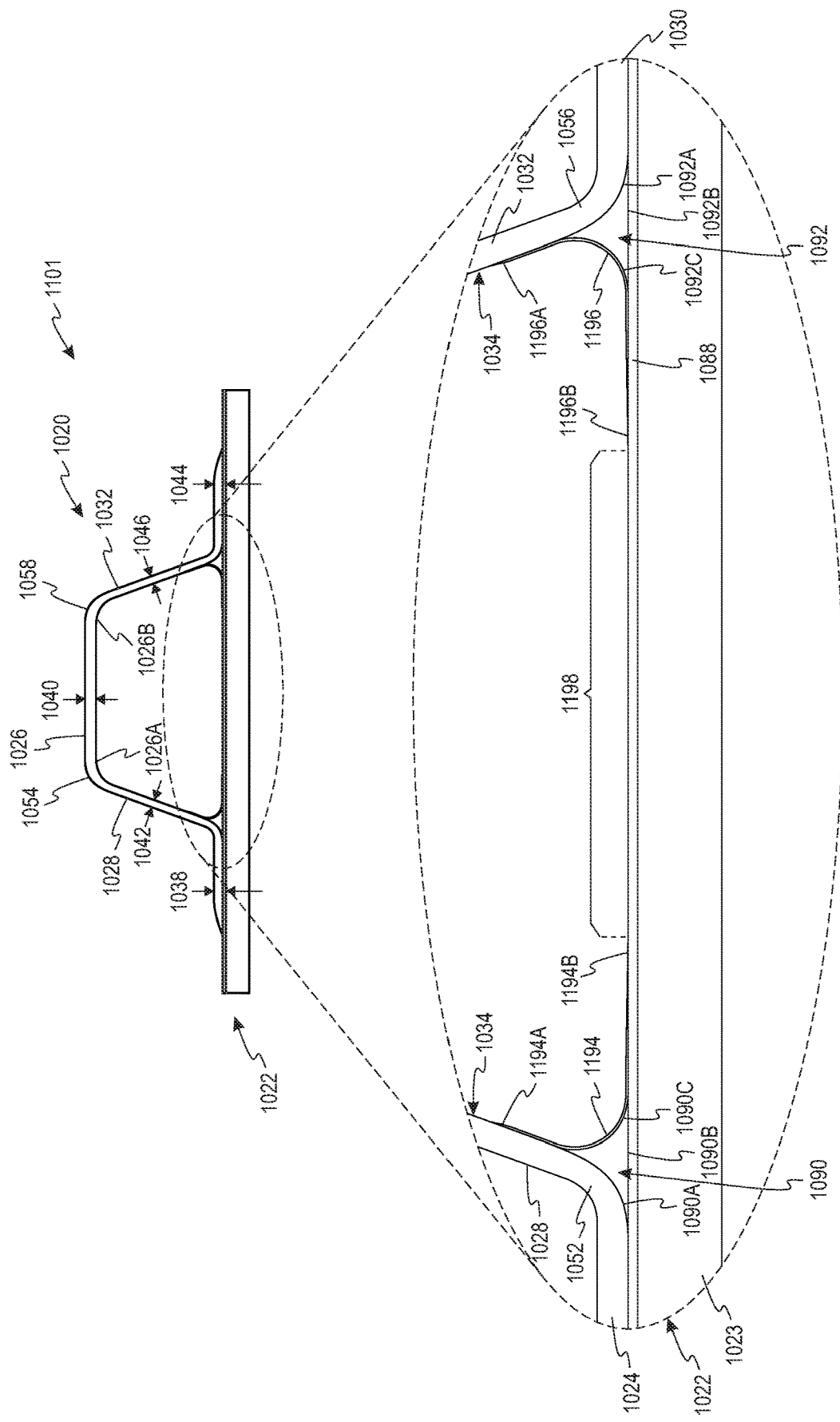
FIG. 11 depicts a side view of a composite structure assembly, according to an example.

In FIG. 10, the overwrap layer 1094 can extend entirely over the support structure 1022 (e.g., over the base charge 1088) between the radius filler 1090 and the second radius filler 1092. However, in another example, the overwrap layer 1094 may not extend entirely over the support structure 1022 between the radius filler 1090 and the second radius filler 1092. An implementation of such example is shown in FIG. 11. In particular, FIG. 11 shows a composite stringer assembly 1101 according to another example.

As shown in FIG. 11, the composite stringer assembly 1101 includes the composite stringer 1020 and the radius filler 1090 described above with respect to Figure. The composite stringer assembly 1101 can also include the support structure 1022 and/or the second radius filler 1092 described above with respect to FIG. 10. The composite stringer assembly 1101 is thus substantially similar or identical to the composite stringer assembly 1001 described above for FIG. 10, except the composite stringer assembly 1101 includes two overwrap layers. Specifically, the composite stringer assembly 1101 includes an overwrap layer 1194 and a second overwrap layer 1196.

The overwrap layer 1194 is coupled to the inner surface 1034 at the web 1028, the third surface 1090C of the radius filler 1090, and the support structure 1022 (e.g., the base charge 1088 of the support structure 1022 or the skin 1023 of the support structure 1022). In this arrangement, the overwrap layer 1194 can help to support the web 1028, the skin flange 1024, and/or the radius filler 1090 and, thus, help to mitigate (or may prevent) delamination between the composite stringer 1020, the radius filler 1090, and/or the support structure 1022.

The second overwrap layer 1196 is coupled to the inner surface 1034 at the second web 1032, the sixth surface 1092C of the second radius filler 1092, and the support structure 1022 (e.g., the base charge 1088 of the support structure 1022 or the skin 1023 of the support structure 1022). Thus, in FIG. 11, the second overwrap layer 1196 can also can help to support the second web 1032, the second skin flange 1030, and/or the second radius filler 1092 and, thus, help to mitigate (or may prevent) delamination between the composite stringer 1020, the second radius filler 1092, and/or the support structure 1022.

As shown in FIG. 11, the overwrap layer 1194 is separated from the second overwrap layer 1196 by a gap 1198 exposing a portion of the support structure 1022 (e.g., the base charge 1088 and/or the skin 1023) between the overwrap layer 1194 and the second overwrap layer 1196. For example, in FIG. 11, (i) the overwrap layer 1194 can extend from a first end 1194A at the inner surface 1034 of the web 1028 to a second end 1194B at the support structure 1022, (ii) the second overwrap layer 1196 can extend from a first end 1196A at the inner surface 1034 of the second web 1032 to a second end 1196B at the support structure 1022, and (iii) the gap 1198 can extend from the first end 1194A of the overwrap layer 1194 to the second end 1196B of the second overwrap layer 1196. Because the composite stringer assembly 1101 includes the gap 1198 between the overwrap layer 1194 and the second overwrap layer 1196, the composite stringer assembly 1101 can be lighter in weight than the composite stringer assembly 1101 in which the overwrap layer 1094 extends entirely over the support structure 1022 between the radius filler 1090 and the second radius filler 1092.

In one example, the overwrap layer 1194 and the second overwrap layer 1196 can each include one or more plies of composite material (e.g., the plies $474_i$, $574_i$, $674_i$). In another example, the overwrap layer 1194 and the second overwrap layer 1196 can each include a quantity of plies of composite material between one ply and six plies. Within examples, the quantity of the plies of composite material that form the overwrap layer 1194 and/or the second overwrap layer 1196 can be based on one or more factors selected from a group of factors consisting of: (i) expected load conditions that may be experienced by the composite stringer assembly 1101, (ii) a location of the composite stringer assembly 1101 in a vehicle (e.g., an aircraft), (iii) the first gage 1038 of the skin flange 1024 and/or the third gage 1042 of the web 1028, (iv) a stiffness of the skin flange 1024 and/or a stiffness of the support structure 1022, (v) one or more radii of curvature of the lower corner portion 1052 and/or the radius filler 1090, and (vi) a weight of the composite stringer assembly 1101.

In one example, the overwrap layer 1194 can be coupled to at least approximately 0.1 inches of the inner surface 1034 at the web 1028 and/or the second overwrap layer 1196 can be coupled to at least approximately 0.1 inches of the inner surface 1034 at the second web 1032. In other words, the first end 1194A of the overwrap layer 1194 can be at a distance of at least approximately 0.1 inches above the radius filler 1090 and/or the first end 1196A of the second overwrap layer 1196 can be at a distance of at least approximately 0.1 inches above the second radius filler 1092. In another example, the overwrap layer 1194 can be coupled to at least approximately 0.25 inches of the inner surface 1034 at the web 1028 and/or the second overwrap layer 1196 can be coupled to at least approximately 0.25 inches of the inner surface 1034 at the second web 1032. In another example, the overwrap layer 1194 can be coupled to approximately 0.1 inches to approximately 2.5 inches of the inner surface 1034 at the web 1028 and/or the second overwrap layer 1196 can be coupled to approximately 0.1 inches to approximately 2.5 inches of the inner surface 1034 at the second web 1032.

As described above, although the composite stringers 320, 820, 920A, 920B, 1020 shown in FIGS. 3A-3B and 7A-11 are in the form of a hat-shaped stringer, the principles described in the present disclosure can extend to apply to other types of composite stringers (e.g., J-shaped stringers, C-shaped stringers, I-shaped stringers, and/or Z-shaped stringers). FIGS. 12-15 depict composite stringer assemblies including additional or alternative types of composite stringers, which can include one or more of the features described above, according to examples.

Figure 12:
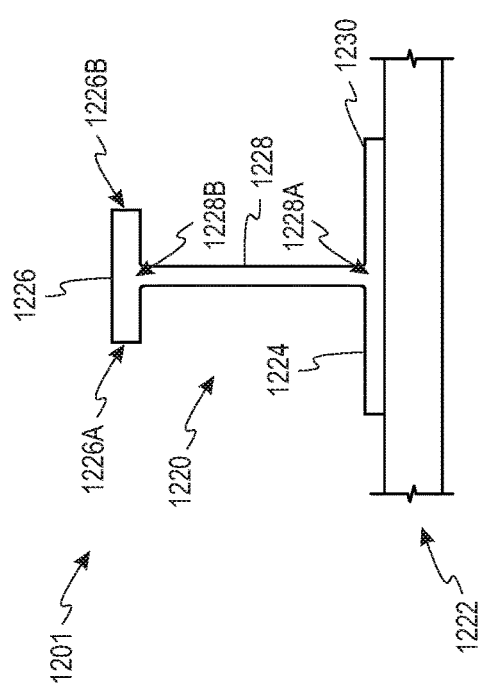
FIG. 12 depicts a side view of a composite structure assembly, according to an example.

FIG. 12 depicts a composite stringer assembly 1201, which includes a composite stringer 1220 in the form of an I-shaped stringer, according to an example. As shown in FIG. 12, the composite stringer 1220 includes a skin flange 1224, a web 1228, a top flange 1226, and a second skin flange 1230. The web 1228 extends from a first end 1228A to a second end 1228B. The skin flange 1224 and the second skin flange 1230 extend from opposing sides of the first end 1228A of the web 1228. A first portion 1226A of the top flange 1226 and a second portion 1226B of the top flange 1226 extend from opposing sides of the second end 1228B of the web 1228. The composite stringer assembly 1201 can also include a support structure 1222, as described above.

Figure 13:
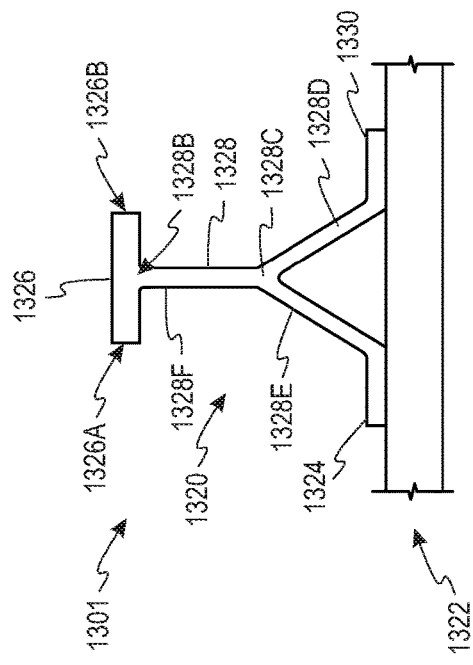
FIG. 13 depicts a side view of a composite structure assembly, according to an example.

FIG. 13 depicts a composite stringer assembly 1301, which includes a composite stringer 1320 in the form of a Y-shaped stringer, according to an example. As shown in FIG. 13, the composite stringer 1320 includes a skin flange 1324, a web 1328, a top flange 1326, and a second skin flange 1330. The web 1328 extends from a first end 1328A to a second end 1328B. Between the first end 1328A and the second end 1328B, the web 1328 includes a vertex 1328C. A first portion 1328D of the web 1328 extends from the vertex 1328C to the skin flange 1324 at the first end 1328A of the web 1328. A second portion 1328E of the web 1328 extends from the vertex 1328C to the second skin flange 1330 at the first end 1328A of the web 1328. A third portion 1328F of the web 1328 extends from the vertex 1328C to the top flange 1326 at the second end 1328B of the web 1328. Additionally, in FIG. 13, a first portion 1326A of the top flange 1326 and a second portion 1326B of the top flange 1326 extend from opposing sides of the second end 1328B of the web 1328. The composite stringer assembly 1301 can also include a support structure 1322, as described above.

Figure 14:
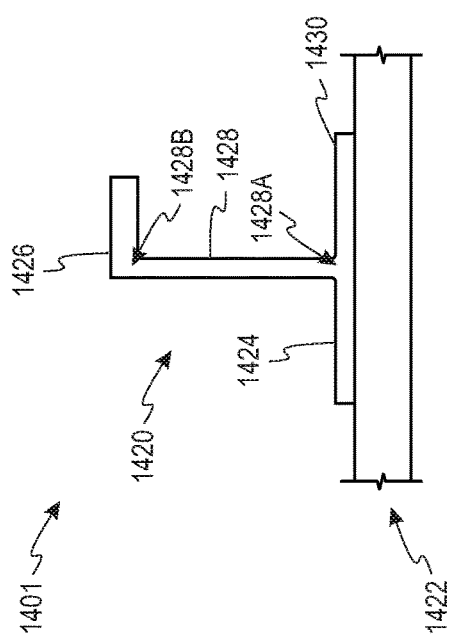
FIG. 14 depicts a side view of a composite structure assembly, according to an example.

FIG. 14 depicts a composite stringer assembly 1401, which includes a composite stringer 1420 in the form of a J-shaped stringer, according to an example. As shown in FIG. 14, the composite stringer 1420 includes a skin flange 1424, a web 1428, a top flange 1426, and a second skin flange 1430. The web 1428 extends from a first end 1428A to a second end 1428B. The skin flange 1424 and the second skin flange 1430 extend from opposing sides of the first end 1428A of the web 1428. The top flange 1426 extend extends from one side of the second end 1428B of the web 1428. The composite stringer assembly 1401 can also include a support structure 1422, as described above.

Figure 15:
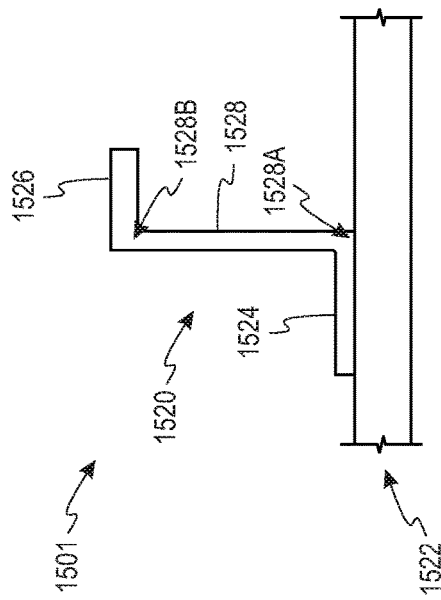
FIG. 15 depicts a side view of a composite structure assembly, according to an example.

FIG. 15 depicts a composite stringer assembly 1501, which includes a composite stringer 1520 in the form of a Z-shaped stringer, according to an example. As shown in FIG. 15, the composite stringer 1520 includes a skin flange 1524, a web 1528, and a top flange 1526. The web 1528 extends from a first end 1528A to a second end 1528B. The skin flange 1524 extends from a first of the web 1528 at the first end 1528A. The top flange 1526 extends from a second side of the web 1528, which is opposite the first side of the web 1528, at the second end 1528B. The composite stringer assembly 1501 can also include a support structure 1522, as described above.

Within examples, the composite stringer assemblies 1201, 1301, 1401, 1501 can include one or more of the features described above with respect to FIGS. 3A-11. For example, in FIGS. 12-15, the top flange 1226, 1326, 1426, 1526 can have a second gage that is greater than a first gage of the skin flange 1224, 1324, 1424, 1524 and the web 1228, 1328, 1428, 1528. Additionally, for example, the skin flange 1224, 1324, 1424, 1524 can have a gage that is approximately equal to a gage of the web 1228, 1328, 1428, 1528.

The composite stringers 1220, 1320, 1420, 1520 can additionally or alternatively include one or more corner portions between the skin flange 1224, 1324, 1424, 1524, the web 1228, 1328, 1428, 1528, the top flange 1226, 1326, 1426, 1526, and/or the second skin flange 1230, 1330, 1430. Within examples, at least one of the one or more corner portions can have a variable gage as described above with respect to the composite structures 470, 570, 670 and shown in FIGS. 4-6.

Also, within examples, the one or more corner portions additionally or alternatively can be defined by one or more radii of curvature such as, for instance, the first radius of curvature R1 and/or the second radius of curvature R2 described above with respect to FIGS. 8A-9B. Further, within examples, the composite stringer assemblies 1201, 1301, 1401, 1501 can additionally or alternatively include the radius filler 890, 990, 1090, the second radius filler 892, 992, 1092, the overwrap layer 1094, 1194, and/or the second overwrap layer 1196 as described above with respect to FIGS. 8A-11.

Within examples, the composite stringers 220 of the aircraft 100 shown in FIG. 2 or another type of vehicle described above can include any of the composite stringers 320, 820, 920A, 920B, 1020, 1220, 1320, 1420, 1520 described above. Also, within examples, the aircraft 100 or another type of vehicle described above can include any of the composite stringer assemblies 301, 701, 801, 901, 1001, 1101, 1201, 1301, 1401, 1501 described above.

Figure 16:
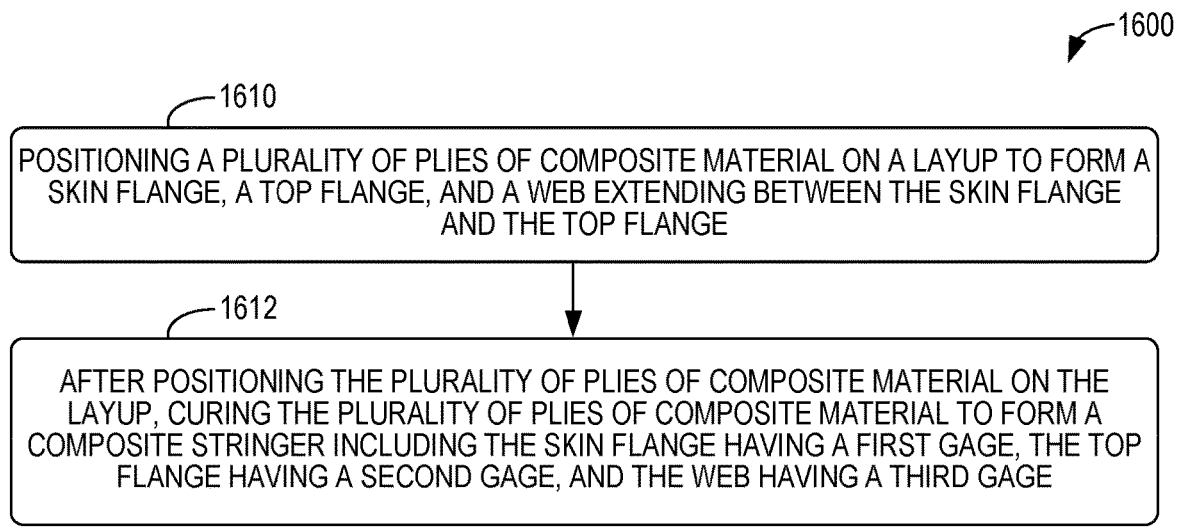
FIG. 16 illustrates a flow chart of an example process for forming a composite stringer, according to an example.

Referring now to FIG. 16, a flowchart for a process 1600 of forming a composite stringer is described according to an example. As shown in FIG. 16, at block 1610, the process 1600 includes positioning a plurality of plies of composite material on a layup to form a skin flange, a top flange, and a web extending between the skin flange and the top flange. After positioning the plurality of plies of composite material on the layup at block 1610, the process 1600 includes curing the plurality of plies of composite material to form a composite stringer including the skin flange having a first gage, the top flange having a second gage, and the web having a third gage at block 1612. The second gage of the top flange is greater than the first gage of the skin flange and the third gage of the web.

Figure 17:
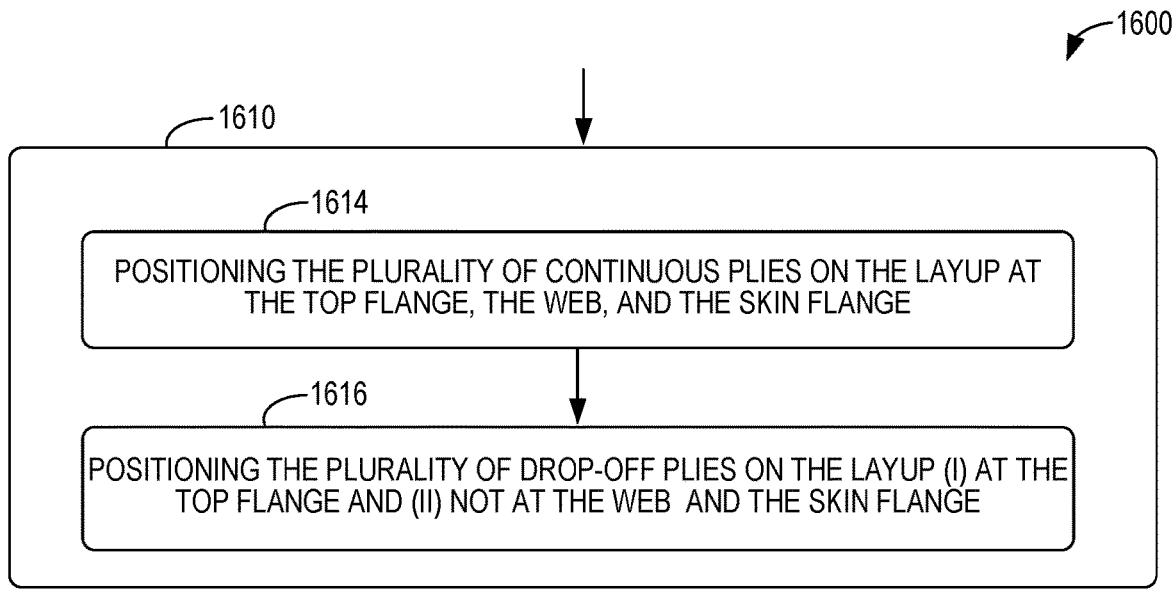
FIG. 17 illustrates a flow chart of an example process for forming a composite stringer that can be used with the process shown in FIG. 16.
Figure 18:
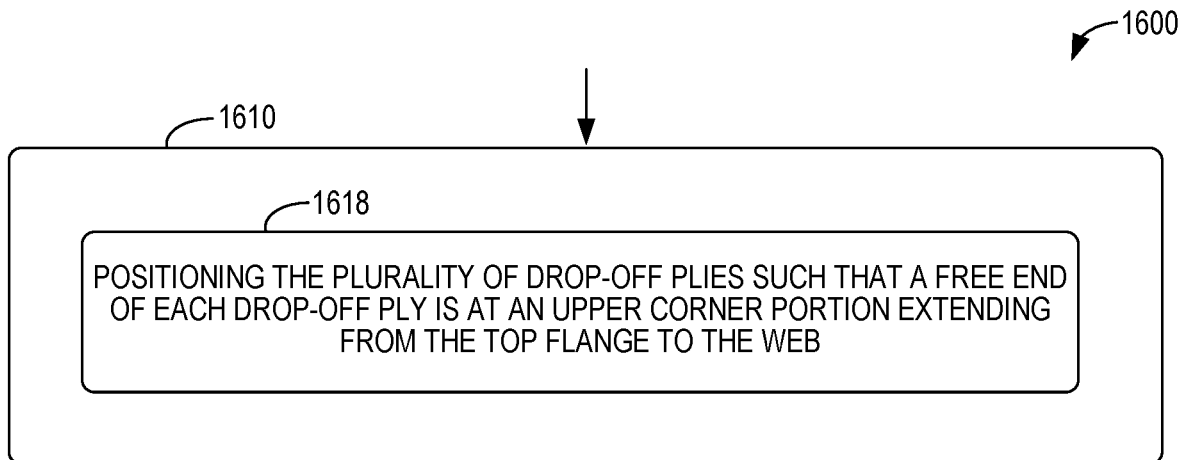
FIG. 18 illustrates a flow chart of an example process for forming a composite stringer that can be used with the process shown in FIG. 17.
Figure 19:
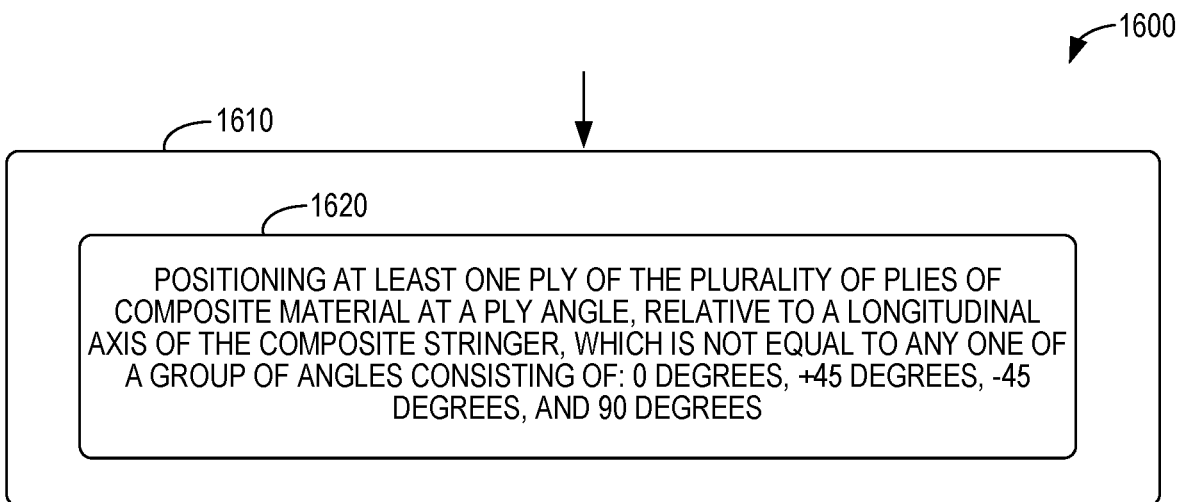
FIG. 19 illustrates a flow chart of an example process for forming a composite stringer that can be used with the process shown in FIG. 16.

FIGS. 17-19 depict additional aspects of the process 1600 according to further examples. In the example of FIG. 17, the plurality of plies of composite material include a plurality of continuous plies and a plurality of drop-off plies. As shown in FIG. 17, positioning the plurality of plies of composite material on the layup at block 1610 includes positioning the plurality of continuous plies on the layup at the top flange, the web, and the skin flange at block 1614, and positioning the plurality of drop-off plies on the layup (i) at the top flange and (ii) not at the web and the skin flange at block 1616.

As shown in FIG. 18, positioning the plurality of plies of composite material on the layup at block 1610 can include positioning the plurality of drop-off plies such that a free end of each drop-off ply is at an upper corner portion extending from the top flange to the web at block 1618. As shown in FIG. 19, positioning the plurality of plies of composite material on the layup at block 1610 can include positioning at least one ply of the plurality of plies of composite material at a ply angle, relative to a longitudinal axis of the composite stringer, which is not equal to any one of a group of angles consisting of: 0 degrees, +45 degrees, −45 degrees, and 90 degrees at block 1620.

Figure 20:
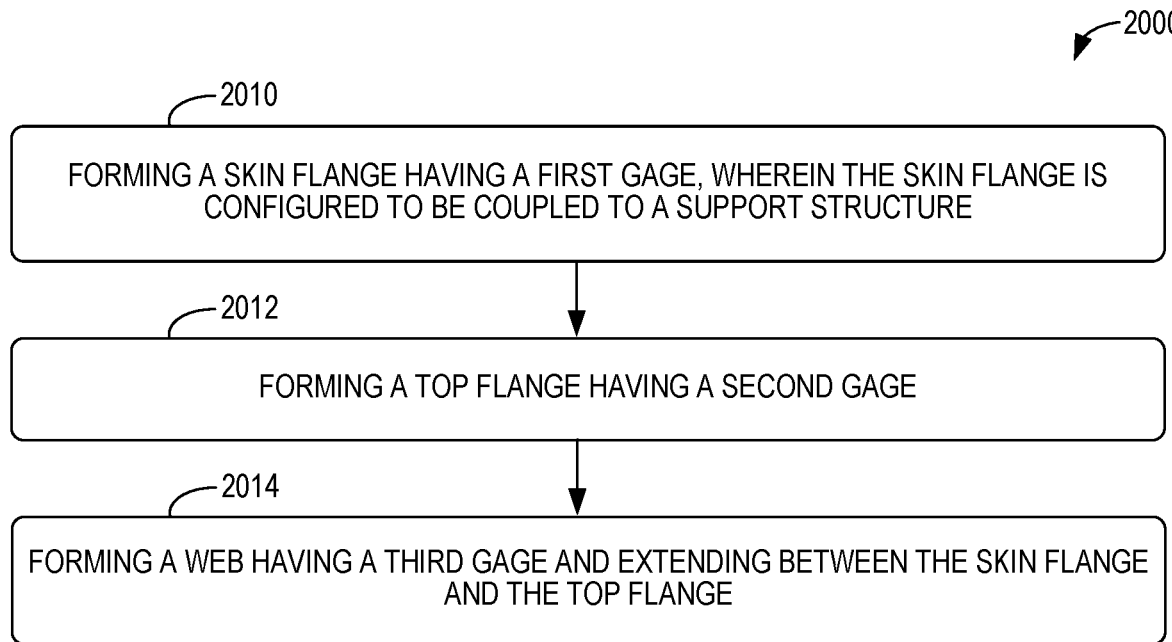
FIG. 20 illustrates a flow chart of an example process for forming a composite stringer, according to an example.

Referring now to FIG. 20, a flowchart for a process 2000 of forming a composite stringer is described according to an example. As shown in FIG. 20, at block 2010, the process 2000 includes forming a skin flange having a first gage. The skin flange is configured to be coupled to a support structure. The support structure includes at least one of a skin of a vehicle or a base charge. At block 2012, the process 2000 includes forming a top flange having a second gage. At block 2014, the process 2000 includes forming a web having a third gage and extending between the skin flange and the top flange. The second gage of the top flange is greater than the first gage of the skin flange and the third gage of the web. The skin flange, the top flange, and the web include a plurality of plies of composite material.

Figure 21:
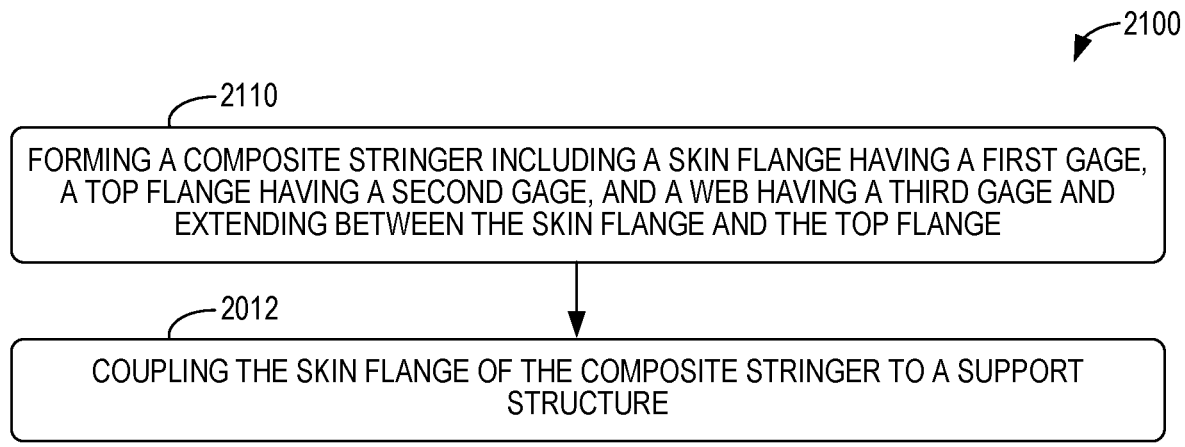
FIG. 21 illustrates a flow chart of an example process for forming a composite stringer assembly, according to an example.

Referring now to FIG. 21, a flowchart for a process 2100 of forming a composite stringer assembly is described according to an example. As shown in FIG. 21, at block 2110, the process 2100 includes forming a composite stringer includes a skin flange having a first gage, a top flange having a second gage, and a web having a third gage and extending between the skin flange and the top flange. The second gage of the top flange is greater than the first gage of the skin flange and the third gage of the web. The skin flange, the top flange, and the web include a plurality of plies of composite material. At block 2112, the process 2100 includes coupling the skin flange of the composite stringer to a support structure. The support structure includes at least one of a skin of a vehicle or a base charge.

Figure 22:
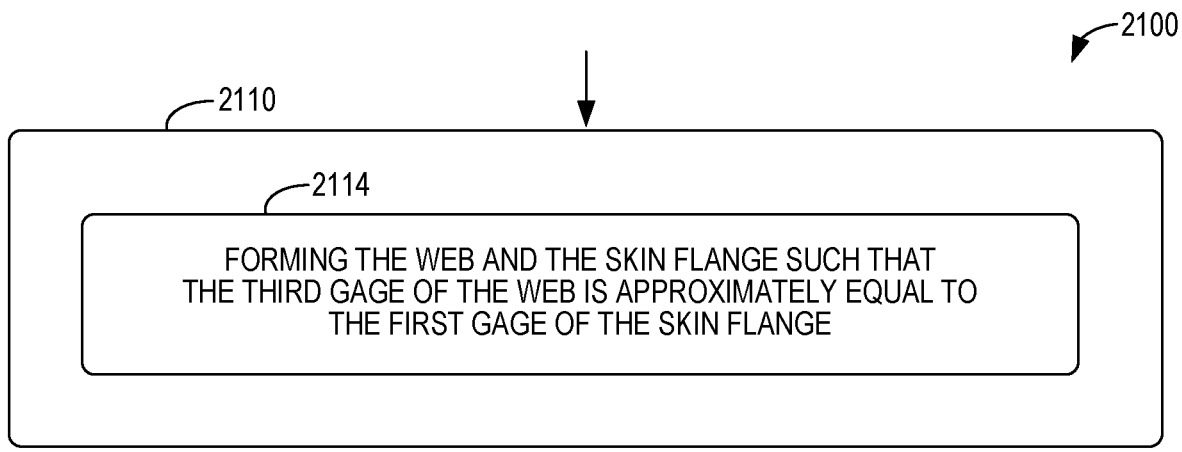
FIG. 22 illustrates a flow chart of an example process for forming a composite stringer assembly that can be used with the process shown in FIG. 21.
Figure 23:
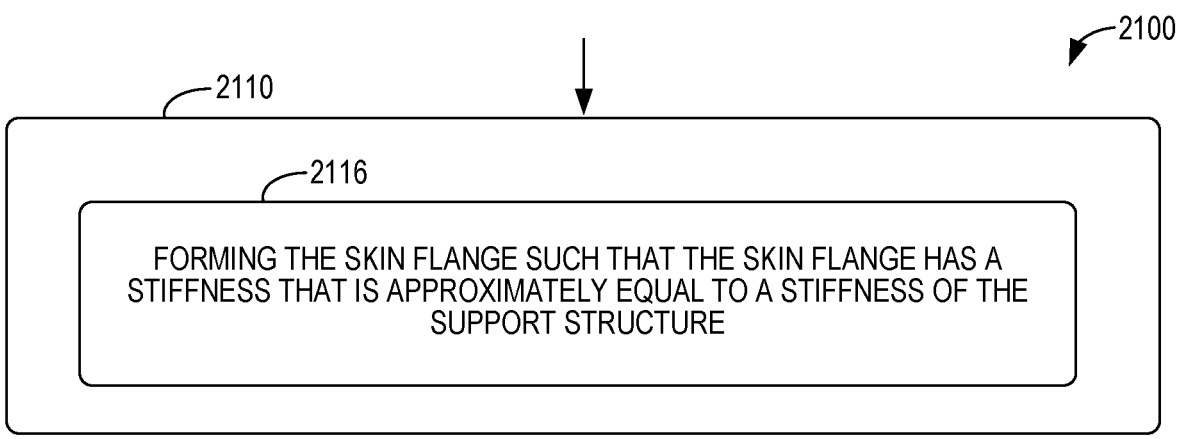
FIG. 23 illustrates a flow chart of an example process for forming a composite stringer assembly that can be used with the process shown in FIG. 21.
Figure 24:
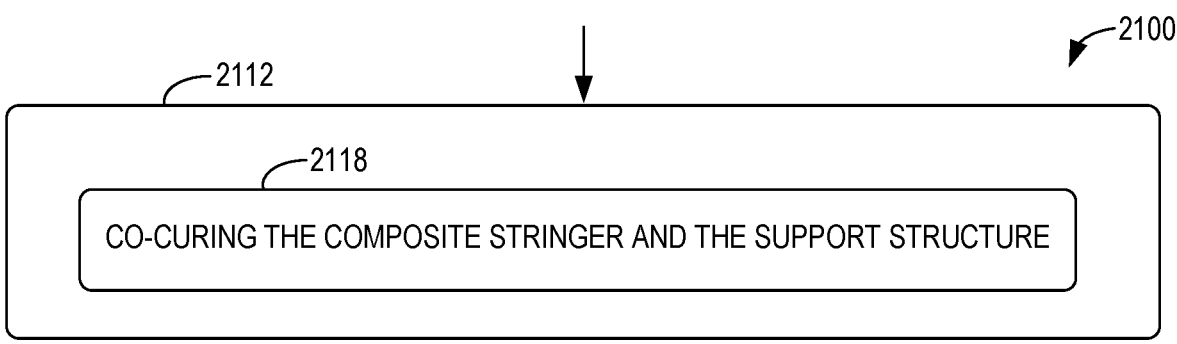
FIG. 24 illustrates a flow chart of an example process for forming a composite stringer assembly that can be used with the process shown in FIG. 21.

FIGS. 22-24 depict additional aspects of the process 2100 according to further examples. As shown in FIG. 22, forming the composite stringer at block 2110 can include forming the web and the skin flange such that the third gage of the web is approximately equal to the first gage of the skin flange at block 2114. As shown in FIG. 23, forming the composite stringer at block 2110 can include forming the skin flange such that the skin flange has a stiffness that is approximately equal to a stiffness of the support structure at block 2116. As shown in FIG. 24, coupling the skin flange of the composite stringer to the support structure at block 2112 can include co-curing the composite stringer and the support structure at block 2118.

Figure 25:
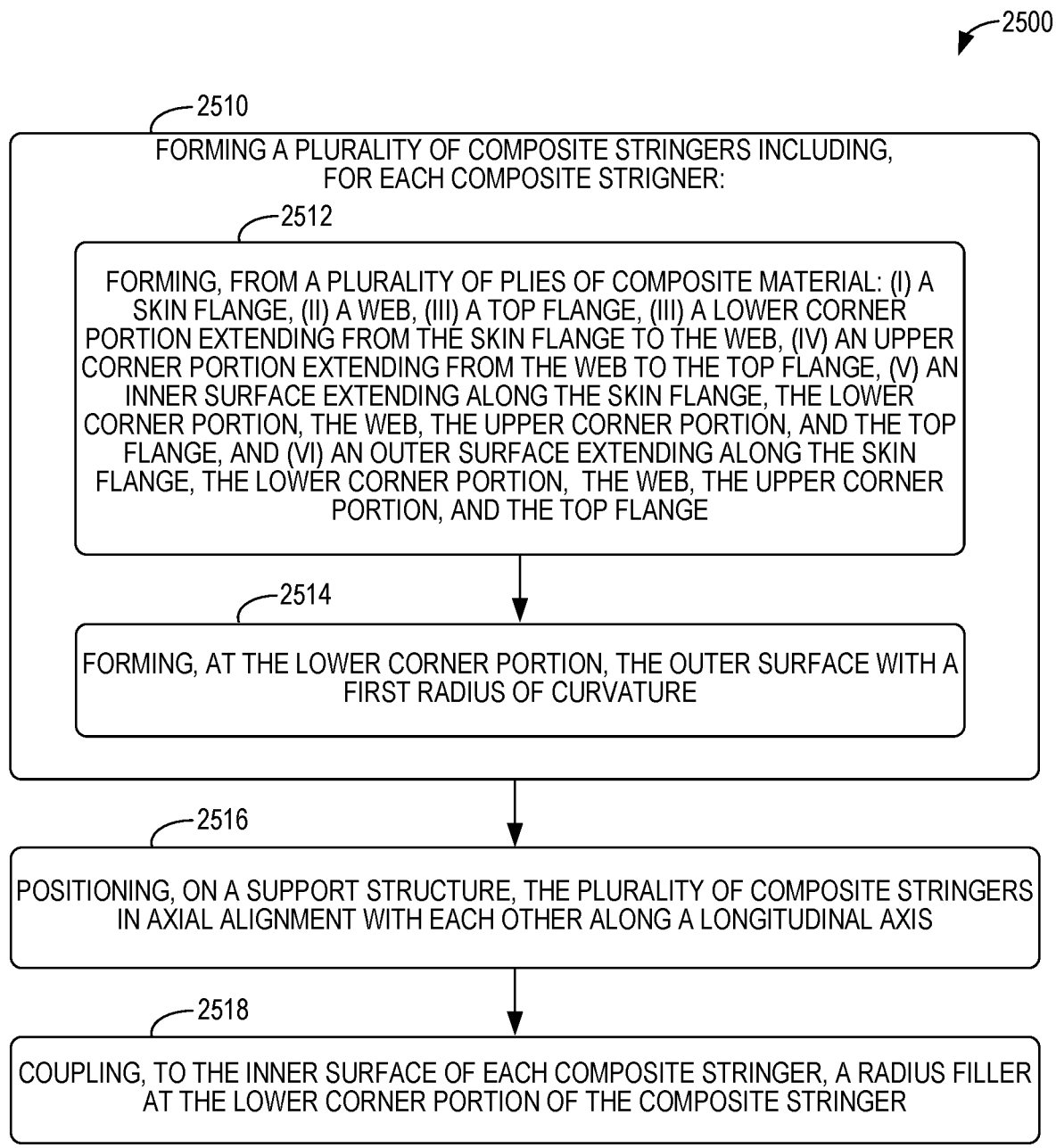
FIG. 25 illustrates a flow chart of an example process for forming a composite stringer assembly, according to an example.

Referring now to FIG. 25, a flowchart for a process 2500 of forming a composite stringer assembly is described according to an example. As shown in FIG. 25, at block 2510, the process 2500 includes forming a plurality of composite stringers. Forming the plurality of composite stringers at block 2510 can include, for each composite stringer, forming, from a plurality of plies of composite material: (i) a skin flange, (ii) a web, (iii) a top flange, (iii) a lower corner portion extending from the skin flange to the web, (iv) an upper corner portion extending from the web to the top flange, (v) an inner surface extending along the skin flange, the lower corner portion, the web, the upper corner portion, and the top flange, and (vi) an outer surface extending along the skin flange, the lower corner portion, the web, the upper corner portion, and the top flange at block 2512. Forming the plurality of composite stringers at block 2510 can also include forming, at the lower corner portion, the outer surface with a first radius of curvature at block 2514.

At block 2516, the process 2500 includes positioning, on a support structure, the plurality of composite stringers in axial alignment with each other along a longitudinal axis. The support structure can include at least one of a skin of a vehicle or a base charge. At block 2518, the process 2500 includes coupling, to the inner surface of each composite stringer, a radius filler at the lower corner portion of the composite stringer. A first surface of the radius filler is defined by a second radius of curvature. Along the longitudinal axis: (i) the composite stringer assembly has a total length that is equal to a sum of a respective length of each composite stringer, (ii) the first radius of curvature is substantially constant over the total length of the composite stringer assembly, and (iii) the second radius of curvature is substantially constant over the total length of the composite stringer assembly.

Figure 26:
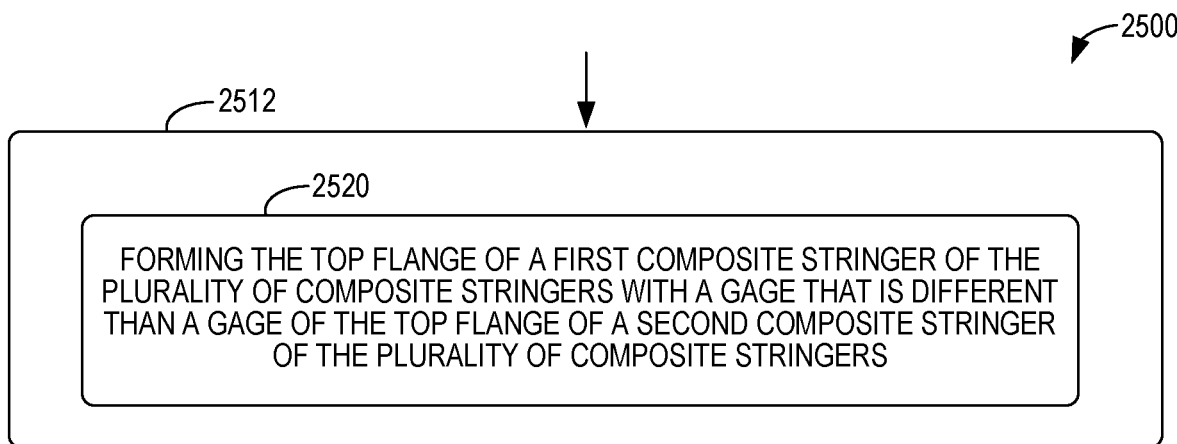
FIG. 26 illustrates a flow chart of an example process for forming a composite stringer assembly that can be used with the process shown in FIG. 25.
Figure 27:
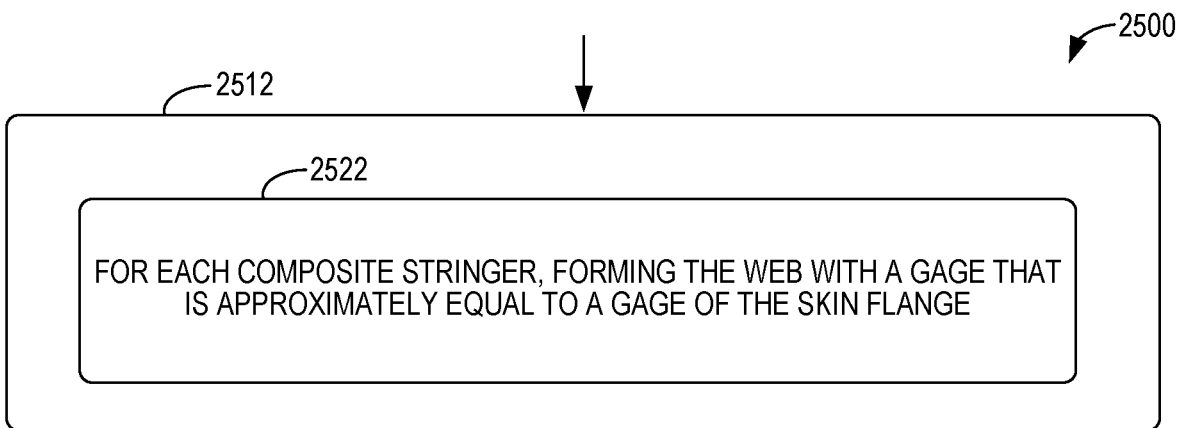
FIG. 27 illustrates a flow chart of an example process for forming a composite stringer assembly that can be used with the process shown in FIG. 25.
Figure 28:
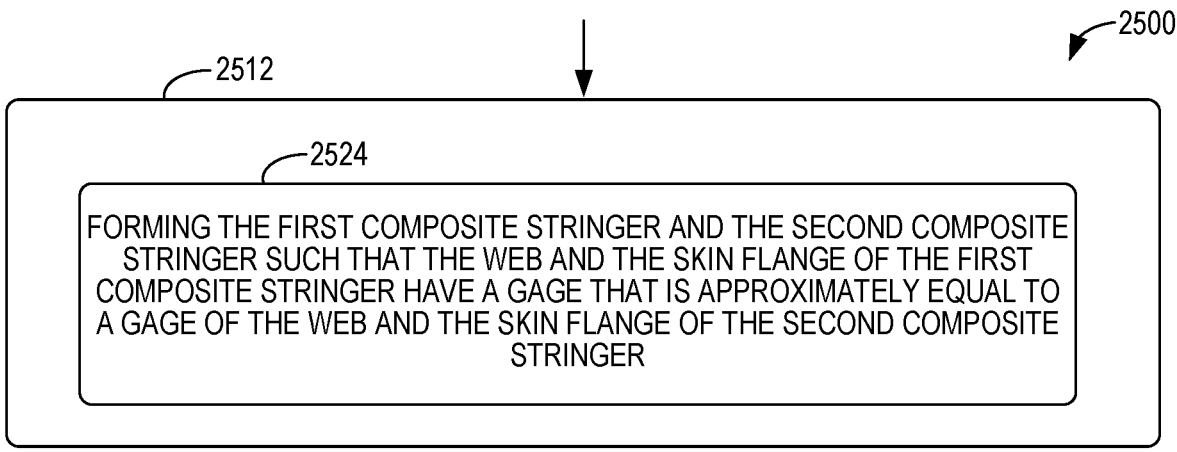
FIG. 28 illustrates a flow chart of an example process for forming a composite stringer assembly that can be used with the process shown in FIG. 25.

FIGS. 26-28 depict additional aspects of the process 2500 according to further examples. As shown in FIG. 26, forming the composite stringer at block 2512 can include forming the top flange of a first composite stringer of the plurality of composite stringers with a gage that is different than a gage of the top flange of a second composite stringer of the plurality of composite stringers at block 2520.

As shown in FIG. 27, forming the composite stringer at block 2512 can include, for each composite stringer, forming the web with a gage that is approximately equal to a gage of the skin flange at block 2522. As shown in FIG. 28, forming the composite stringer at block 2512 can include forming the first composite stringer and the second composite stringer such that the web and the skin flange of the first composite stringer have a gage that is approximately equal to a gage of the web and the skin flange of the second composite stringer at block 2524.

Figure 29:
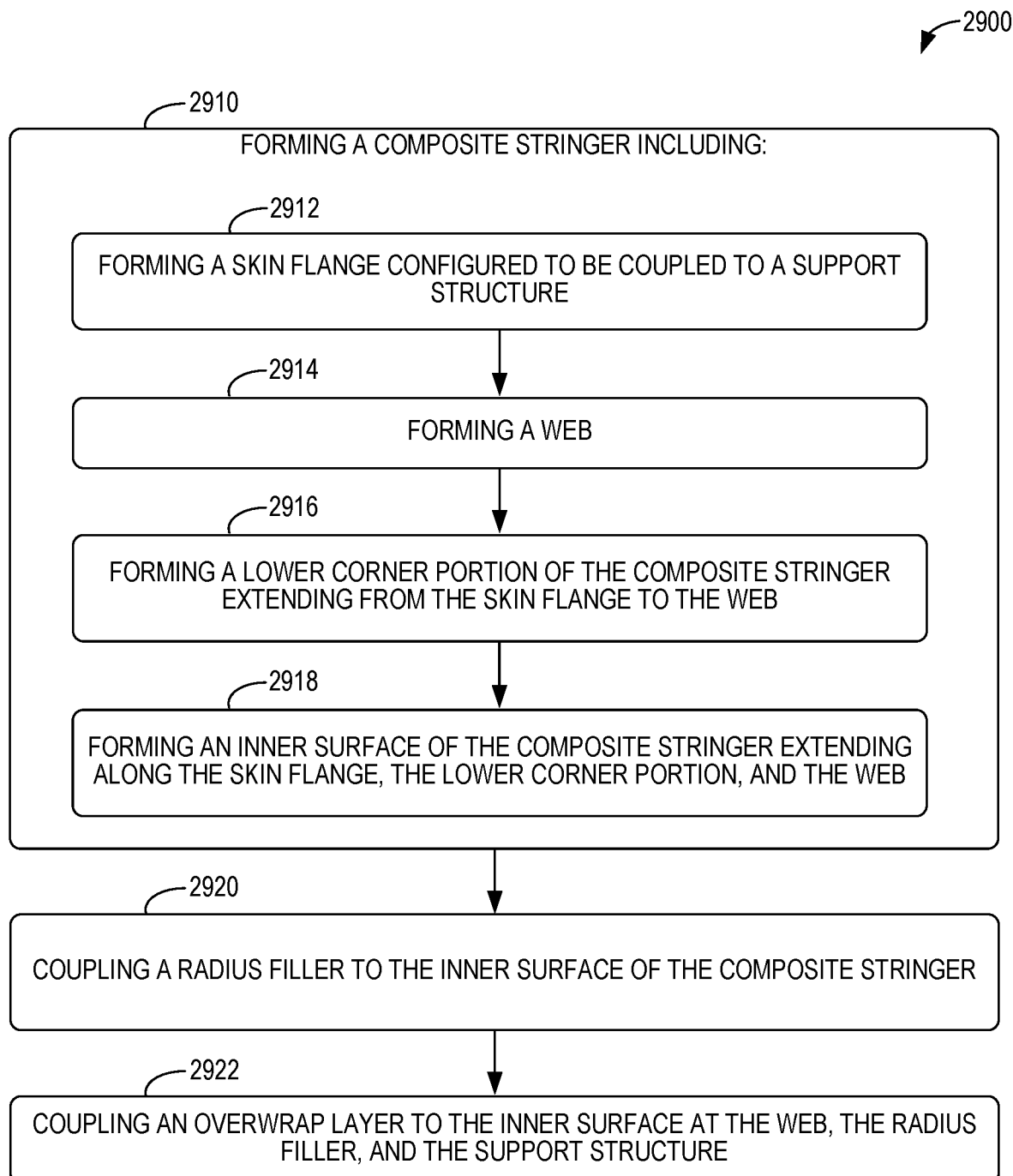
FIG. 29 illustrates a flow chart of an example process for forming a composite stringer assembly, according to an example.

Referring now to FIG. 29, a flowchart for a process 2900 of forming a composite stringer assembly is described according to an example. As shown in FIG. 29, at block 2910, the process 2900 includes forming a composite stringer. Forming the composite stringer at block 2910 includes: (i) forming a skin flange configured to be coupled to a support structure at block 2912, (ii) forming a web at block 2914, (iii) forming a lower corner portion extending from the skin flange to the web at block 2916, (iv) forming an inner surface extending along the skin flange, the lower corner portion, and the web at block 2918.

At block 2920, the process 2900 includes coupling a radius filler to the inner surface of the composite stringer. At block 2922, the process 2900 includes coupling an overwrap layer to the inner surface at the web, the radius filler, and the support structure. The support structure includes at least one of a skin of a vehicle or a base charge.

Figure 30:
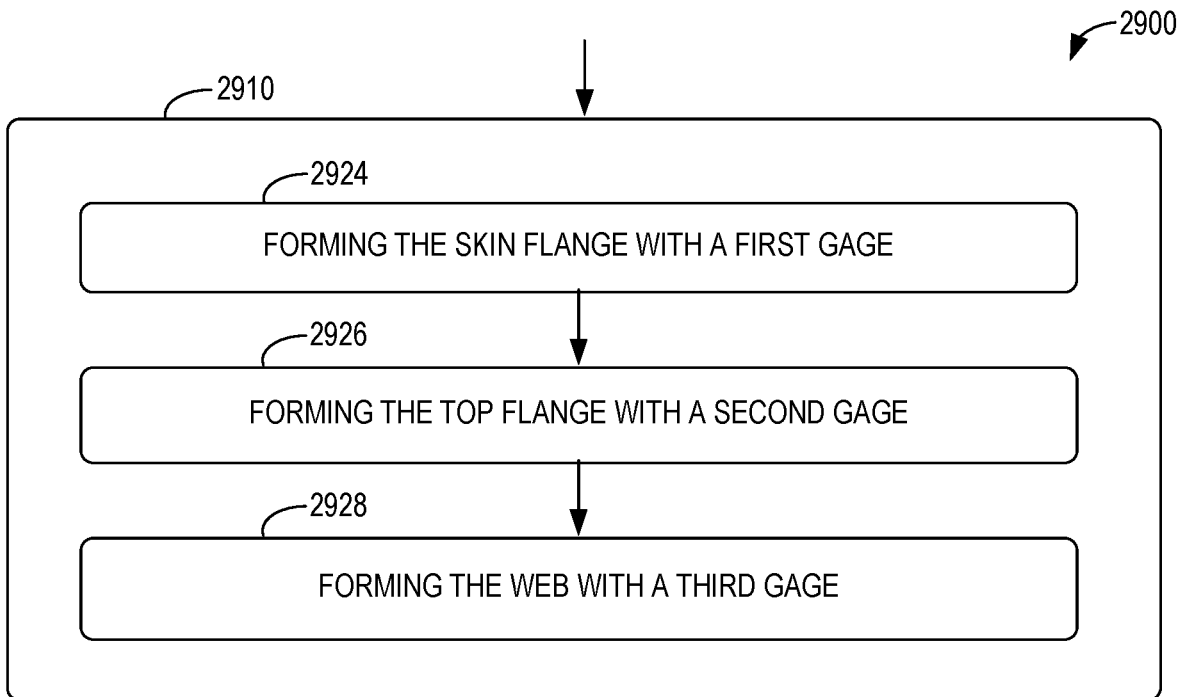
FIG. 30 illustrates a flow chart of an example process for forming a composite stringer assembly that can be used with the process shown in FIG. 29.

FIGS. 30-38 depict additional aspects of the process 2900 according to further examples. For process 2900 shown in FIG. 30, the composite stringer further includes a top flange and an upper portion extending from the web to the top flange. As shown in FIG. 30, forming the composite stringer at block 2910 can further include forming the skin flange with a first gage at block 2924, forming the top flange with a second gage at block 2926, and forming the web with a third gage at block 2928. The second gage of the top flange is greater than the first gage of the skin flange and the third gage of the web.

Figure 31:
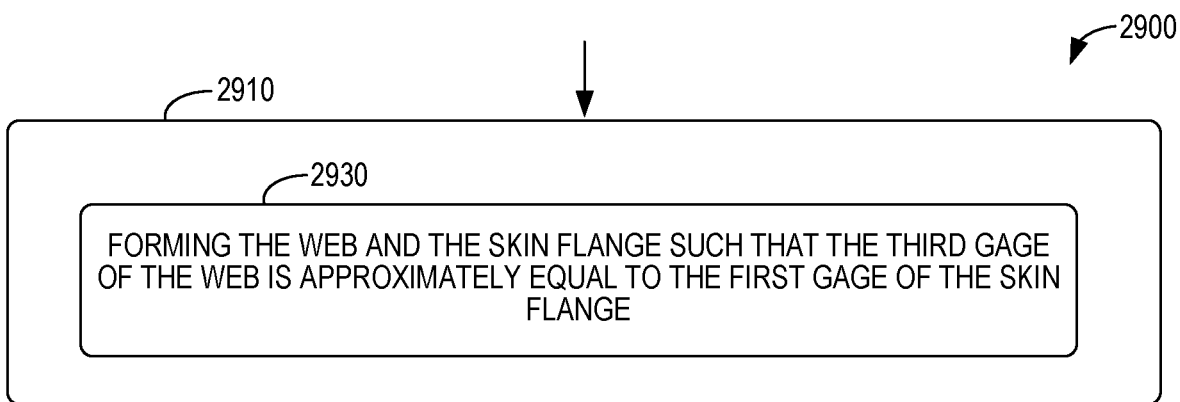
FIG. 31 illustrates a flow chart of an example process for forming a composite stringer assembly that can be used with the process shown in FIG. 30.

As shown in FIG. 31, forming the composite stringer at block 2910 can include forming the web and the skin flange such that the third gage of the web is approximately equal to the first gage of the skin flange at block 2930.

Figure 32:
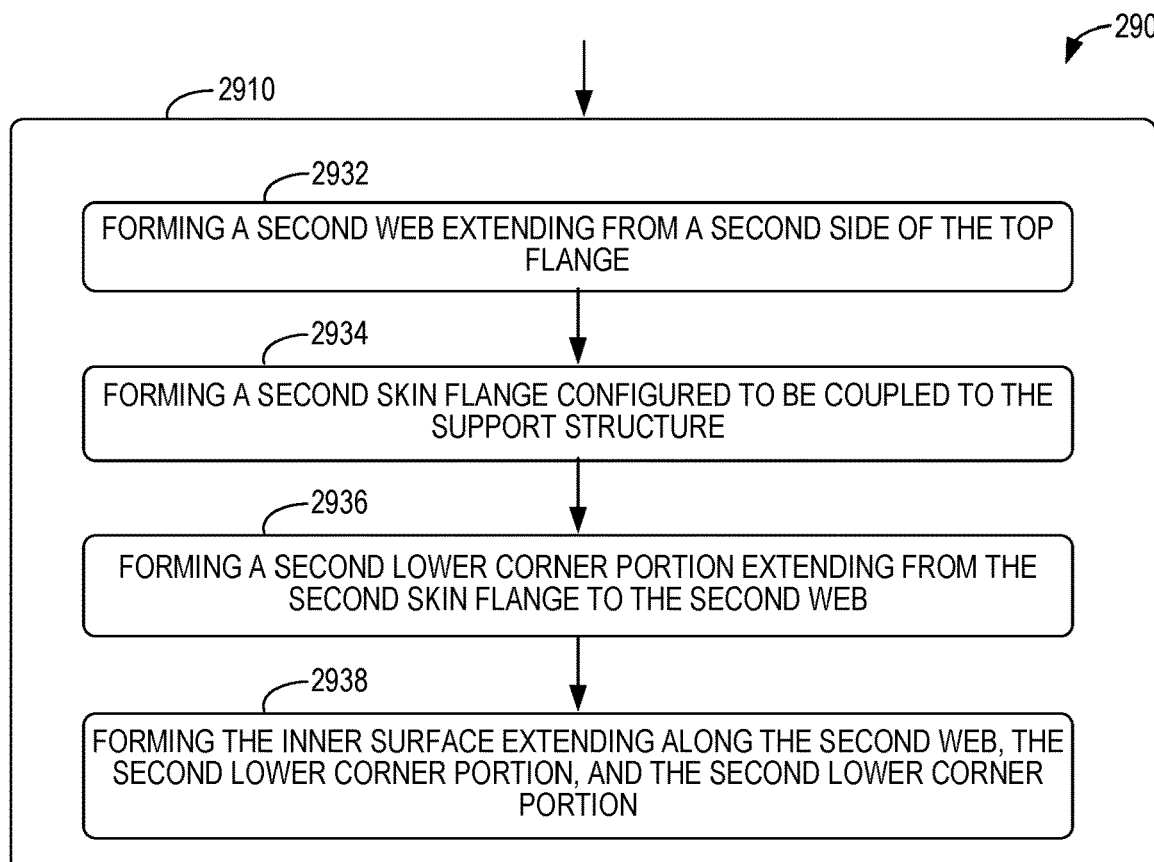
FIG. 32 illustrates a flow chart of an example process for forming a composite stringer assembly that can be used with the process shown in FIG. 30.

For the process 2900 shown in FIG. 32, the web extends from a first side of the top flange. As shown in FIG. 32, forming the composite stringer at block 2910 can further include (i) forming a second web extending from a second side of the top flange at block 2932, (ii) forming a second skin flange configured to be coupled to the support structure at block 2934, (iii) forming a second lower corner portion extending from the second skin flange to the second web at block 2936, and (iv) forming the inner surface extending along the second web, the second lower corner portion, and the second lower corner portion at block 2938. Also, as shown in FIG. 32, the process 2900 can further include coupling a second radius filler to the inner surface at the second lower corner portion at block 2940.

Figure 33:
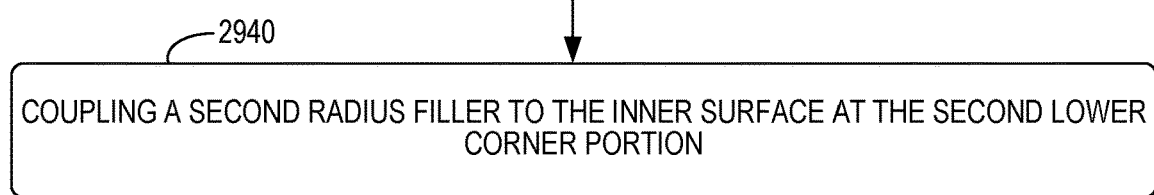
FIG. 33 illustrates a flow chart of an example process for forming a composite stringer assembly that can be used with the process shown in FIG. 32.

As shown in FIG. 33, the process 2900 can further include coupling the overwrap layer to the inner surface at the second web, the second radius filler, and the support structure such that the overwrap layer extends over the support structure from the radius filler to the second radius filler at block 2942.

Figure 34:
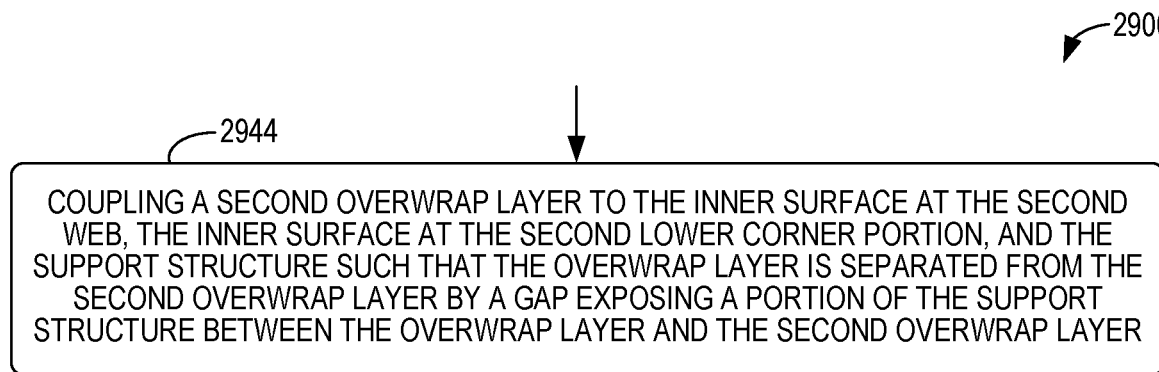
FIG. 34 illustrates a flow chart of an example process for forming a composite stringer assembly that can be used with the process shown in FIG. 32.

As shown in FIG. 34, the process 2900 can further include coupling a second overwrap layer to the inner surface at the second web, the inner surface at the second lower corner portion, and the support structure such that the overwrap layer is separated from the second overwrap layer by a gap exposing a portion of the support structure between the overwrap layer and the second overwrap layer at block 2944.

Figure 35:
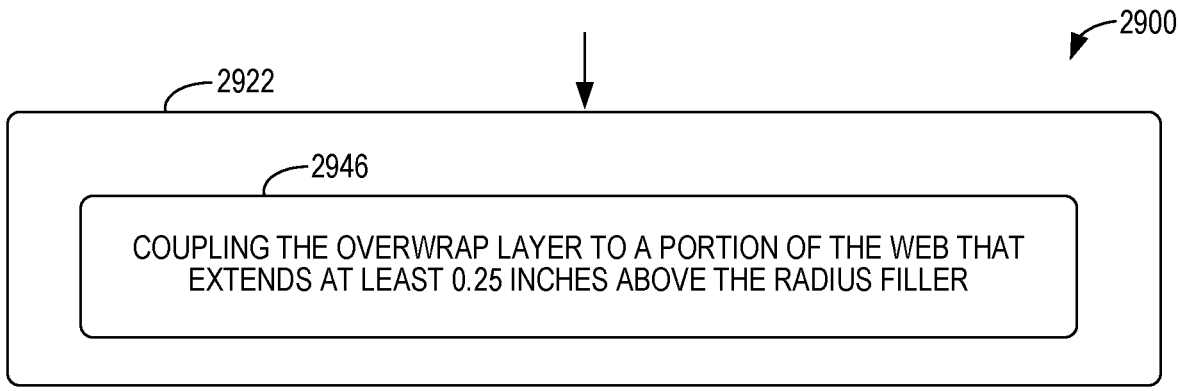
FIG. 35 illustrates a flow chart of an example process for forming a composite stringer assembly that can be used with the process shown in FIG. 29.

As shown in FIG. 35, coupling the overwrap layer to the inner surface at the web, the radius filler, and the support structure at block 2922 includes coupling the overwrap layer to a portion of the web that extends at least 0.25 inches above the radius filler at block 2946.

Figure 36:
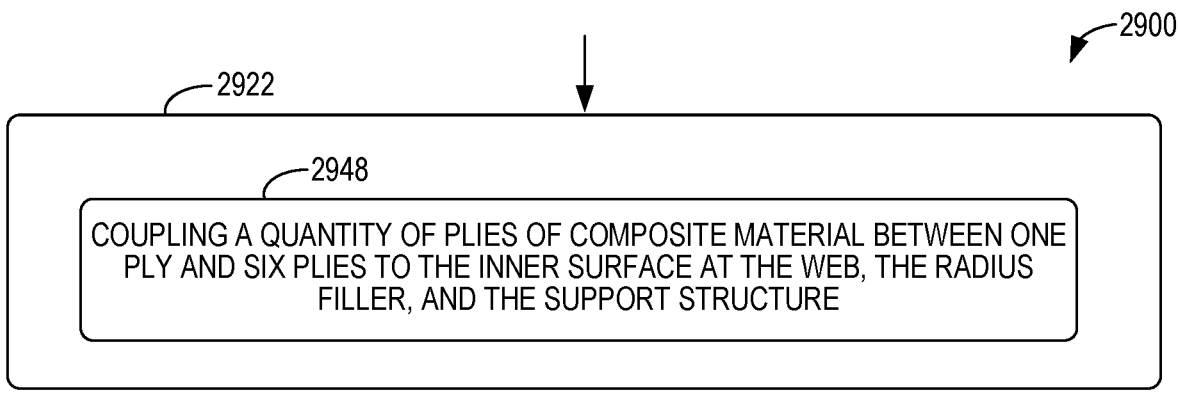
FIG. 36 illustrates a flow chart of an example process for forming a composite stringer assembly that can be used with the process shown in FIG. 29.

As shown in FIG. 36, coupling the overwrap layer to the inner surface at the web, the radius filler, and the support structure at block 2922 includes coupling a quantity of plies of composite material between one ply and six plies to the inner surface at the web, the radius filler, and the support structure at block 2948.

Figure 37:
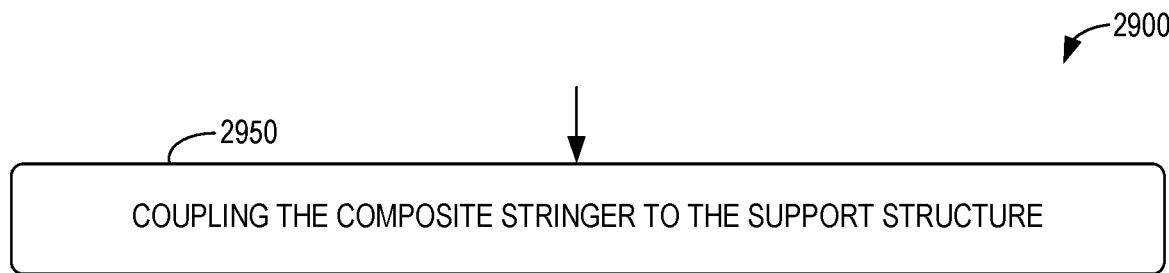
FIG. 37 illustrates a flow chart of an example process for forming a composite stringer assembly that can be used with the process shown in FIG. 29.
Figure 38:
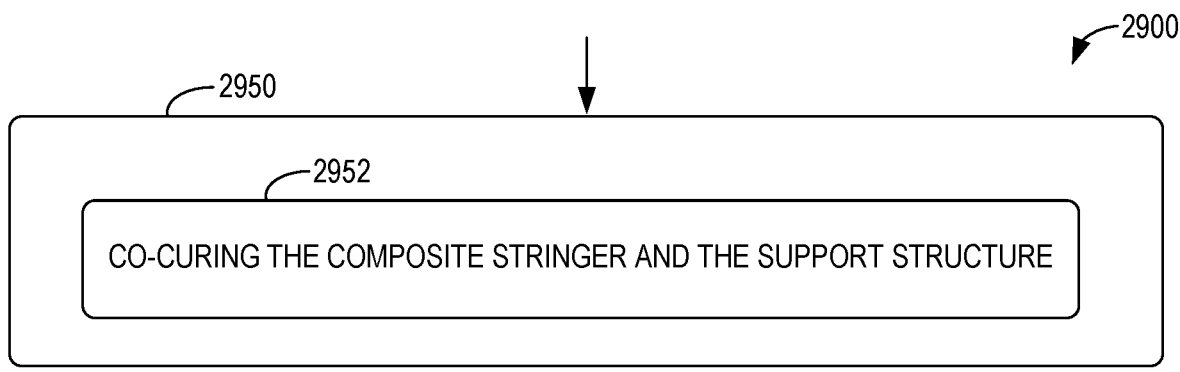
FIG. 38 illustrates a flow chart of an example process for forming a composite stringer assembly that can be used with the process shown in FIG. 37.

As shown in FIG. 37, the process 2900 can further include coupling the composite stringer to the support structure at block 2050. As shown in FIG. 38, coupling the composite stringer to the support structure at block 2050 can include co-curing the composite stringer and the support structure at block 2052.

Figure 39:
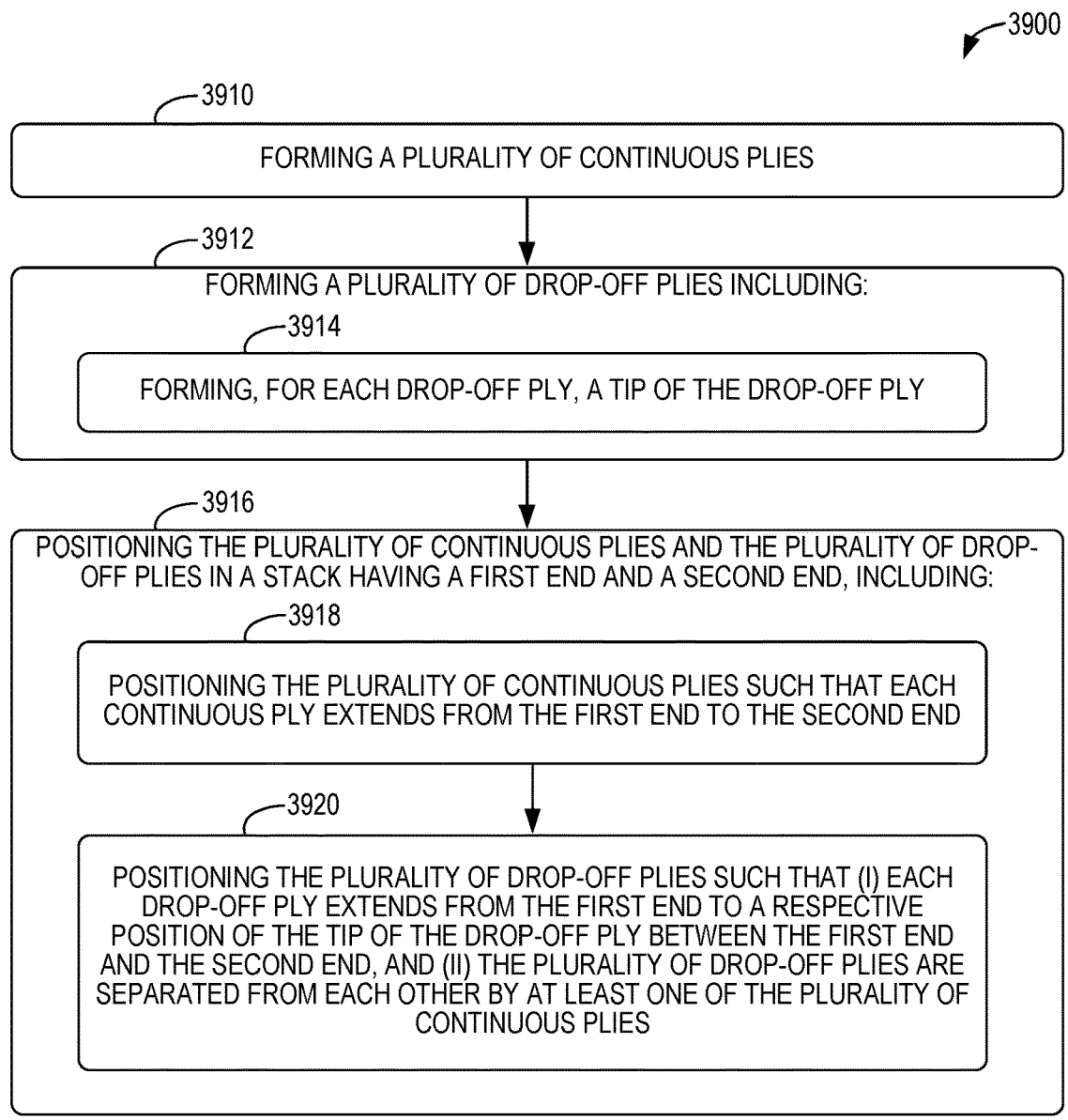
FIG. 39 illustrates a flow chart of an example process for forming a composite structure having a variable gage, according to an example.

Referring now to FIG. 39, a flowchart for a process 3900 of forming a composite structure having a variable gage is described according to an example. As shown in FIG. 39, at block 3910, the process 3900 includes forming a plurality of continuous plies. At block 3912, the process 3900 includes forming a plurality of drop-off plies. Forming the plurality of drop-off plies at block 3912 can include forming, for each drop-off ply, a tip of the drop-off ply at block 3914.

At block 3916, the process 3900 includes positioning the plurality of continuous plies and the plurality of drop-off plies in a stack having a first end and a second end. The first end has a first gage. The second end has a second gage, which is less than the first gage. As shown in FIG. 39, positioning the plurality of continuous plies and the plurality of drop-off plies at block 3916 can include positioning the plurality of continuous plies such that each continuous ply extends from the first end to the second end at block 3918. Positioning the plurality of continuous plies and the plurality of drop-off plies at block 3916 can also include positioning the plurality of drop-off plies such that (i) each drop-off ply extends from the first end to a respective position of the tip of the drop-off ply between the first end and the second end, and (ii) the plurality of drop-off plies are separated from each other by at least one of the plurality of continuous plies at block 3920.

Figure 40:
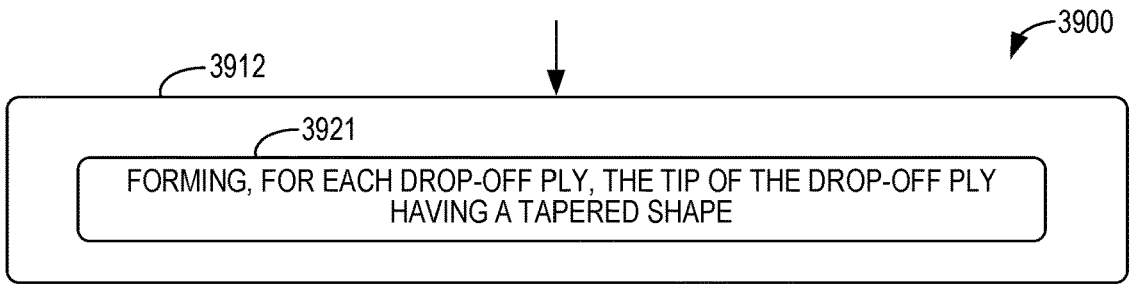
FIG. 40 illustrates a flow chart of an example process for forming a composite structure having a variable gage that can be used with the process shown in FIG. 39.

FIGS. 40-48 depict additional aspects of the process 3900 according to further examples. As shown in FIG. 40, forming the plurality of drop-off plies at block 3912 can include forming, for each drop-off ply, the tip of the drop-off ply having a tapered shape at block 3921.

Figure 41:
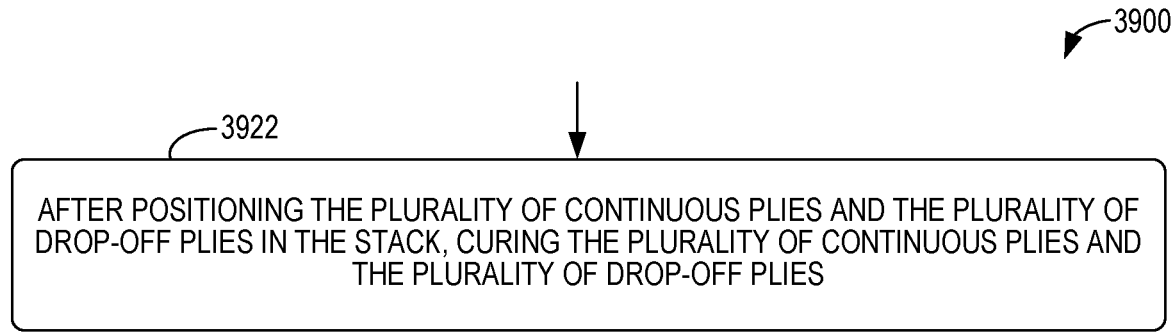
FIG. 41 illustrates a flow chart of an example process for forming a composite structure having a variable gage that can be used with the process shown in FIG. 39.

As shown in FIG. 41, the process 3900 can further include, after positioning the plurality of continuous plies and the plurality of drop-off plies in the stack at block 3916, curing the plurality of continuous plies and the plurality of drop-off plies at block 3922.

Figure 42:
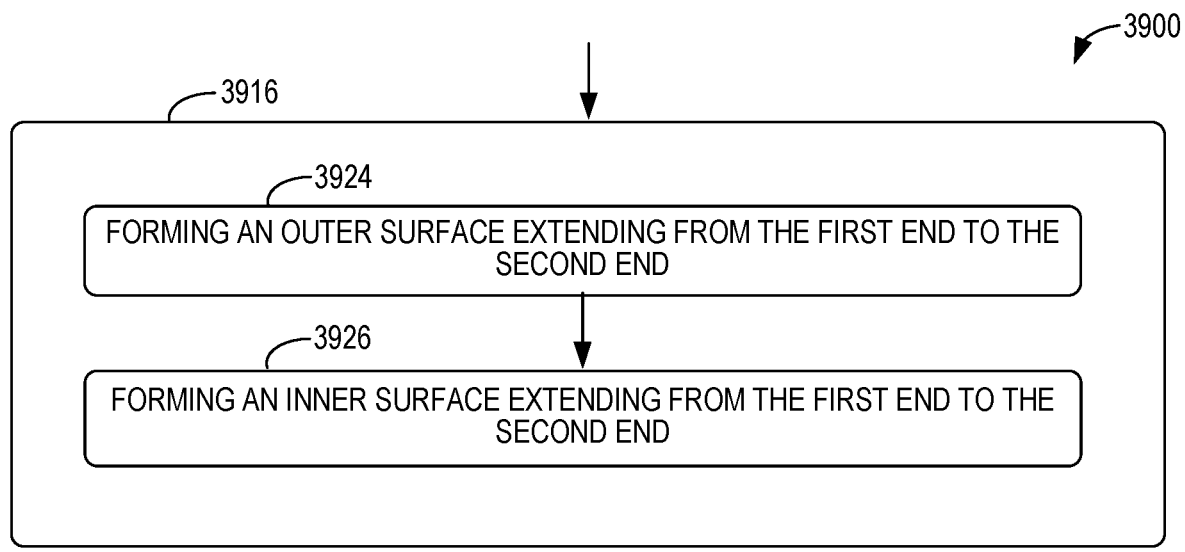
FIG. 42 illustrates a flow chart of an example process for forming a composite structure having a variable gage that can be used with the process shown in FIG. 39.

As shown in FIG. 42, positioning the plurality of continuous plies and the plurality of drop-off plies in the stack at block 3916 can further include forming an outer surface extending from the first end to the second end at block 3924, and forming an inner surface extending from the first end to the second end at block 3926. The first gage and the second gage can be respective thicknesses between the outer surface and the inner surface at the first end and the second end, respectively.

Figure 43:
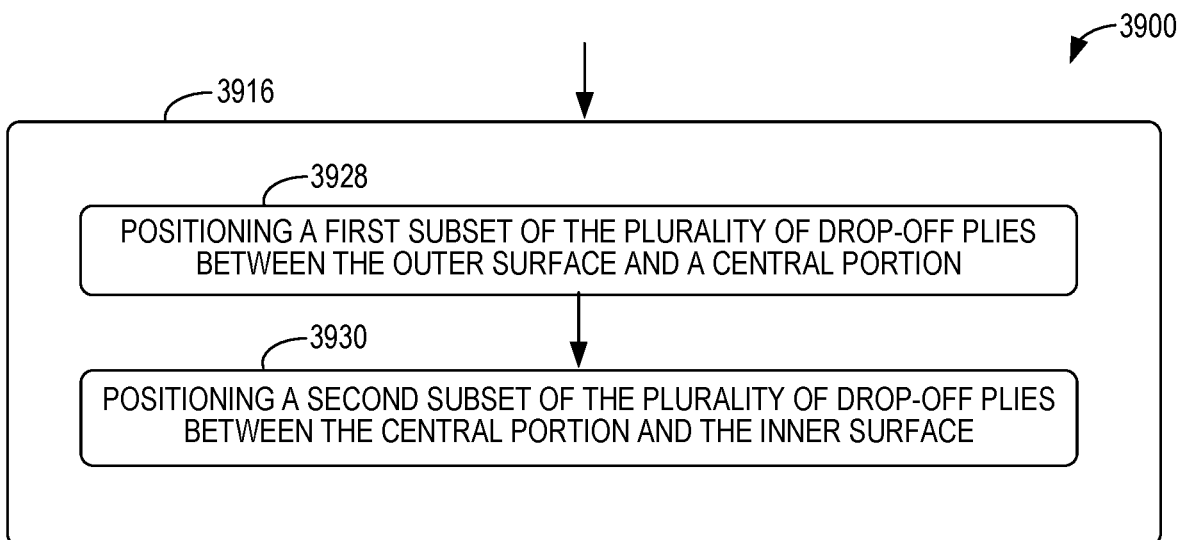
FIG. 43 illustrates a flow chart of an example process for forming a composite structure having a variable gage that can be used with the process shown in FIG. 42.

As shown in FIG. 43, positioning the plurality of continuous plies and the plurality of drop-off plies in the stack at block 3916 can include positioning a first subset of the plurality of drop-off plies between the outer surface and a central portion at block 3928. The central portion (i) is between the outer surface and the inner surface and (ii) extends from the first end to the second end. Also, in FIG. 43, positioning the plurality of continuous plies and the plurality of drop-off plies in the stack at block 3916 can include positioning a second subset of the plurality of drop-off plies between the central portion and the inner surface at block 3930.

Figure 44:
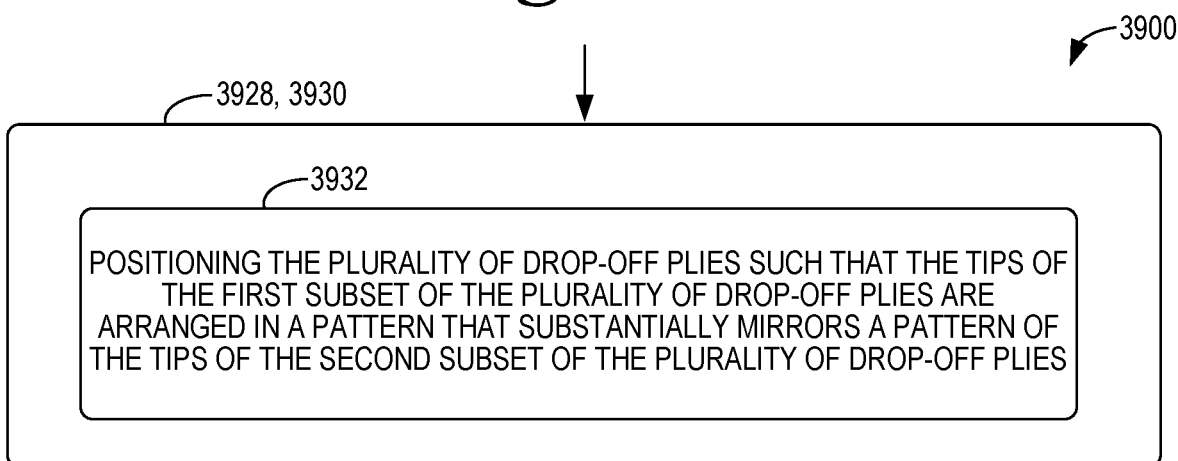
FIG. 44 illustrates a flow chart of an example process for forming a composite structure having a variable gage that can be used with the process shown in FIG. 43.

As shown in FIG. 44, positioning the first subset of the plurality of drop-off plies at block 3928 and positioning the second subset of the plurality of drop-off plies at block 3930 can include positioning the plurality of drop-off plies such that the tips of the first subset of the plurality of drop-off plies are arranged in a pattern that substantially mirrors a pattern of the tips of the second subset of the plurality of drop-off plies at block 3932.

Figure 45:
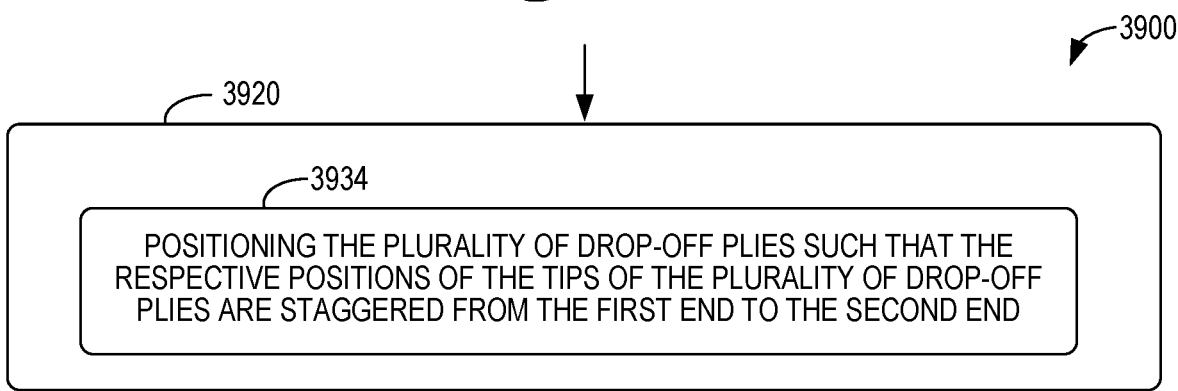
FIG. 45 illustrates a flow chart of an example process for forming a composite structure having a variable gage that can be used with the process shown in FIG. 43.

As shown in FIG. 45, positioning the plurality of drop-off plies at block 3920 can include positioning the plurality of drop-off plies such that the respective positions of the tips of the plurality of drop-off plies are staggered from the first end to the second end at block 3934.

Figure 46:
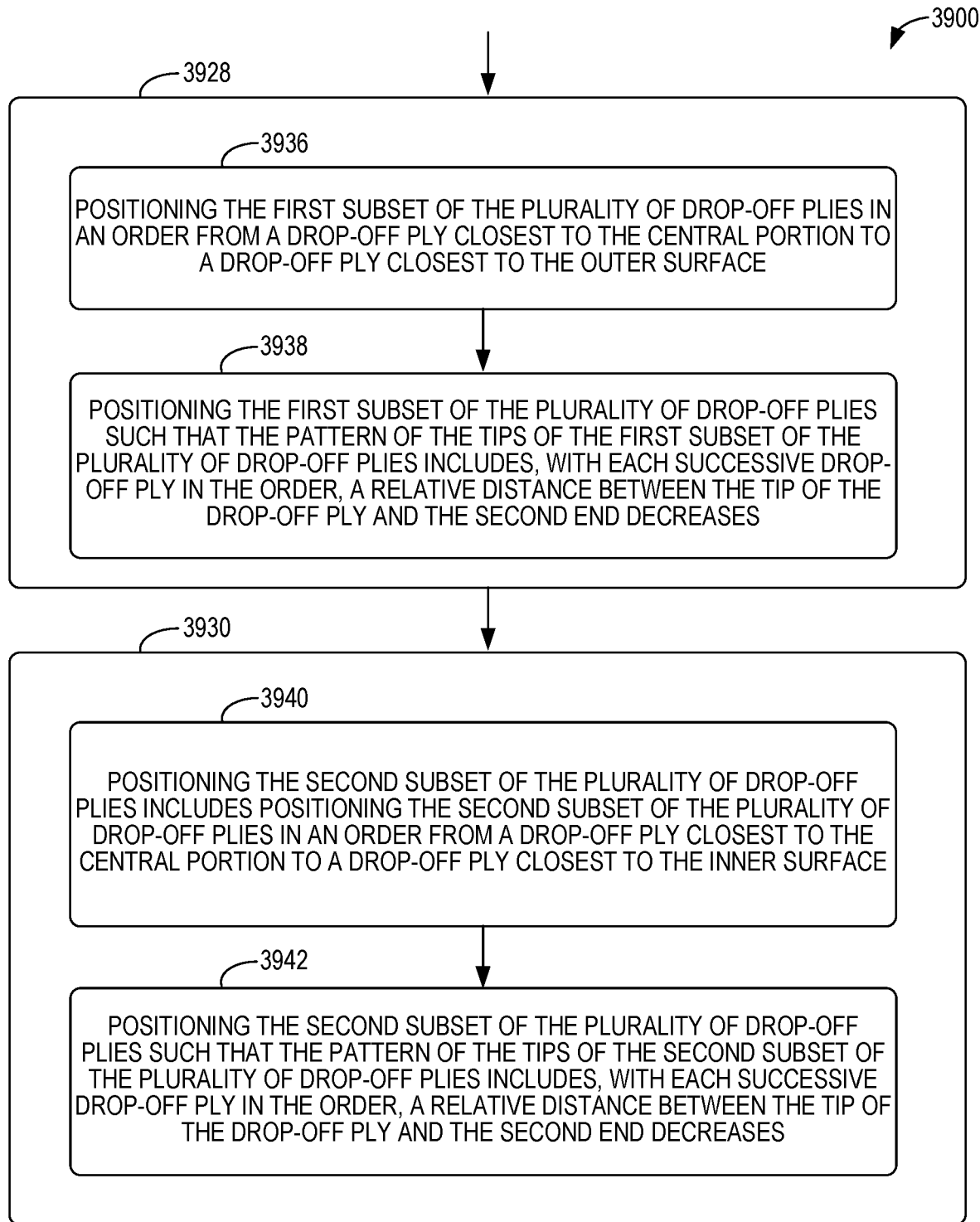
FIG. 46 illustrates a flow chart of an example process for forming a composite structure having a variable gage that can be used with the process shown in FIG. 45.

As shown in FIG. 46, positioning the first subset of the plurality of drop-off plies at block 3928 can include (i) positioning the first subset of the plurality of drop-off plies in an order from a drop-off ply closest to the central portion to a drop-off ply closest to the outer surface at block 3936, and (ii) positioning the first subset of the plurality of drop-off plies such that the pattern of the tips of the first subset of the plurality of drop-off plies includes, with each successive drop-off ply in the order, a relative distance between the tip of the drop-off ply and the second end decreases at block 3938.

Also, as shown in FIG. 46, positioning the second subset of the plurality of drop-off plies at block 3930 can include (i) positioning the second subset of the plurality of drop-off plies includes positioning the second subset of the plurality of drop-off plies in an order from a drop-off ply closest to the central portion to a drop-off ply closest to the inner surface at block 3940, and (ii) positioning the second subset of the plurality of drop-off plies such that the pattern of the tips of the second subset of the plurality of drop-off plies includes, with each successive drop-off ply in the order, a relative distance between the tip of the drop-off ply and the second end decreases at block 3942.

Figure 47:
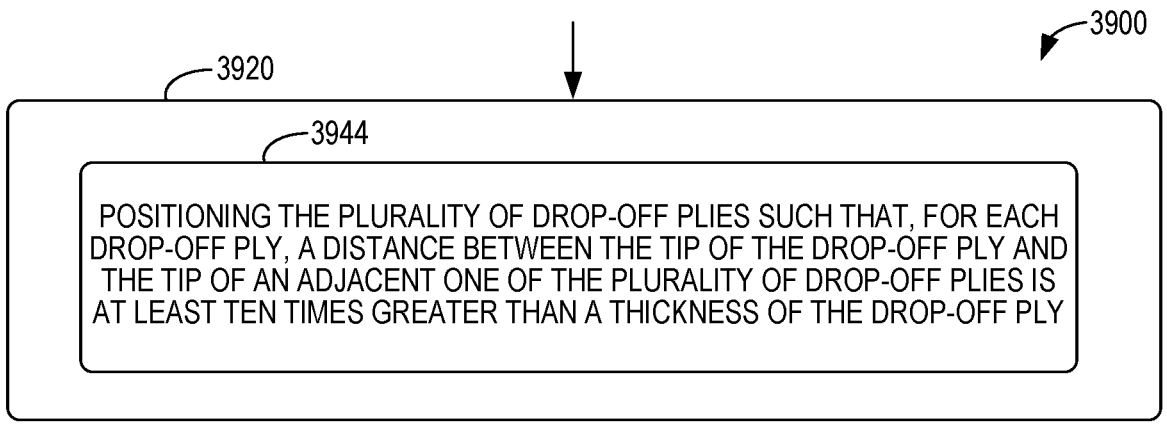
FIG. 47 illustrates a flow chart of an example process for forming a composite structure having a variable gage that can be used with the process shown in FIG. 39.

As shown in FIG. 47, positioning the plurality of drop-off plies at block 3920 can include positioning the plurality of drop-off plies such that, for each drop-off ply, a distance between the tip of the drop-off ply and the tip of an adjacent one of the plurality of drop-off plies is at least ten times greater than a thickness of the drop-off ply at block 3944. For each drop-off ply, the adjacent one of the plurality of drop-off plies is adjacent to the drop-off ply in a dimension extending between the outer surface and the inner surface.

Figure 48:
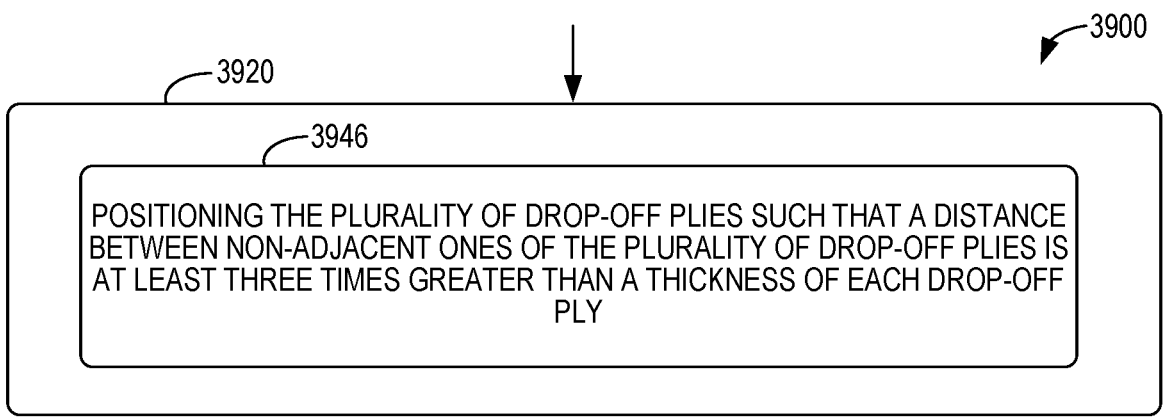
FIG. 48 illustrates a flow chart of an example process for forming a composite structure having a variable gage that can be used with the process shown in FIG. 39.

As shown in FIG. 48, positioning the plurality of drop-off plies at block 3920 can include positioning the plurality of drop-off plies such that a distance between non-adjacent ones of the plurality of drop-off plies is at least three times greater than a thickness of each drop-off ply at block 3946.

Figure 49:
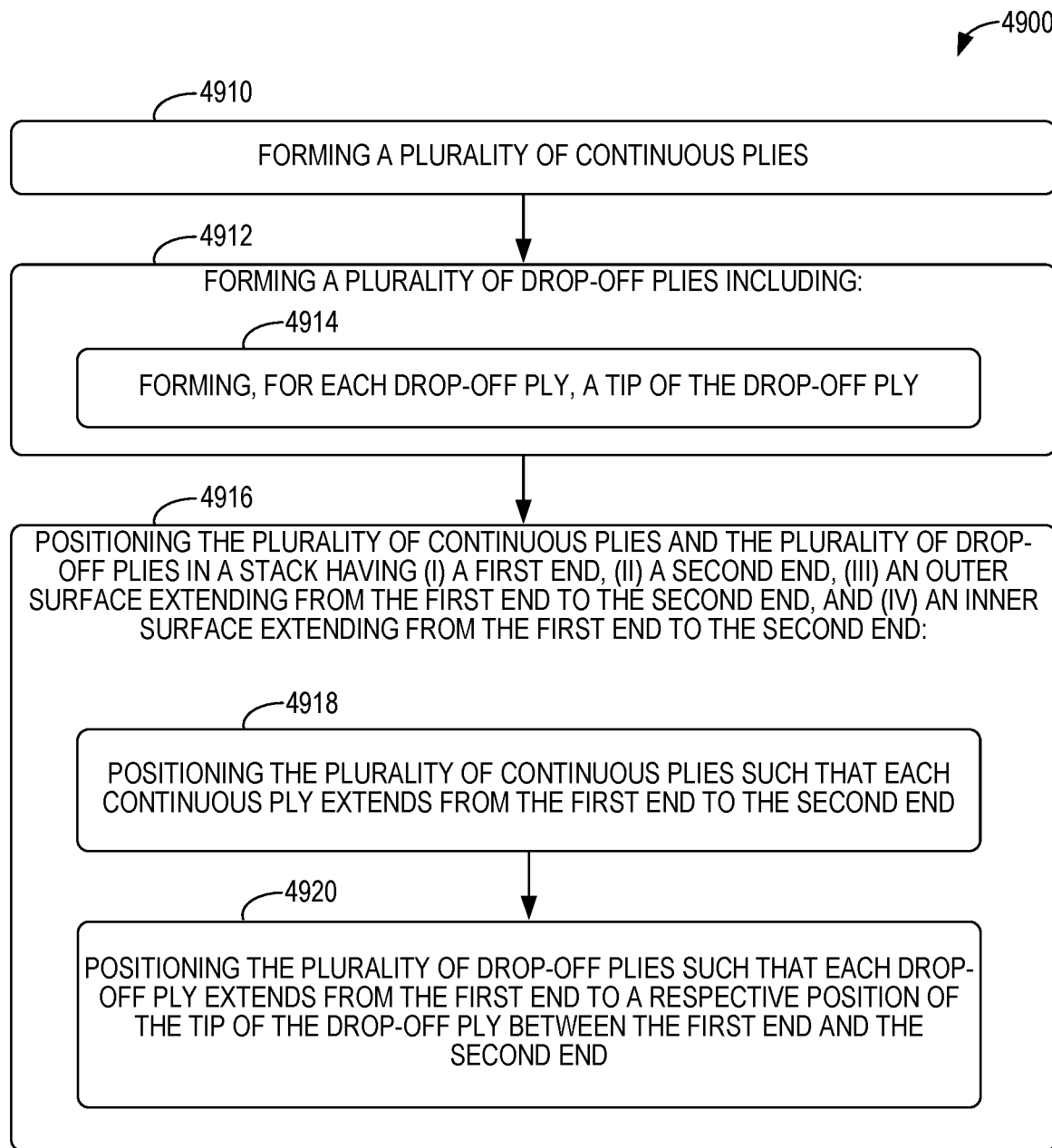
FIG. 49 illustrates a flow chart of an example process for forming a composite structure having a variable gage, according to an example.

Referring now to FIG. 49, a flowchart for a process 4900 of forming a composite structure having a variable gage is described according to an example. As shown in FIG. 49, at block 4910, the process 4900 includes forming a plurality of continuous plies. At block 4912, the process 4900 includes forming a plurality of drop-off plies. Forming the plurality of drop-off plies at block 4912 can include forming, for each drop-off ply, a tip of the drop-off ply at block 4914.

At block 4916, the process 4900 can include positioning the plurality of continuous plies and the plurality of drop-off plies in a stack having (i) a first end, (ii) a second end, (iii) an outer surface extending from the first end to the second end, and (iv) an inner surface extending from the first end to the second end. The first end has a first gage. The second end has a second gage, which is less than the first gage.

In FIG. 49, positioning the plurality of continuous plies and the plurality of drop-off plies at block 4916 can include positioning the plurality of continuous plies such that each continuous ply extends from the first end to the second end at block 4918. Additionally, positioning the plurality of continuous plies and the plurality of drop-off plies at block 4916 can also include positioning the plurality of drop-off plies such that each drop-off ply extends from the first end to a respective position of the tip of the drop-off ply between the first end and the second end at block 4920. A first subset of the plurality of drop-off plies are between the outer surface and a central portion of the stack and a second subset of the plurality of drop-off plies are between the central portion and the inner surface.

Figure 50:
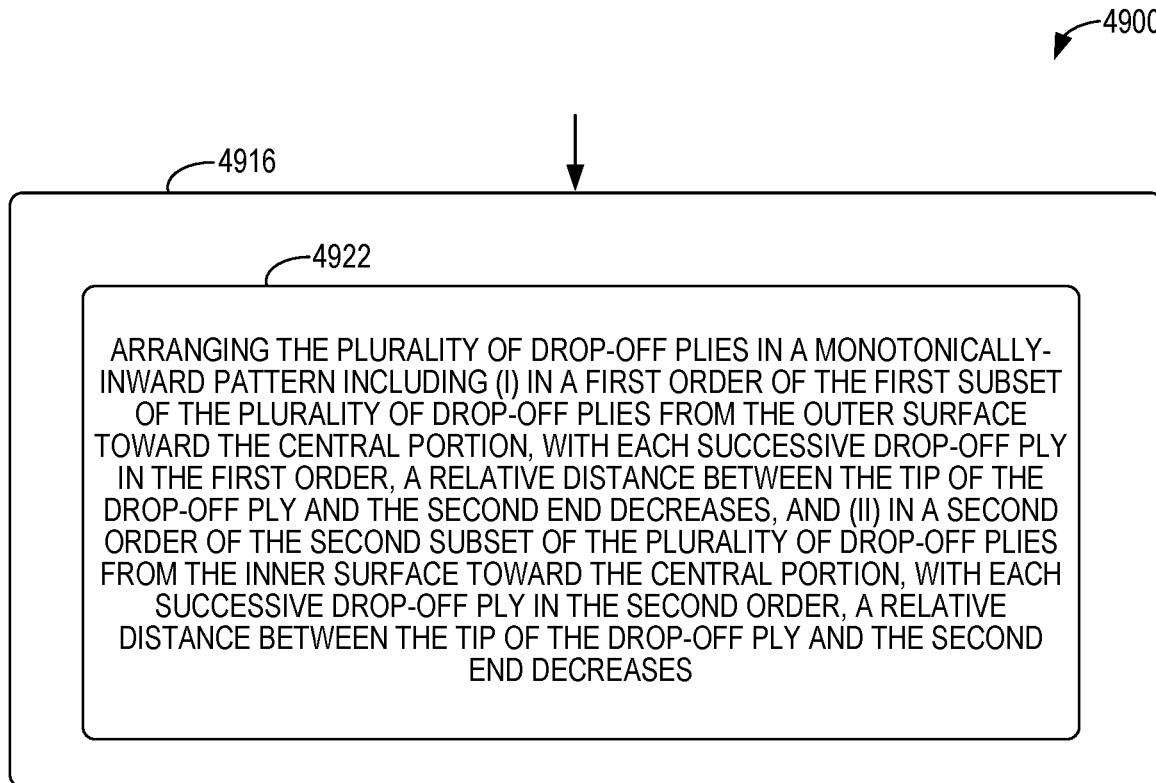
FIG. 50 illustrates a flow chart of an example process for forming a composite structure having a variable gage that can be used with the process shown in FIG. 49.

FIGS. 50-56 depict additional aspects of the process 4900 according to further examples. As shown in FIG. 50, positioning the plurality of continuous plies and the plurality of drop-off plies in the stack at block 4916 can further include, at block 4922, arranging the plurality of drop-off plies in a monotonically-inward pattern including (i) in a first order of the first subset of the plurality of drop-off plies from the outer surface toward the central portion, with each successive drop-off ply in the first order, a relative distance between the tip of the drop-off ply and the second end decreases, and (ii) in a second order of the second subset of the plurality of drop-off plies from the inner surface toward the central portion, with each successive drop-off ply in the second order, a relative distance between the tip of the drop-off ply and the second end decreases.

Figure 51:
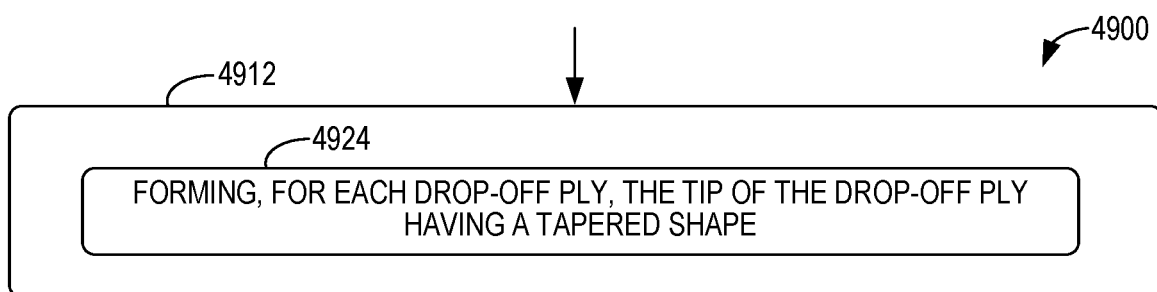
FIG. 51 illustrates a flow chart of an example process for forming a composite structure having a variable gage that can be used with the process shown in FIG. 50.

As shown in FIG. 51, forming the plurality of drop-off plies at block 4912 can include forming, for each drop-off ply, the tip of the drop-off ply having a tapered shape at block 4924.

Figure 52:
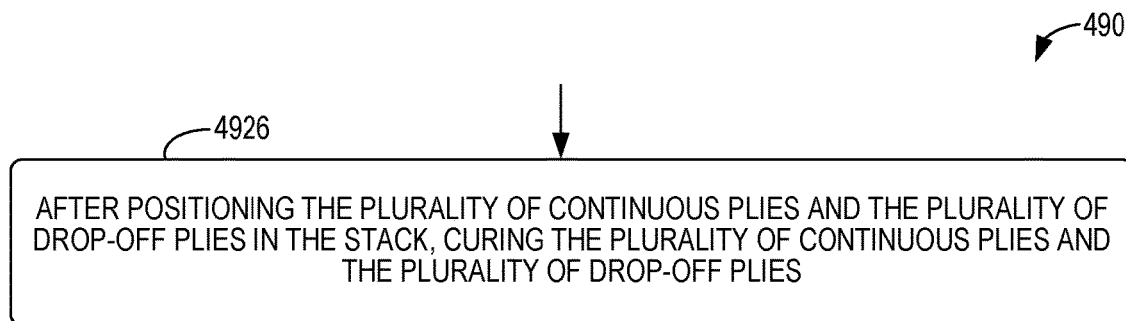
FIG. 52 illustrates a flow chart of an example process for forming a composite structure having a variable gage that can be used with the process shown in FIG. 50.

As shown in FIG. 52, after positioning the plurality of continuous plies and the plurality of drop-off plies in the stack at block 4916, the process 4900 can include curing the plurality of continuous plies and the plurality of drop-off plies at block 4926.

Figure 53:
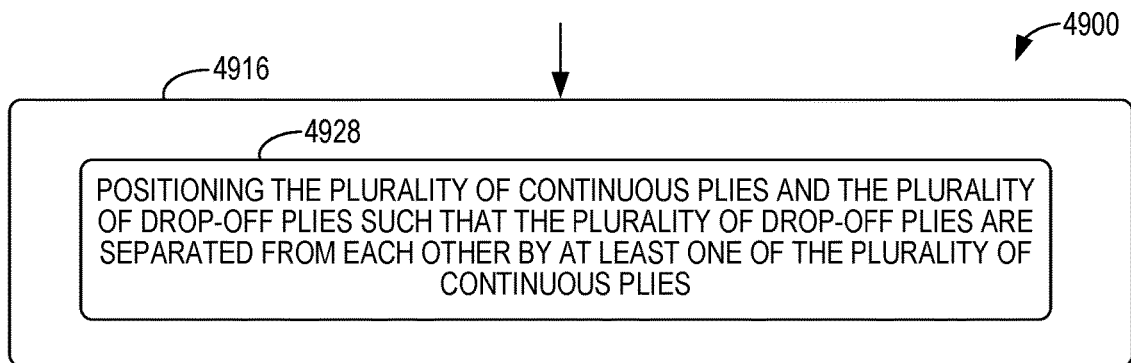
FIG. 53 illustrates a flow chart of an example process for forming a composite structure having a variable gage that can be used with the process shown in FIG. 50.

As shown in FIG. 53, positioning the plurality of continuous plies and the plurality of drop-off plies at block 4916 can include positioning the plurality of continuous plies and the plurality of drop-off plies such that the plurality of drop-off plies are separated from each other by at least one of the plurality of continuous plies at block 4928.

Figure 54:
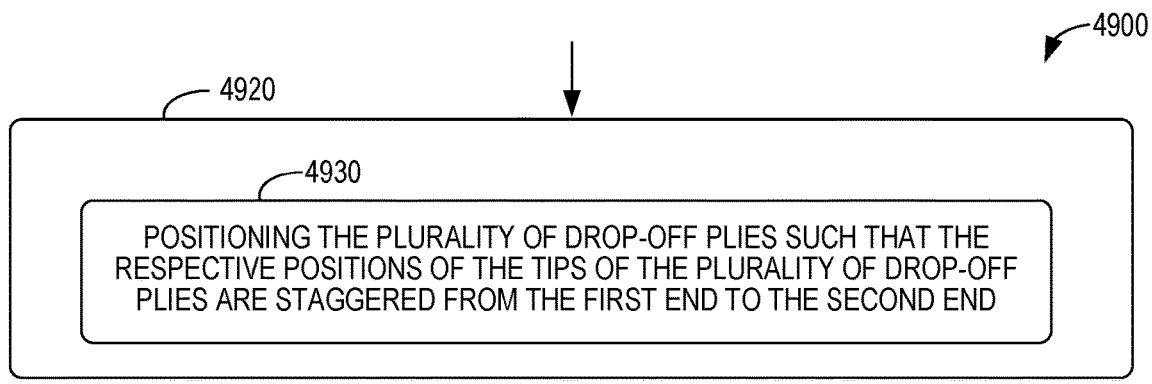
FIG. 54 illustrates a flow chart of an example process for forming a composite structure having a variable gage that can be used with the process shown in FIG. 50.

As shown in FIG. 54, positioning the plurality of drop-off plies at block 4920 can include positioning the plurality of drop-off plies such that the respective positions of the tips of the plurality of drop-off plies are staggered from the first end to the second end at block 4930.

Figure 55:
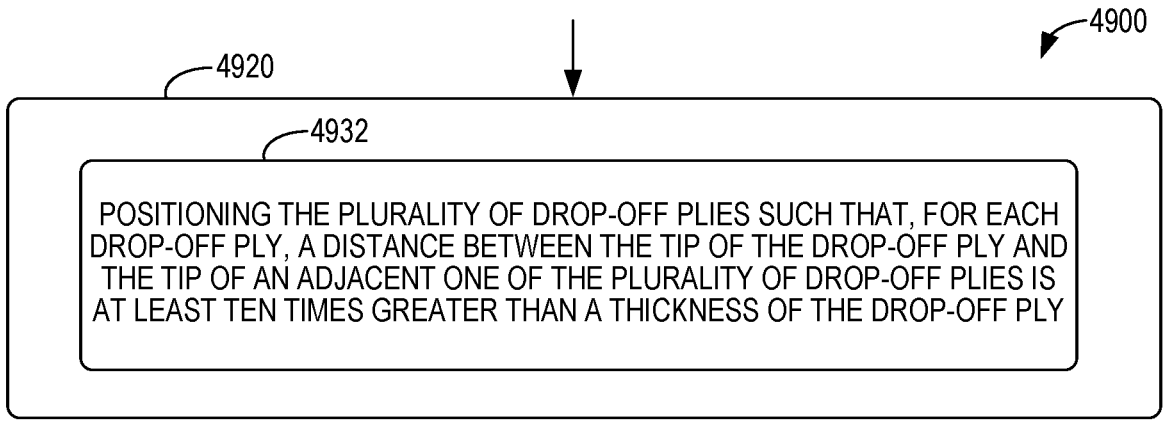
FIG. 55 illustrates a flow chart of an example process for forming a composite structure having a variable gage that can be used with the process shown in FIG. 50.

As shown in FIG. 55, positioning the plurality of drop-off plies at block 4920 can include positioning the plurality of drop-off plies such that, for each drop-off ply, a distance between the tip of the drop-off ply and the tip of an adjacent one of the plurality of drop-off plies is at least ten times greater than a thickness of the drop-off ply at block 4932. For each drop-off ply, the adjacent one of the plurality of drop-off plies is adjacent to the drop-off ply in a dimension extending between the outer surface and the inner surface.

Figure 56:
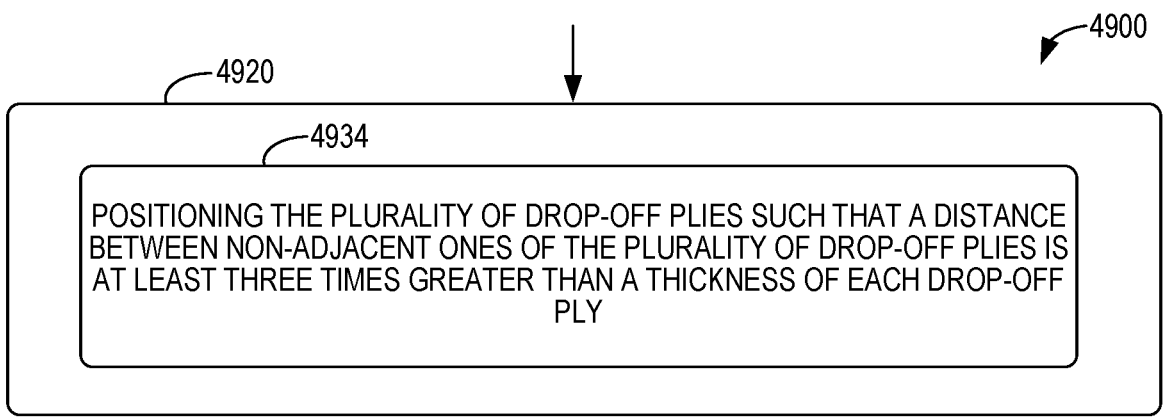
FIG. 56 illustrates a flow chart of an example process for forming a composite structure having a variable gage that can be used with the process shown in FIG. 50.

As shown in FIG. 56, positioning the plurality of drop-off plies at block 4920 can include positioning the plurality of drop-off plies such that a distance between non-adjacent ones of the plurality of drop-off plies is at least three times greater than a thickness of each drop-off ply at block 4934.

One or more of the blocks shown in FIGS. 16-56 may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In some instances, components of the devices and/or systems described herein may be configured to perform the functions such that the components are actually configured and structured (with hardware and/or software) to enable such performance. Example configurations then include one or more processors executing instructions to cause the system to perform the functions. Similarly, components of the devices and/or systems may be configured so as to be arranged or adapted to, capable of, or suited for performing the functions, such as when operated in a specific manner.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A composite stringer assembly, comprising:
    a plurality of composite stringers axially aligned with each other along a longitudinal axis of the plurality of composite stringers, wherein each composite stringer comprises:
        a skin flange configured to be coupled to a support structure, wherein the support structure comprises at least one of a skin of a vehicle or a base charge,
        a web,
        a top flange,
        a lower corner portion extending from the skin flange to the web,
        an upper corner portion extending from the web to the top flange,
        an inner surface extending along the skin flange, the lower corner portion, the web, the upper corner portion, and the top flange, and
        an outer surface extending along the skin flange, the lower corner portion, the web, the upper corner portion, and the top flange,
        wherein, at the lower corner portion, the outer surface is defined by a first radius of curvature; and
    a radius filler comprising:
        a first surface coupled to the inner surface at the lower corner portion of each composite stringer,
        a second surface configured to couple to the support structure, and
        a third surface extending between the first surface and the second surface,
        wherein the first surface of the radius filler is defined by a second radius of curvature,
    wherein the top flange of a first composite stringer of the plurality of composite stringers has a gage that is different than a gage of the top flange of a second composite stringer of the plurality of composite stringers, and wherein, along the longitudinal axis: (i) the composite stringer assembly has a total length that is equal to a sum of a respective length of each composite stringer, (ii) the first radius of curvature is substantially constant over the total length of the composite stringer assembly, and (iii) the second radius of curvature is substantially constant over the total length of the composite stringer assembly.

2. The composite stringer assembly of claim 1, wherein, at the lower corner portion of each composite stringer, the inner surface is defined by the second radius of curvature.

3. The composite stringer assembly of claim 1, wherein the third surface of the radius filler is defined by a third radius of curvature, which is approximately equal to the second radius of curvature.

4. The composite stringer assembly of claim 1, wherein, for each composite stringer, the inner surface faces the support structure when the skin flange is coupled to the support structure, and wherein, for each composite stringer, the outer surface faces away from the support structure when the skin flange is coupled to the support structure.

5. The composite stringer assembly of claim 1, wherein, for each composite stringer:

the web is a planar portion of the composite stringer extending in a first plane, (ii) the skin flange is a planar portion of the composite stringer extending in a second plane, and (iii) the first plane is transverse to the second plane.

6. The composite stringer assembly of claim 1, further comprising an overwrap layer coupled to the third surface of the radius filler and the inner surface at the web of each composite stringer.

7. The composite stringer assembly of claim 1, wherein the web and the skin flange of the first composite stringer have a gage that is approximately equal to a gage of the web and the skin flange of the second composite stringer.

8. The composite stringer assembly of claim 1, wherein, for each composite stringer, the gage of the top flange is greater than a gage of the web and a gage of the skin flange.

9. The composite stringer assembly of claim 8, wherein, for each composite stringer, the web of the composite stringer has a gage that is approximately equal to a gage of the skin flange of the composite stringer.

10. The composite stringer assembly of claim 1, wherein, for each composite stringer, the first radius of curvature is substantially constant between the skin flange and the web.

11. The composite stringer assembly of claim 1, wherein the second radius of curvature is approximately equal to a sum of the first radius of curvature and a gage of the skin flange.

12. The composite stringer assembly claim 1, wherein the second radius of curvature of the first surface is substantially constant between the second surface of the radius filler and the third surface of the radius filler.

13. The composite stringer assembly of claim 1, wherein the support structure comprises the base charge.

14. A method for forming a composite stringer assembly, comprising:

forming a plurality of composite stringers, wherein forming the plurality of composite stringers comprises for each composite stringer:

forming, from a plurality of plies of composite material: (i) a skin flange, (ii) a web, (iii) a top flange, (iii) a lower corner portion extending from the skin flange to the web, (iv) an upper corner portion extending from the web to the top flange, (v) an inner surface extending along the skin flange, the lower corner portion, the web, the upper corner portion, and the top flange, and (vi) an outer surface extending along the skin flange, the lower corner portion, the web, the upper corner portion, and the top flange, and forming, at the lower corner portion, the outer surface with a first radius of curvature;

positioning, on a support structure, the plurality of composite stringers in axial alignment with each other along a longitudinal axis, wherein the support structure comprises at least one of a skin of a vehicle or a base charge; and coupling, to the inner surface of each composite stringer, a radius filler at the lower corner portion of the composite stringer, wherein a first surface of the radius filler is defined by a second radius of curvature, wherein forming the plurality of composite stringers comprises forming the top flange of a first composite stringer of the plurality of composite stringers with a gage that is different than a gage of the top flange of a second composite stringer of the plurality of composite stringers, and wherein, along the longitudinal axis: (a) the composite stringer assembly has a total length that is equal to a sum of a respective length of each composite stringer, (b) the first radius of curvature is substantially constant over the total length of the composite stringer assembly, and (c) the second radius of curvature is substantially constant over the total length of the composite stringer assembly.

15. The method of claim 14, wherein forming the plurality of composite stringers comprises, for each composite stringer, forming the web with a gage that is approximately equal to a gage of the skin flange.

16. The method of claim 14, wherein forming the plurality of composite stringers comprises forming the first composite stringer and the second composite stringer such that the web and the skin flange of the first composite stringer have a gage that is approximately equal to a gage of the web and the skin flange of the second composite stringer.

17. The method of claim 14, wherein forming the plurality of composite stringers comprises, for each composite stringer, forming the gage of the top flange to be greater than a gage of the web and a gage of the skin flange.

18. The method of claim 14, wherein forming the plurality of composite stringers comprises, for each composite stringer, forming the web with a gage that is approximately equal to a gage of the skin flange of the composite stringer.

19. The method of claim 14, wherein, for each composite stringer, the first radius of curvature is substantially constant between the skin flange and the web.

20. The method of claim 14, wherein the second radius of curvature is approximately equal to a sum of the first radius of curvature and a gage of the skin flange.

21. The method of claim 14, wherein the radius filler comprises a second surface configured to couple to the support structure and a third surface extending between the first surface and the second surface, and wherein the second radius of curvature of the first surface is substantially constant between a second surface of the radius filler and a third surface of the radius filler.

\* \* \* \* \*